United States Patent
Katsumata

(10) Patent No.: US 11,256,904 B2
(45) Date of Patent: Feb. 22, 2022

(54) IMAGE CANDIDATE DETERMINATION APPARATUS, IMAGE CANDIDATE DETERMINATION METHOD, PROGRAM FOR CONTROLLING IMAGE CANDIDATE DETERMINATION APPARATUS, AND RECORDING MEDIUM STORING PROGRAM

(71) Applicant: FUJIFILM Corporation, Tokyo (JP)

(72) Inventor: Yukinori Katsumata, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 38 days.

(21) Appl. No.: 16/702,452

(22) Filed: Dec. 3, 2019

(65) Prior Publication Data
US 2020/0234076 A1 Jul. 23, 2020

(30) Foreign Application Priority Data
Jan. 18, 2019 (JP) .............................. JP2019-006480

(51) Int. Cl.
*G06K 9/00* (2006.01)
*G06K 9/62* (2022.01)
(Continued)

(52) U.S. Cl.
CPC ........... *G06K 9/00275* (2013.01); *G06F 3/14* (2013.01); *G06K 9/6202* (2013.01); *G06T 11/60* (2013.01)

(58) Field of Classification Search
CPC .... G06K 9/6202; G06K 9/00275; G06F 3/14; G06T 11/60
See application file for complete search history.

(56) References Cited

U.S. PATENT DOCUMENTS

2006/0055977 A1* 3/2006 Shiota ................. G06F 16/5854
358/1.18
2007/0046997 A1* 3/2007 Nakagawa ............. G06Q 30/00
358/1.18
(Continued)

FOREIGN PATENT DOCUMENTS

JP 2010057073 A 3/2010
JP 2013-033453 A 2/2013
(Continued)

OTHER PUBLICATIONS

"About People in Photos on your iPhone, iPad, or iPod touch", Feb. 15, 2018, https://web.archive.org/web/20180215020438/https://support.apple.com/en-us/HT207103. (Year: 2018).*
(Continued)

*Primary Examiner* — Michelle L Sams
(74) *Attorney, Agent, or Firm* — Studebaker & Brackett PC

(57) ABSTRACT

Provided are an image candidate determination apparatus that assists which image is to be selected in order to uniformize the number of images including each person in an image to be made public as much as possible, a method thereof, a program thereof, and a recording medium storing the program.
In a case where a plurality of images are input, images in which the same person is included are grouped. In a case where there are images of which the number is equal to or larger than a maximum number of images to be made public for the same person (YES in step 61), a total image evaluation value is calculated for the images in which the same person is included (step 62). An image with a small total image evaluation value is determined as a private image candidate so that the number thereof is smaller than the maximum number (step 63).

21 Claims, 50 Drawing Sheets

(51) Int. Cl.
*G06T 11/60* (2006.01)
*G06F 3/14* (2006.01)

(56) References Cited

U.S. PATENT DOCUMENTS

| | | | | |
|---|---|---|---|---|
| 2008/0050039 | A1* | 2/2008 | Jin | H04N 1/00196 |
| | | | | 382/284 |
| 2011/0221922 | A1* | 9/2011 | Matsumoto | H04N 5/23222 |
| | | | | 348/222.1 |
| 2013/0004073 | A1 | 1/2013 | Yamaji et al. | |
| 2013/0243273 | A1* | 9/2013 | Yamaji | G06K 9/00295 |
| | | | | 382/118 |

FOREIGN PATENT DOCUMENTS

| | | | |
|---|---|---|---|
| JP | 2013191035 | A | 9/2013 |
| JP | 2014-109864 | A | 6/2014 |
| JP | 2014102715 | A | 6/2014 |
| JP | 5616819 | B2 | 10/2014 |

OTHER PUBLICATIONS

An Office Action mailed by the Japanese Patent Office dated Dec. 21, 2021, which corresponds to Japanese Patent Application No. 2019-006480 and is related to U.S. Appl. No. 16/702,452.

\* cited by examiner

EDITING (E)

KINDERGARTEN
└─ GRADUATION CEREMONY (360)

| NAME | PRIVATE | HOLD | PUBLIC |
|---|---|---|---|
| TARO SATO | 0 | 6 | 0 |
| HARUKO SUZUKI | 0 | 3 | 0 |
| KAZUO TAKAHASHI | 0 | 5 | 0 |
| JIRO TANAKA | 0 | 1 | 0 |
| ⋮ | ⋮ | ⋮ | ⋮ |
| TEACHER/ GUARDIAN | 0 | 5 | 0 |

IMAGE MANAGEMENT | FACE CLASSIFICATION | PUBLIC SETTING

INPUT SHEET NUMBER

EVENT ADDITION
EVENT DELETION

2/6

IT IS RECOMMENDED THAT THIS IMAGE IS MADE PRIVATE.

TARO SATO F1
UNCLASSIFIED F
HANAKO ITO F3
UNCLASSIFIED F
UNCLASSIFIED F

HOLD: 0019.jpg

FIG. 18

| IMAGE MANAGEMENT | FACE CLASSIFICATION | PUBLIC SETTING |
|---|---|---|

FIG. 20

IMAGES OF OO ARE INSUFFICIENT.

PLEASE TAKE ONE TO FIVE
MORE PHOTOS.

CONFIRMATION

IMAGE CANDIDATE DETERMINATION APPARATUS, IMAGE CANDIDATE DETERMINATION METHOD, PROGRAM FOR CONTROLLING IMAGE CANDIDATE DETERMINATION APPARATUS, AND RECORDING MEDIUM STORING PROGRAM

CROSS-REFERENCE TO RELATED APPLICATIONS

The present application claims priority under 35 U.S.C. § 119 to Japanese Patent Application No. 2019-006480, filed Jan. 18, 2019. Each of the above application(s) is hereby expressly incorporated by reference, in its entirety, into the present application.

BACKGROUND OF THE INVENTION

1. Field of the Invention

The present invention relates to an image candidate determination apparatus, an image candidate determination method, a program for controlling the image candidate determination apparatus, and a recording medium storing the program.

2. Description of the Related Art

At events such as graduation ceremonies or sports day, many children are photographed, and albums or the like are created. For this purpose, for example, a school photo management server capable of centrally managing, browsing, and ordering all photos taken in a school, student's works, or the like is considered (JP2014-102715A). Further, in creating an album, a method for preventing the number of photographic images taken by a specific individual from becoming extremely large or small is considered. For this purpose, images are selected from list images, a person is extracted from the selected images, the number of appearances of the extracted person is counted, and in a case where the number of appearances exceeds five, a warning is displayed. In a case where the warning is displayed, a user selects an image to be deleted among the selected images (JP2010-057073A). Further, an image publishing device capable of automatically determining, even though a user does not set a public state or a private state, the public state or the private state according to a predetermined rule is also considered (JP2013-191035A). Furthermore, a method for imaging a plurality of subjects in a balanced manner is also considered (JP5616819B).

SUMMARY OF THE INVENTION

Energetic children or conspicuous children appear in many photos, while reluctant and adult children do not appear in the photos. In the technique disclosed in JP2014-102715A, there is a possibility that in a case where photos are sold in such a state, complaints of unfairness may be raised from guardians. In the technique disclosed in JP2010-057073A, in a case where an image to be deleted is selected from selected images, it is difficult to determine which image is to be selected. In the technique disclosed in JP2013-191035A, images are determined to be made public or private on the basis of an image analysis result, in which the number of images including a specific person may be large, or may be small. Further, in the technique disclosed in JP561819, a plurality of subjects are merely imaged in a balanced manner during imaging.

An object of the invention is to provide a technique that assists which image is to be selected in order to uniformize the number of images that includes each person in images that is made public as much as possible.

According to an aspect of the invention, there is provided an image candidate determination apparatus comprising: an image grouping device (image grouping means) that receives a plurality of images and groups one or more images in which the same person is included; and an image candidate determination device (image candidate determination means) that determines an extraction image candidate or a non-extraction image candidate from the images grouped by the image grouping device, on the basis of a total image evaluation value and a limit value of the number of extraction images in which the same person is included.

Here, the grouping device may be any device as long as the image candidate determination apparatus can recognize one or more images in which the same person is included. For example, the grouping device may be stored in a certain folder, or a certain flag may be set therefor.

Further, the image candidate determination apparatus according to the invention may comprise a processor that receives a plurality of images, groups one or more images in which the same person is included, and determines an extraction image candidate or a non-extraction image candidate from the grouped images grouped, on the basis of a total image evaluation value and a limit value of the number of extraction images in which the same person is included.

According to another aspect of the invention, there is provided an image candidate determination method suitable for the image candidate determination apparatus. That is, the method comprises receiving a plurality of images and grouping one or more images in which the same person is included, by an image grouping device; and determining an extraction image candidate or a non-extraction image candidate from the images grouped by the image grouping device, on the basis of a total image evaluation value and a limit value of the number of extraction images in which the same person is included, by an image candidate determination device.

Further, according to still another aspect of the invention, there is provided a non-transitory recording medium storing computer-readable program for controlling a computer of the image candidate determination apparatus. There may be provided the program.

The image candidate determination device may determine the extraction image candidate or the non-extraction image candidate for each double-page spread included in an electronic album, for example.

The image candidate determination apparatus may further comprise an electronic album generating device (electronic album generating device) that pastes the extraction image candidate determined in the image candidate determination device onto the double-page spread to generate the electronic album.

The image candidate determination apparatus may further comprise a first notification device (first notification device) that notifies of at least one of a person who is not included in the double-page spread or the number of the persons, among a plurality of predetermined persons.

The image candidate determination apparatus may further comprise: a person designation device (person designation device) that designates any person among the persons notified in the first notification device; and a first display control device (first display control means) that displays images including the person designated by the person designation device, among the images grouped by the grouping device, on a display screen.

The image candidate determination apparatus may further comprise an image designation device (image designation device) that designates an image from the images including the person, which are displayed by the first display control device. In this case, the electronic album generating device pastes the image designated by the image designation device onto the double-page spread to generate the electronic album.

The image candidate determination apparatus may further comprise a second notification device (second notification means) that notifies of the person included in the double-page spread.

The image candidate determination apparatus may further comprise a third notification device (third notification device) that notifies of the number of the extraction image candidates including the person notified by the second notification device.

The image candidate determination apparatus may further comprise a second display control device (second display control means) that distinguishes the double-page spread that does not include at least one or more persons among the plurality of predetermined persons from the double-page spread that includes all the plurality of predetermined persons to display the double-page spreads on the display screen in a list.

The grouping device receives a plurality of images captured at each event and groups one or more images in which the same person is included for each event, for example.

For example, the electronic album generating device pastes the extraction image candidate determined in the image candidate determination device onto the double-page spread corresponding to an event represented by the extraction image candidate to generate the electronic album, for example.

In a case where a plurality of the electronic albums are provided, for example, the double-page spread included in each of the electronic albums may define a common double-page spread onto which images common to the plurality of electronic albums are pasted and an individual double-page spread onto which an image in which a specific person is a main subject is pasted for each of the electronic albums. In this case, the first notification device notifies of at least one of a person who is not included in the extraction image candidate pasted onto the common double-page spread or the number of the persons.

The electronic album generating device may write a name of the specific person in the individual double-page spread to generate the electronic album.

The image candidate determination apparatus may further comprise a third display control device (third display control device) that displays a first confirmation mark corresponding to the specific person on a display screen as the pasting of the image onto the individual spread image for the specific person is finished.

In a case where a plurality of the electronic albums are provided, the image candidate determination apparatus may further comprise a fourth display control device (fourth display control device) that displays a second confirmation mark corresponding to the specific person on a display screen as a cover page for a specific person is generated for each of the electronic albums.

The image candidate determination apparatus may further comprise an image candidate display control device that displays the extraction image candidate or the non-extraction image candidate determined by the image candidate determination device on the display screen.

The total image evaluation value may be calculated on the basis of a person image evaluation value calculated for each person included in images, for example.

The person image evaluation value is calculated on the basis of an evaluation value relating to at least a face, for example. In this case, the image candidate determination apparatus further comprises a face image portion extraction device that extracts a face image portion from each of a plurality of images. The image grouping device groups the face image portions extracted by the face image portion extraction device for each face image portion of the same person, and the image candidate determination device determines an extraction image candidate or a non-extraction image candidate from the images grouped by the image grouping device, for example, on the basis of a total image evaluation value and a limit value of the number of extraction images in which the same person is included.

The image candidate determination apparatus may further comprise a correcting device that corrects a person image evaluation value using a correction coefficient for setting an image evaluation value to be larger as the number of images in which the same person is included is smaller.

The image candidate determination apparatus may further comprise an image determination device that determines an extraction image or a non-extraction image from extraction image candidates displayed under the control of the image candidate display control device, or determines a non-extraction image or an extraction image from non-extraction image candidates displayed under the control of the image candidate display control device.

The image candidate determination apparatus may further comprise a notification device that notifies of the number of extraction images and the number of non-extraction images determined by the image determination device, for each person included in the images.

The image candidate determination apparatus may further comprise a notification device that updates and notifies, in a case where a plurality of images are defined as extraction images or non-extraction images that are set in advance for each person included in the images, the number of extraction images and the number of non-extraction images, for each person included in the images.

Further, the image candidate determination apparatus may further comprise an image candidate stopping device that excludes, in a case where an extraction number of images in which a specific person is included deviates from a limit value as one non-extraction image candidate determined by the image candidate determination device becomes a non-extraction image or one extraction image candidate becomes an extraction image, the one non-extraction image candidate or one extraction image candidate from the extraction image candidates.

The image grouping device regards non-same persons as the same person for adults, for example, and performs grouping for respective images.

The image candidate determination apparatus may further comprise a first evaluation value calculating device that calculates a lower person image evaluation value as the number of persons included in an image becomes larger.

For example, the image candidate determination device may determine the extraction image candidate or non-extraction image candidate from the images grouped by the image grouping device so that the extraction number of images in which the same person is included is within the limit value, on the basis of the total image evaluation value and the limit value of the number of extraction images in which the same person is included.

The image candidate determination apparatus may further comprise a person detection device that detects such a person that the number of the same person included in one or more images grouped by the image grouping device is equal to or smaller than a threshold, and an imaging instruction device that performs an imaging instruction of the person detected by the person detection device.

According to the invention, a plurality of images are received, and one or more images in which the same person is included are grouped. On the basis of a total image evaluation value and a limit value (the limit value represents an upper limit value, a lower limit value, or the like) of an extraction number of images in which the same person is included, an extraction image candidate (the extraction image candidate refers to a candidate for an image suitable for a user to extract from the images) or a non-extraction image candidate (the non-extraction candidate image refers to a candidate for an image suitable for the user not to extract from the images) is determined. Since the extraction image candidate or the non-extraction image candidate is determined, the user can understand which image is preferably extracted or which image is preferably not extracted, and thus, it is possible to designate an image to be extracted from the images that are preferably considered to be extracted or not preferably considered to be extracted.

BRIEF DESCRIPTION OF THE DRAWINGS

FIG. 8 is a diagram showing an example of an image display window.

FIG. 12 is a diagram showing an example of an image display window.

FIG. 14 is a diagram showing an example of an image display window.

FIG. 18 is a diagram showing an example of an image display window.

FIG. 20 is a diagram showing an example of an image instruction window.

DESCRIPTION OF THE PREFERRED EMBODIMENTS

First Embodiment

Figure 1:
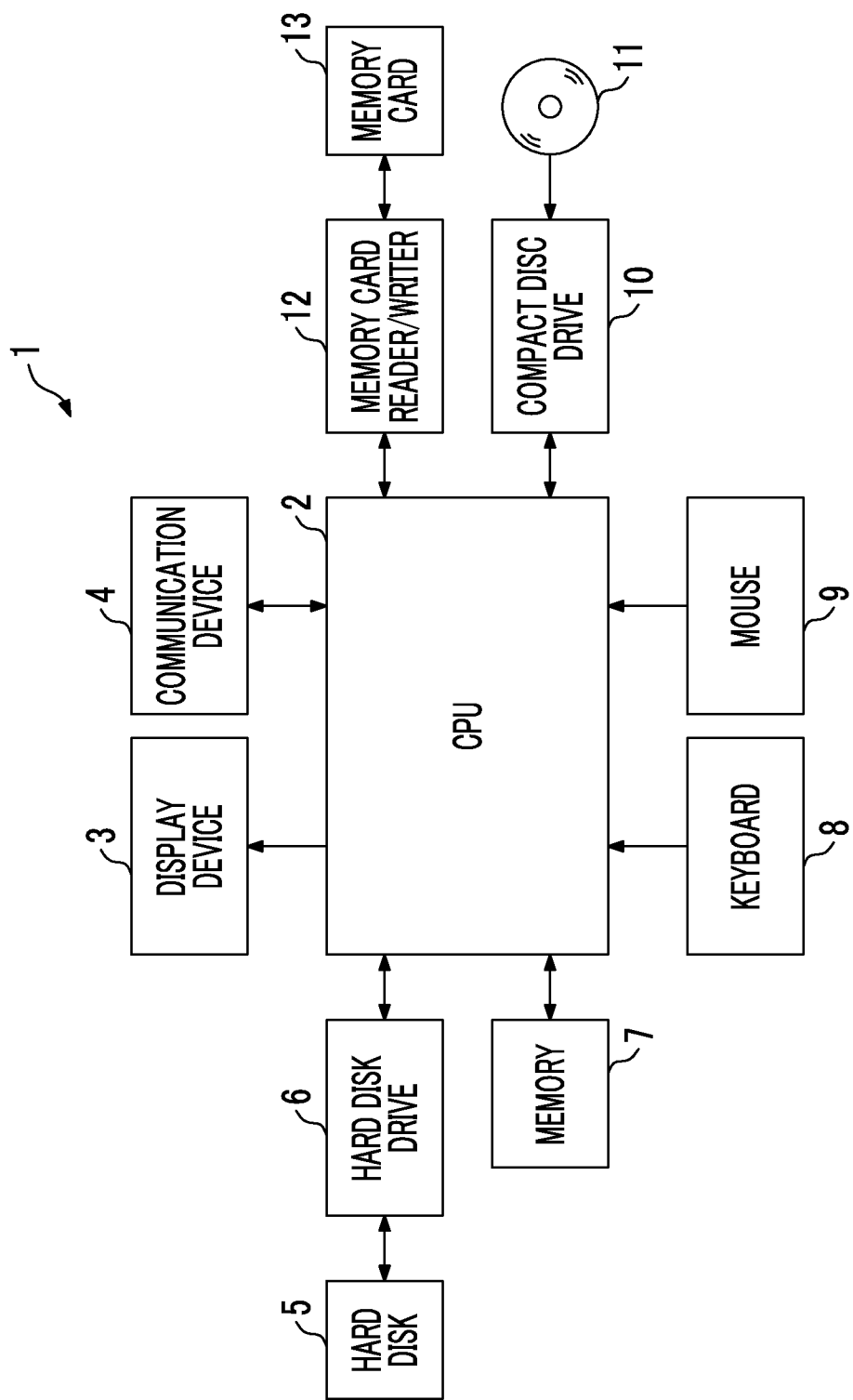
FIG. 1 is a block diagram showing an electrical configuration of an image candidate determination apparatus.

FIG. 1 shows an embodiment of the invention, which is a block diagram showing an electrical configuration of an image candidate determination apparatus 1.

An overall operation of the image candidate determination apparatus 1 is controlled by a central processing unit (CPU) 2.

The image candidate determination apparatus 1 includes a display device 3 that displays images and other information on a display screen, and a communication device 4 that communicates with devices other than the image candidate determination apparatus 1 by being connected to the Internet and other networks. Further, the image candidate determination apparatus 1 also includes a hard disk 5, a hard disk drive 6 that accesses the hard disk 5, a memory 7 that stores data or the like, and a keyboard 8 and a mouse 9 for inputting commands or the like. In addition, the image candidate determination apparatus 1 includes a compact disc drive 10 that accesses a compact disc 11, and a memory card reader/writer 12 that writes data on a memory card 13 and reads data recorded on the memory card 13.

An operation program of the image candidate determination apparatus 1 to be described later is received by the communication device 4 through the Internet. The received operation program is installed in the image candidate determination apparatus 1. The operation program may be received by the image candidate determination apparatus 1 through a network such as the Internet, may be recorded on a portable recording medium such as the compact disc 11 without being installed in the image candidate determination apparatus 1, and then, may be read from the portable recording medium. In this case, the operation program read from the portable recording medium is installed in the image candidate determination apparatus 1.

It goes without saying that the operation program is readable by a computer (CPU 2) of the image candidate determination apparatus 1.

FIGS. 2 to 7 are flowcharts showing a processing procedure of the image candidate determination apparatus 1.

In this embodiment, in a case where a large number of images including a person are captured and the images are made public, such an imbalance that the number of images of a specific person is large or small is eliminated as much as possible.

In this embodiment, names of persons that are imaging targets are registered in the image candidate determination apparatus 1 by a user of the image candidate determination apparatus 1. In the embodiment to be described below, a large number of images at a kindergarten graduation ceremony are taken, and names of children that are imaging targets are registered in the image candidate determination apparatus 1 in advance by a user (for example, a kindergarten teacher).

Figure 2:
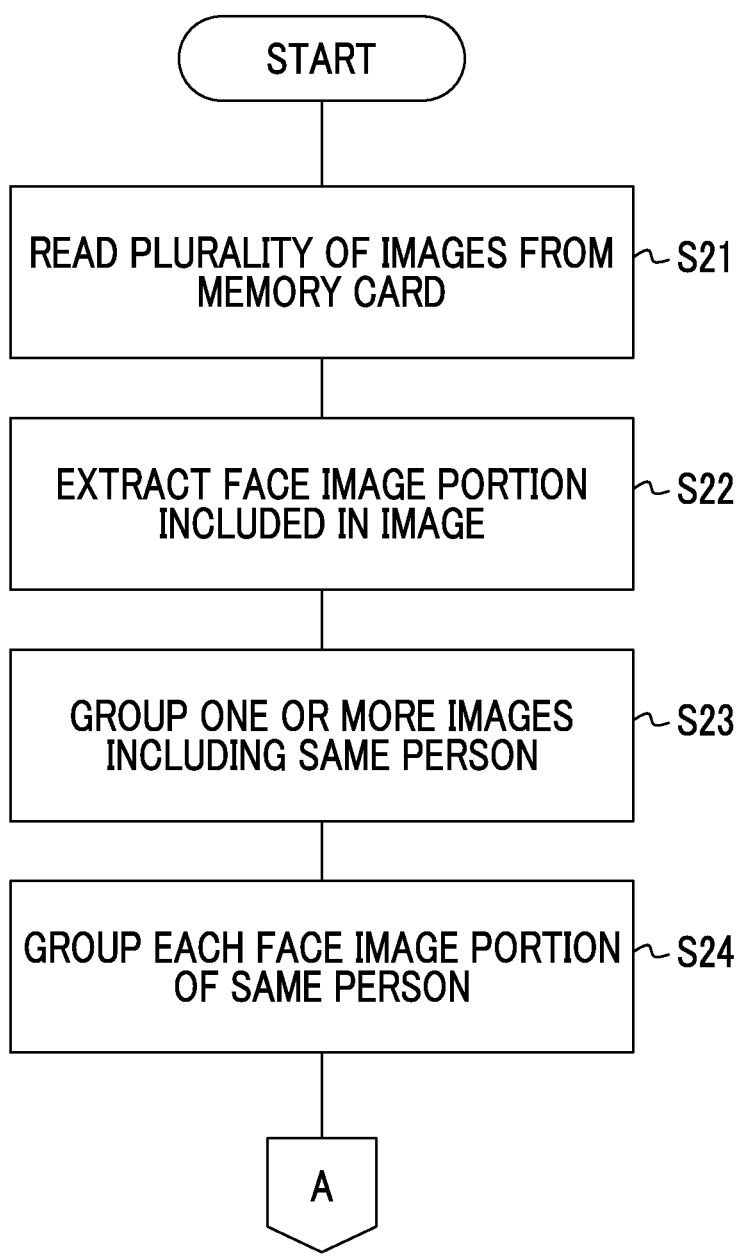
FIG. 2 is a flowchart showing a processing procedure of the image candidate determination apparatus.

In a case where the memory card 13 in which image data indicating a plurality of images is stored is loaded in the image candidate determination apparatus 1, the image data indicating the plurality of images stored in the memory card 13 is read by the memory card reader/writer 12 (step 21 in FIG. 2). A face image portion included in the image represented by the read image data is extracted by the CPU 2 (face image portion extraction unit) (step 22 in FIG. 2). Further, on the basis of the extracted face image portion, one or more images including the same person are grouped by the CPU 2 (image grouping unit) (step 23 in FIG. 2).

The same image may belong to different groups, or the same image may belong to only one group. In addition, the extracted face image portions are also grouped for each face image portion of the same person by the CPU 2 (image grouping unit) (step 24 in FIG. 2).

Figure 8:
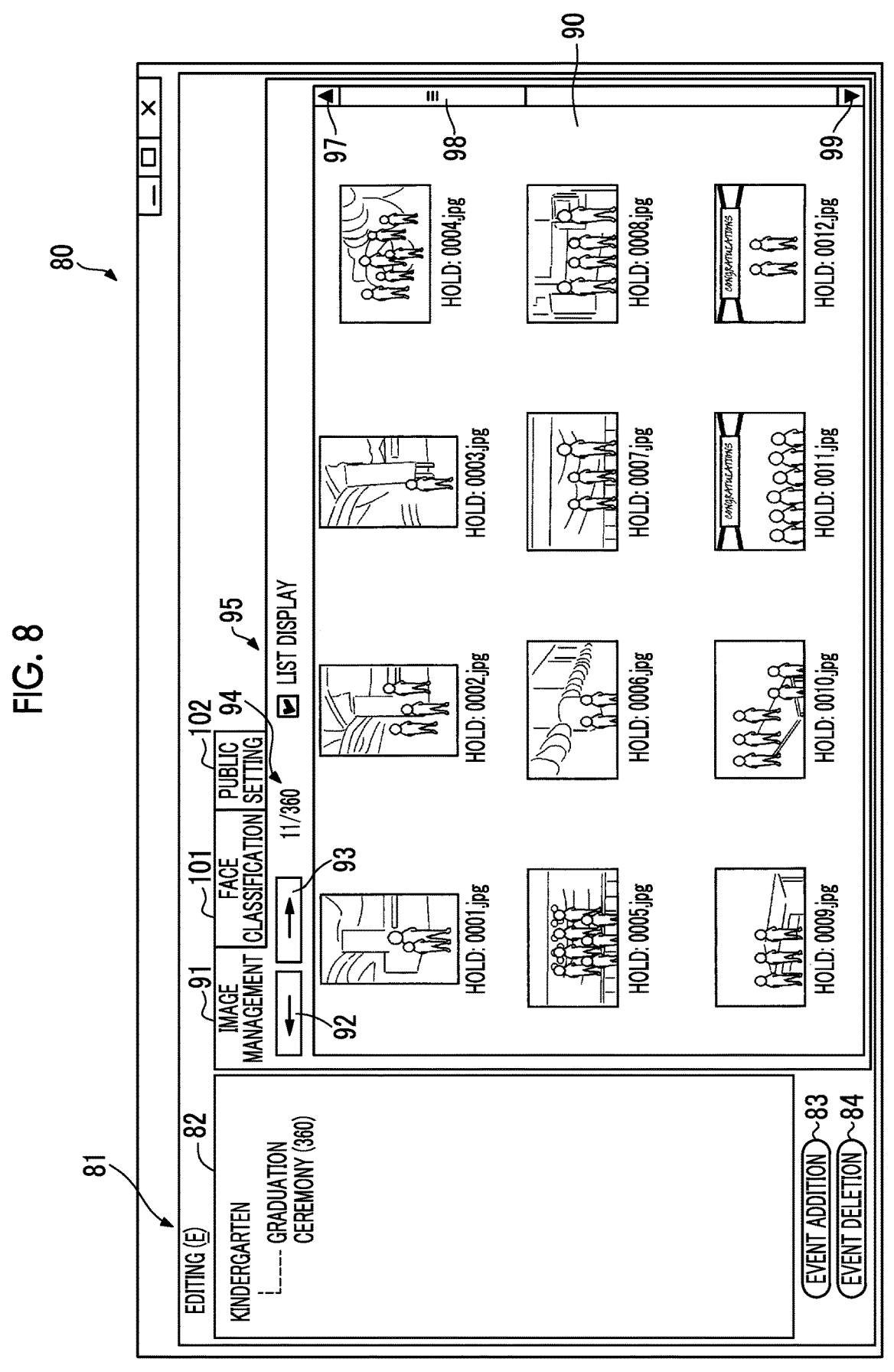

An image display window 80 shown in FIG. 8 is displayed on a display screen of the display device 3. The image display window 80 includes an image management tab 91, a face classification tab 101, and a public setting tab 102, and is initially in a state where the image management tab 91 is clicked. On the image display window 80, a large number of images (thumbnail images) represented by image data read from the memory card 13 are displayed in an image display area 90 as a list (step 25 in FIG. 3).

Referring to FIG. 8, a character string 81 of "editing" is displayed on the image display window 80, and an event management area 82 is formed under the character string 81 of "editing". In the event management area 82, a character string of "graduation ceremony" is displayed below a character string of "kindergarten". Below the event management area 82, an event addition button 83 in which a character string of "event addition" is displayed and an event deletion button 84 in which a character string of "event deletion" is displayed are formed.

An event of "graduation ceremony" is generated in the event management area 82, and the images represented by the image data read from the memory card 13 are managed as the event of "graduation ceremony". Specifically, in a case where the event addition button 83 is clicked after the character string of "kindergarten" is clicked, an event input window appears on the image display window 80, and the user inputs a new event using the event input window. In a case where the user inputs the character string of "graduation ceremony" using a keyboard 8 at that time, the character string of "graduation ceremony" is displayed below the character string of "kindergarten".

As the images represented by the image data read from the memory card 13 are dragged and dropped in the image display area 90 in a state where the character string of "graduation ceremony" is clicked, the dragged and dropped images are managed under the event of "graduation ceremony" (this state is the state shown in FIG. 8). In FIG. 8, a numeral of "360" is displayed in a parenthesis on a right side of the character string of "graduation ceremony" displayed in the event management area 82, and 360 images are managed as images of the event of "graduation ceremony". In a case where the event deletion button 84 is clicked after the character string displayed in the event management area 82 is clicked, the event specified by the clicked character string and the images managed under the event are deleted.

A left arrow button 92 and a right arrow button 93 are formed under the image management tab 91. An image specifying number 94 for specifying a designated image is displayed on a right side of the right arrow button 93. A numeral represented by the image specifying number 94 represents the designated image. In the example shown in FIG. 8, since a character string of "11/360" is displayed in the image specifying number 94, it shows that an eleventh image among the 360 images is managed under the event of "graduation ceremony". The image specifying number 94 is represented by a fraction, in which the denominator indicates the number of sheets managed under the event and the numerator specifies a designated image in the order of numbers. In a case where the left arrow button 92 is clicked once, the numerator of the image specifying number 94 decreases by one, and in a case where the right arrow button 93 is clicked once, the numerator of the image specifying number 94 increases by one. It is preferable to cause the user to recognize the specified image by surrounding an image specified by the image specifying number 94 by a frame, for example.

On a right side of the image specifying number 94, a character string 95 of "list display" is displayed. In a case where a check box on a left side of the character string 95 of "list display" is checked (the check box is checked in an initial state), a plurality of images are displayed in the image display area 90 as a list, as shown in FIG. 8. In a case where the check box on the left side of the character string 95 of "list display" is removed, one image specified by the image specifying number 94 is displayed in the image display area 90 (see FIG. 9).

Under each of the plurality of images displayed in the image display area 90, a public status and an image file name are displayed. In this embodiment, there are three types of disclosure statuses such as "public", "private", and "hold". The "public" among the public statuses represents a state where an image is released, the "private" among the public statuses represents a state where an image is not released, and the "hold" among the public statuses represents a state where either the "public" or "private" is not determined. For example, an album is created using only "public" images, or only the "public" images are printed.

At a right end portion of the image display area 90, an up arrow button 97, a slide bar 98, and a down arrow button 99 are formed. As the up arrow button 97 is clicked or the scroll bar 98 is dragged upward, the image display area 90 is scrolled upward, and as the down arrow button 99 is clicked or the slide bar 98 is dragged downward, the image display area 90 is scrolled downward.

Figure 3:
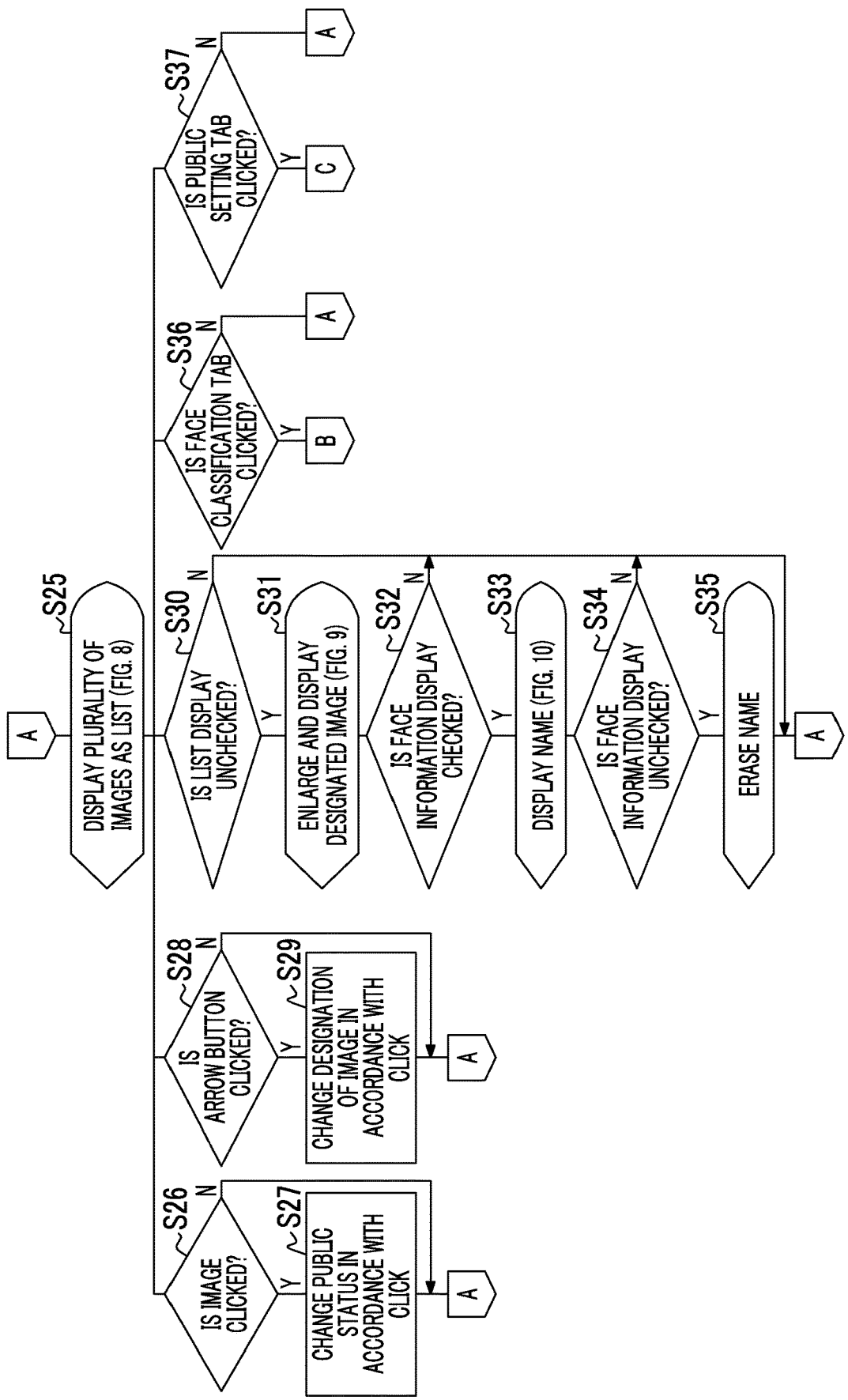
FIG. 3 is a flowchart showing a processing procedure of the image candidate determination apparatus.

In a case where a certain image among the images displayed in the image display area 90 is clicked (YES in step 26 of FIG. 3), the public status of the clicked image is changed by the click (step 27 of FIG. 3). In an initial state, public statuses of all images are set to "hold". In a case where an image in which the public status is set to "hold" is clicked once, the public status is changed to "public", and an image in which the public status is set to "public" is clicked once again, the public status is changed to "private". In a case where an image in which the public status is set to "private" is clicked once again, the public status is changed to "hold". Whenever the image is clicked in this way, the public status is sequentially changed. Here, a configuration in which "hold" is removed from the public statuses and the public statuses include "public" and "private" may be used. In this case, the public statuses of all the images are set to "public" or "private" (an extraction image or a non-extraction image is defined in advance for each person included in an image), and the public status is switched between "public" and "private" in accordance with image click (determination of the extraction image or the non-extraction image).

In a case where the left arrow button 92 or the right arrow button 93 is clicked (YES in step 28 of FIG. 3), the numerator of the image specifying number 94 decreases by one in a case where the left arrow button 92 is clicked, and the numerator of the image specifying number 94 increases by one in a case where the right arrow button 93 is clicked, so that the designation of the image is changed (step 29 of FIG. 3).

In a case where the check box of the character string 95 in the list display is unchecked (YES in step 30 in FIG. 3), the image specified by the image specifying number 94 is enlarged and displayed in the image display area 90 (step 31 of FIG. 3).

Figure 9:
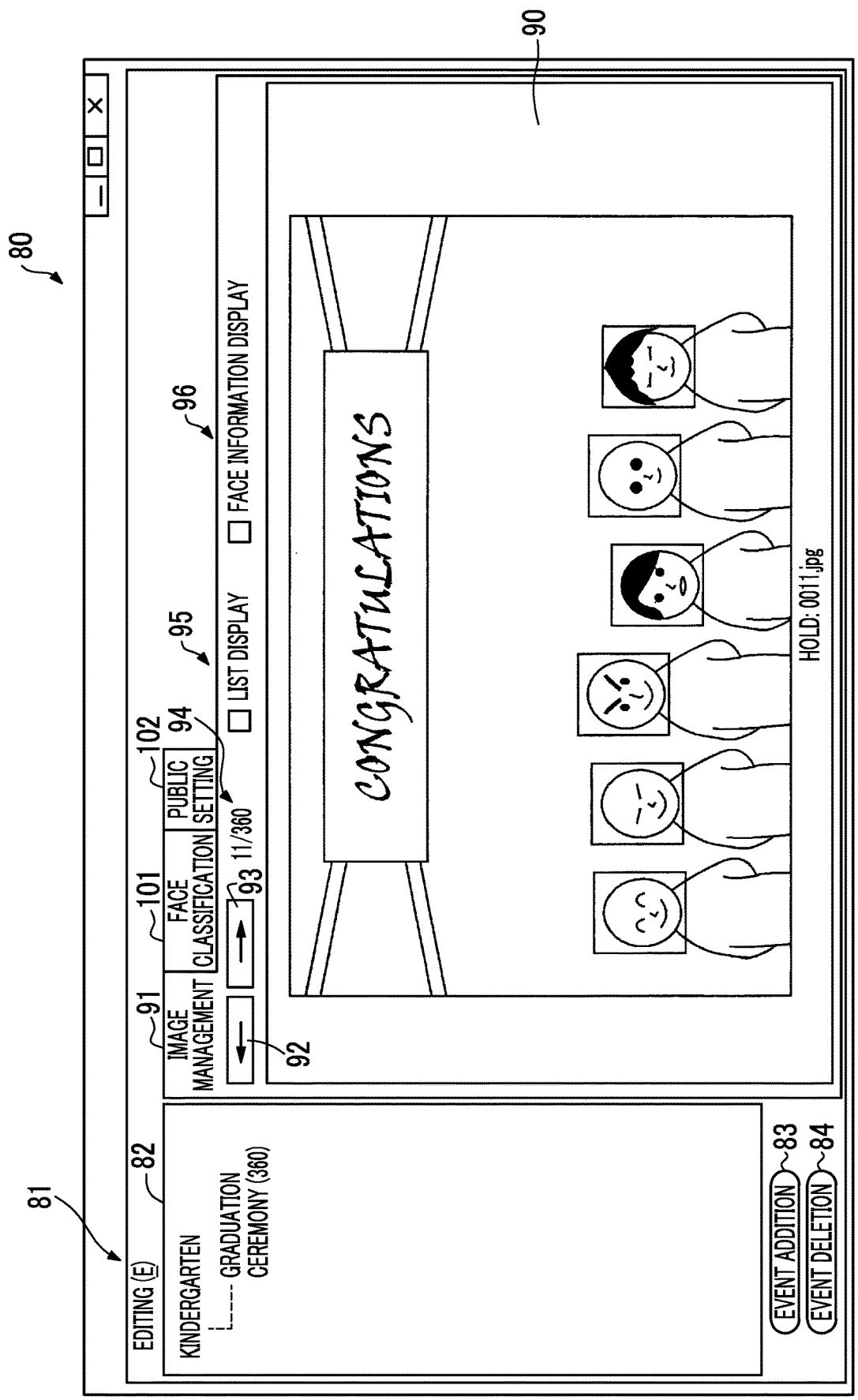
FIG. 9 is a diagram showing an example of an image display window.

FIG. 9 shows a state where an image is enlarged and displayed in the image display area 90.

In FIG. 9, the same reference numerals are given to the same objects as those shown in FIG. 8, and description thereof will not be repeated.

A character string 96 of "face information display" is displayed on a right side of the character string 95 of "list display". A check box is also formed on a left side of the character string 96 of "face information display".

In FIG. 8, in a case where the character string of "11/360" is displayed in the image specifying number 94, it is assumed that the check box of the character string 95 of "list display" is unchecked. Then, an image file name of "0011.jpg" specified by the "11/360" character string is enlarged and displayed in the image display area 90 shown in FIG. 9. The public status (hold) and the image file name (0011.jpg) are displayed under the image that is enlarged and displayed in the image display area 90.

In a case where the check box on the left side of the "face information display" character string 96 is checked (YES in step 32 of FIG. 3), a face frame surrounding a face image portion included in the image displayed in the image display area 90 is displayed (step 33 in FIG. 3). The display of the face frame is performed on the basis of a face image portion extraction process (step 22 of FIG. 2). A name of a subject (in this case, a kindergarten student) who is a target is input from the user of the image candidate determination apparatus 1 (in this case, a kindergarten teacher), and which person a certain face image belongs to is specified by the user, which will be described in detail later (see FIGS. 11 and 12, etc.). An image of the face of the same person as the face of the name specified by the user is found in the image candidate determination apparatus 1, and the found face image is also associated with the name (for example, the name of the face is stored in a header of an image file in correspondence with position information of the face). In a case where the association of the face image and the name is already performed by such processing of the user, the name of the person of the face is also displayed in correspondence with the face frame.

Figure 10:
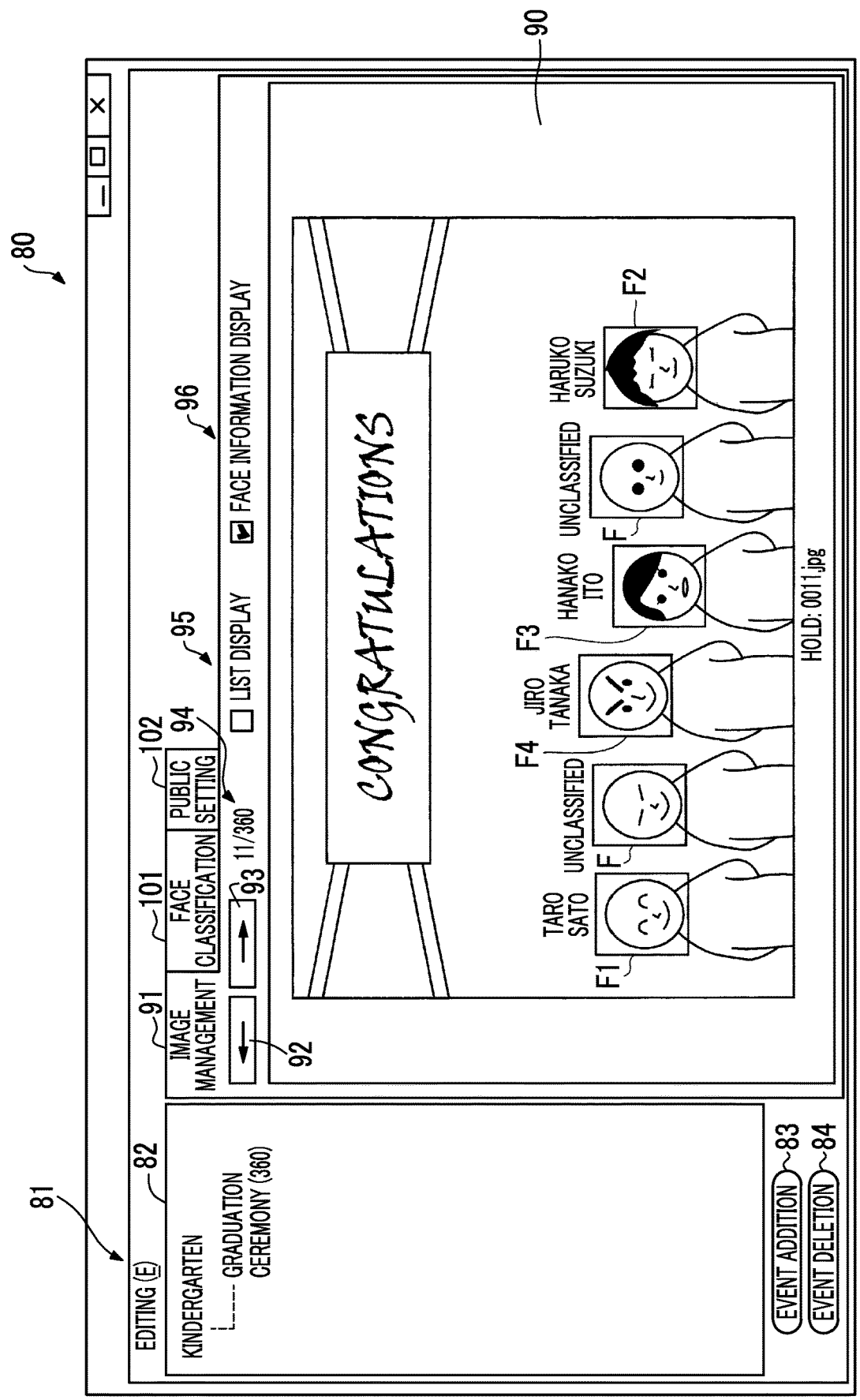
FIG. 10 is a diagram showing an example of an image display window.

FIG. 10 shows a state where the check box on the left side of the face information display character string 96 is checked and the face image portion included in the image displayed in the image display area 90 is surrounded by the face frame.

Faces surrounded by face frames F1, F4, F3, and F2 respectively correspond to persons (students) with names "Taro SATO". "Jiro TANAKA". "Hanako ITO", and "Haruko SUZUKI", and the names are respectively displayed near (above) the face frames F1, F4, F3, and F2. Since a face surrounded by a face frame F is not given association with a name by the user (unclassified), the name is not displayed. As the check box on the left side of the character string 96 of face information display is checked, the name of the person included in the image is displayed, and thus, it is possible for the user to confirm the name of the person included in the image.

In a case where the check box on the left side of the face information display character string 96 is unchecked (YES in step 34 of FIG. 3), the face included in the image is surrounded by the frame as shown in FIG. 10, with respect to the face associated with the name, a state where the name is displayed returns to a state where the name is erased as shown in FIG. 9 (step 35 in FIG. 3).

Figure 4:
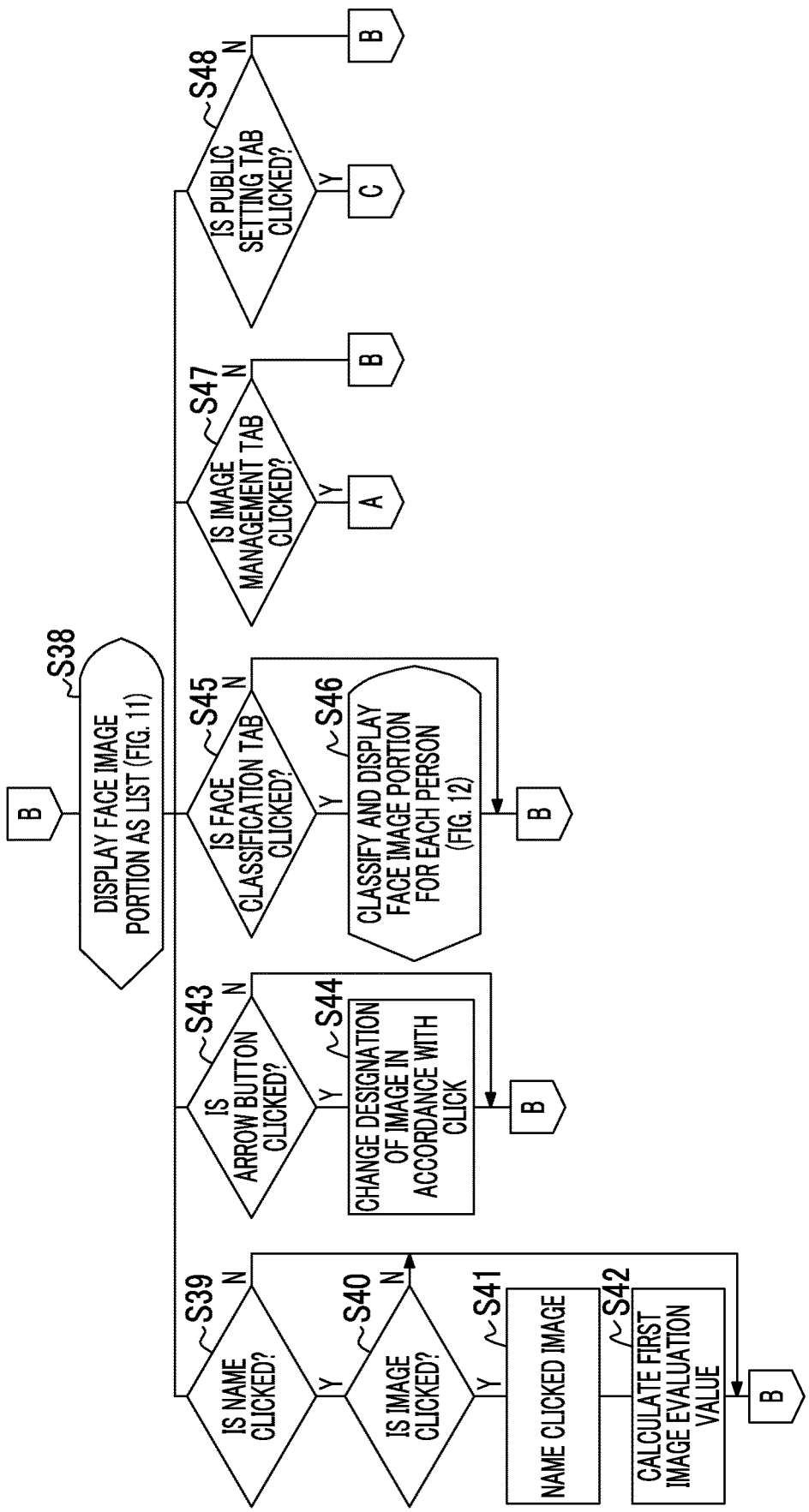
FIG. 4 is a flowchart showing a processing procedure of the image candidate determination apparatus.
Figure 11:
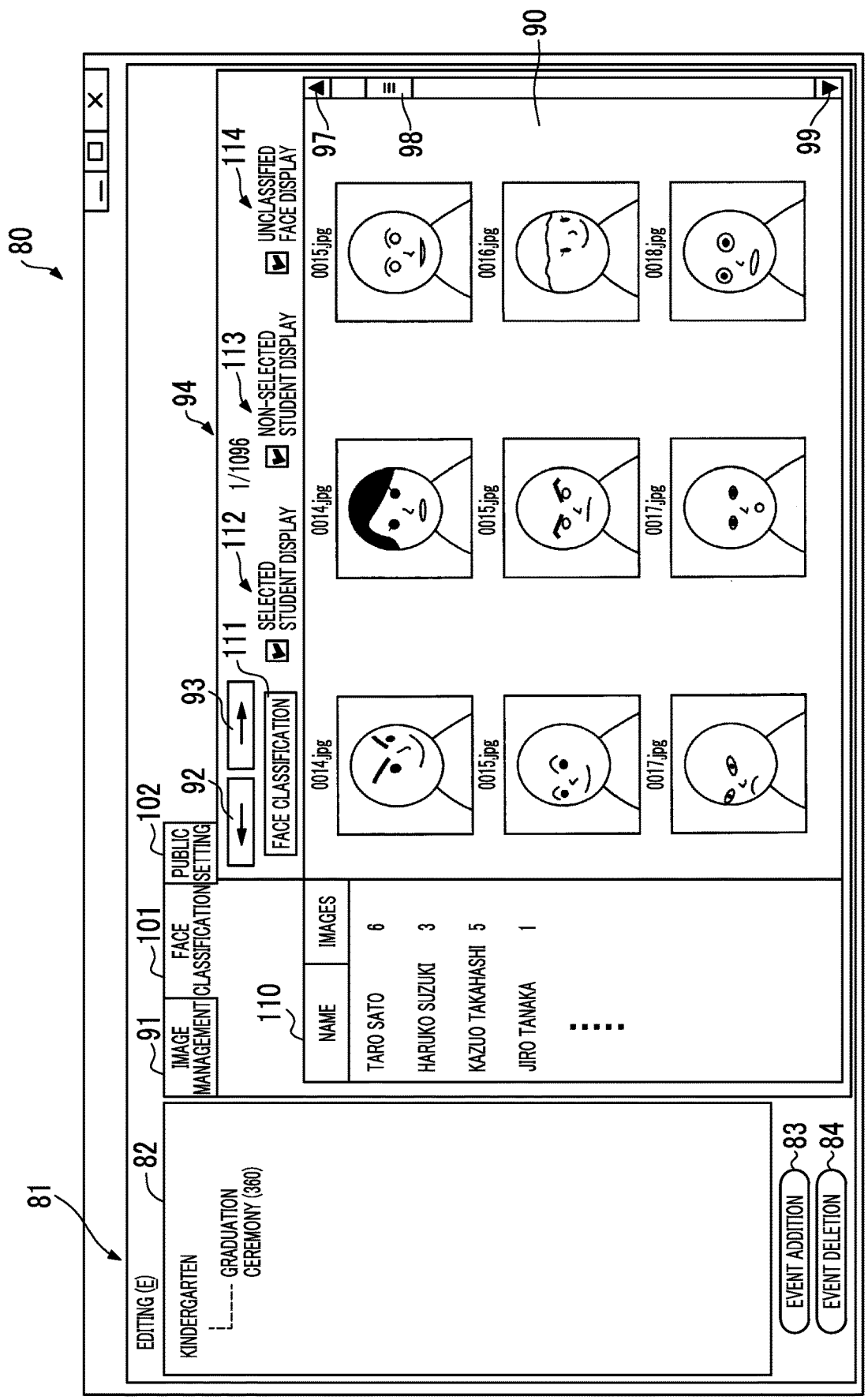
FIG. 11 is a diagram showing an example of an image display window.
Figure 13:
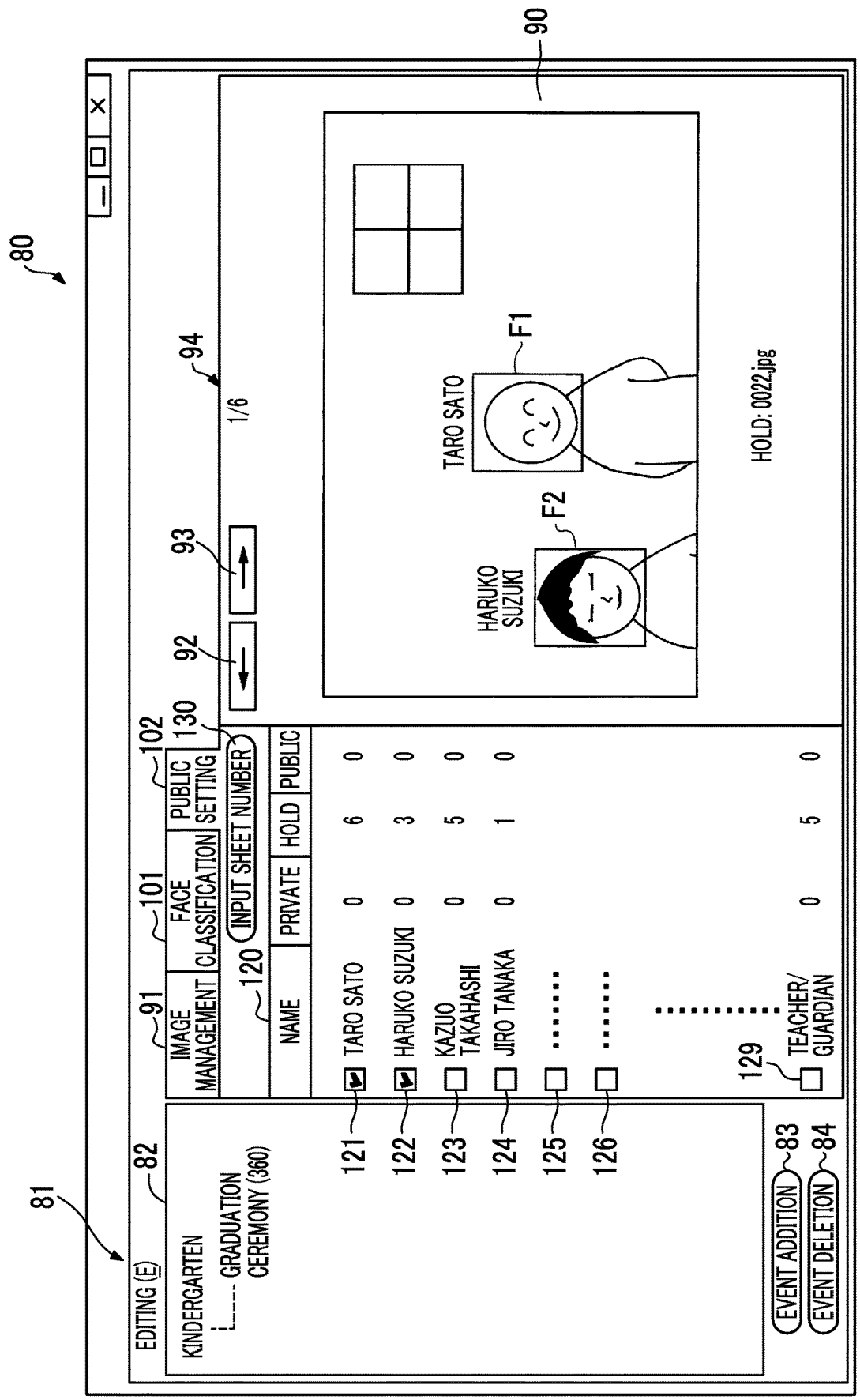
FIG. 13 is a diagram showing an example of an image display window.

In a case where the face classification tab 101 is clicked by the user (YES in step 36 of FIG. 3), face image portions are displayed on the image display window 80 as a list, as shown in FIG. 11 (step 38 in FIG. 4). Further, in a case where the public setting tab 102 is clicked by the user (YES in step 37 of FIG. 3), the image display window 80 displays a public/private setting image for setting "public" or "private" of an image, as shown in FIG. 13 (step 49 of FIG. 5).

It is assumed that the face classification tab 101 is clicked by the user. The image display window 80 shown in FIG. 11 is displayed on the display screen of the display device 3. In FIG. 11, the same reference numerals are given to the same objects as those shown in FIGS. 8 to 10, and description thereof will not be repeated.

In the image display area 90, face image portions extracted in the process of step 22 of FIG. 2 are displayed as a list. The face image portions are displayed in the image display area 90 in the order of file names of images including the face image portions, but the invention is not limited thereto.

A subject list area 110 is formed on a left side of the image display area 90. In the subject list area 110, names that are registered in advance in the image candidate determination apparatus 1 by the user as described above are displayed as a list. Further, the number of images in which a person with a name is shown is also displayed in correspondence with the name. The name displayed in the subject list area 110 may be selected (clicked) by the user.

Above the image display area 90, a face classification button 111 in which a "face classification" character string is displayed, a "selected student display" character string 112, a "non-selected student display" character string 113, and a "unclassified face display" character string 114 are displayed. Check boxes are respectively formed on left sides of the "selected student display" character string 112, the "non-selected student display" character string 113, and the "unclassified face display" character string 114.

In a case where the face classification button 1 is clicked, face image portions of the same person are collected (to be adjacent to each other) to be displayed in the image display area 90. In a case where the check box on the left side of the "selected student display" character string 112 is checked, a face image of a person with a selected name among the names displayed in the subject list area 110 is displayed in the image display area 90. For example, in a case where the check box on the left side of the "selected student display" character string 112 is checked in a state where "Taro SATO" among the names displayed in the subject list area 110 is selected, a face image of "Taro SATO" is displayed in the image display area 90.

In a case where the check box on the left side of the "non-selected student display" character string 113 is checked, face images of persons other than the selected person among the names displayed in the subject list area 110 are displayed in the image display area 90. For example, in a case where the check box on the left side of the "non-selected student display" character string 113 is checked in a state where "Taro SATO" among the names displayed in the subject list area 110 is selected, face images of persons other than "Taro SATO" are displayed in the image display area 90. In a case where the check box on the left side of the "unclassified face display" character string 114 is checked, face images of unclassified persons (whose names and face images are not associated by the user, as described above) are displayed in the image display area 90.

In a case where the face classification tab 101 is clicked and the face image portions displayed in the image display area 90 are displayed, the user may associate faces with names. As information on a name is stored in association with position information on a face image portion in a header of an image file indicating an image including the face image portion, the face and the name are associated with each other. With respect to a face image portion that is not associated with a name among the face image portions displayed in the image display area 90, only a file name of an image including the face image portion is displayed. With respect to the face image portion associated with the name, a file name of an image including the face image portion and the name are displayed.

In a case where names are associated with the face image portions displayed in the image display area 90, any one name among the names displayed in the subject list area 110 is clicked by the user (YES in step 39 of FIG. 4), and a face image portion of the name is clicked by the user (YES in step 40 of FIG. 4). Then, name information is stored in a header of an image file including the face image portion together with position information on the face image portion, as described above. The name selected together with a file name of an image including the face image portion are displayed above the clicked face image portion (step 41 of FIG. 4).

Subsequently, a first image evaluation value with which a name is associated is calculated by the CPU 2 (step 42 of FIG. 4, the first image evaluation value corresponds to a person image evaluation value in the invention). The first image evaluation value is an evaluation value for a person with the associated name. In a case where two persons are included in a certain image, in the same image, the first image evaluation value for one person and the first evaluation value for the other person are different from each other.

The first image evaluation value is calculated according to evaluation parameters such as the number of persons included in an image and the size of a face included in the image. Table 1 is an example of a person number score table based on the number of persons included in an image.

TABLE 1

| | The number of persons | | | | | | | |
|---|---|---|---|---|---|---|---|---|
| | One person | Two persons | Three persons | Four persons | Five persons | Six persons | Seven persons | Eight persons~ |
| Persons number score | 1 | 3 | 5 | 7 | 10 | 7 | 6 | 5 |

As the number of persons included in an image is not too small and not too large, it may be considered that the image is well-balanced and the persons included in the image are appropriately conspicuous and evaluation of the image for the persons is high. For this reason, the calculation is performed by the CPU 2 so that the person number score becomes large in a case where the number of persons included in an image is about 5 and the person number score becomes small in a case where the number of persons included in the image is small or large (first image evaluation value calculating unit). However, as the number of persons included in the image becomes smaller, the person number score may be set to become higher, and as the number of persons included in the image becomes larger, the person number score may be set to become higher.

Table 2 is an example of a face size score table based on the size of a face included in an image. In Table 2, the size of the face represents the size of the face with respect to the image. For example, in a case where the size of the face is "1/15", it means that the size of the face is 1/15 of the size of the image. In a case where a face is surrounded by a rectangular frame, the size may be determined using a horizontal pixel count of an image and a horizontal pixel count of a face image portion, using a vertical pixel count of the image and a vertical pixel count of the face image portion, or using the number of pixels in an entire image portion and the number of pixels in a face area.

TABLE 2

| | Face size | | | | | | | |
|---|---|---|---|---|---|---|---|---|
| | ~1/15 | 1/12 | 1/10 | 1/8 | 1/6 | 1/5 | 1/4 | 1/3~ |
| Face size score | 1 | 3 | 5 | 7 | 10 | 7 | 5 | 2 |

Since the balance of an image is not good either in a case where the size of the face of a person included in the image is too large or in a case where the size of the face of the person included in the image is too small, the face size score is the highest at an appropriate ratio (here, 1/6). The face size score is set to become lower as a distance therefrom becomes large.

With respect to the evaluation parameters, as well as the number of persons included in an image and the size of a face included in the image, the degree of focus of a face image portion included in the image, the degree of eye opening in the face included in the image, a facial expression of the face included in the image, and the like may be used, so that the face score may be calculated. A facial expression score is set corresponding to the evaluation parameters so that the facial expression score is higher as the image portion of the face is in better focus, the facial expression score is higher as the eyes are more properly opened, and the facial expression score is higher as the facial expression is more smiling.

In this embodiment, a raw score of the first image evaluation value is calculated on the basis of the sum of the person number score, the face size score, and the facial expression score.

In addition, an image quality score may be defined so that the score becomes higher as the image quality of one entire image becomes better (for example, as the focus becomes better), and may be used to calculate the raw score.

Further, in this embodiment, the first image evaluation value is corrected according to the number of images in which a specific person is shown. For this purpose, weighting is performed so that the first image evaluation value for the person becomes higher as the number of images that include a specific person becomes larger and the first image evaluation value for the person becomes lower as the number of the images that include the specific person becomes smaller.

Table 3 is an example of a weighting table. In Table 3, a maximum value represents a maximum value of images in which the same person is shown among images to be made public, and is "6", for example.

TABLE 3

| | | Number of sheets | | | | | |
|---|---|---|---|---|---|---|---|
| | 1 | Maximum value × 1/6 | Maximum value × 2/6 | Maximum value × 3/6 | Maximum value × 4/6 | Maximum value × 5/6 | Maximum value |
| Weighting coefficient | ×20 | ×18 | ×15 | ×10 | ×5 | ×3 | ×1 |

It is assumed that the first image evaluation value for each person is calculated for each image.

Table 4 shows a first image evaluation value for each image of "Taro SATO".

TABLE 4

| | Evaluation parameter | | | | | | |
|---|---|---|---|---|---|---|---|
| Image filename | Focus | Face size | Spread | Facial expression | Number of persons | Score | Normalized to total 100 points | Weighting depending on the number of sheets (first image evaluation value) |
| 0022.jpg | 10 | 8 | 8 | 8 | 5 | 40 | 20 | 20 |
| 0019.jpg | 5 | 3 | 4 | 5 | 6 | 25 | 12.5 | 12.5 |
| 0021.jpg | 8 | 8 | 5 | 5 | 5 | 34 | 17 | 17 |
| 0013.jpg | 8 | 8 | 10 | 8 | 8 | 46 | 23 | 23 |
| 0020.jpg | 4 | 5 | 5 | 3 | 4 | 26 | 13 | 13 |
| 0018.jpg | 5 | 5 | 5 | 3 | 5 | 29 | 14.5 | 14.5 |

Table 4 shows a first evaluation image obtained from "Taro SATO" for six images of image file names "0022.jpg", "0019.jpg", "0021.jpg", "0013.jpg", "0020.jpg", and "0018.jpg". Here, it is assumed that "Taro SATO" is shown in the six images. With respect to "Taro SATO", for example, a raw score of the first image evaluation value of the file name "0022.jpg" is "40", and raw scores of the other first image evaluation values are also shown. Scores obtained by normalizing these raw scores and weighting the normalized raw scores are respective first image evaluation values for "Taro SATO". Since "Taro Sato" appears in six images (the same number of images as the maximum value defined in the weighting table), a weighting coefficient is "×1" of the maximum value, and a first image evaluation value after correction based on the weighting coefficient becomes equal to the normalized raw score. In a case where the weighting coefficient is "×1", the first image evaluation value after correction based on the weighting coefficient and the normalized raw score become different from each other. As described above, it is preferable to correct the first image evaluation value by the CPU 2 (correcting unit) using the correction coefficient using a weighting coefficient (correction coefficient) for setting the first image evaluation value to is larger as the number of images in which the same person is included is smaller and setting the first image evaluation value to become smaller as the number of images in which the same person is included is larger.

With respect to a person with another name, in addition to "Taro SATO", similarly, an image evaluation value for the person is calculated for each image.

Table 5 shows, for six images in which "Taro SATO" is included, first image evaluation values for persons included in the six images, and shows a second image evaluation value that is a total image evaluation value for one image (the second image evaluation value corresponds to a total image evaluation value of the invention).

TABLE 5

| | Name | | | | | |
|---|---|---|---|---|---|---|
| Image file name | Taro SATO | Haruko SUZUKI | Hanako ITO | Jiro TANAKA | Ichiro WATANABE | Sum (second image evaluation value) |
| 0022.jpg | 20 | 200 | | | | 220 |
| 0019.jpg | 12.5 | | 50 | | | 62.5 |
| 0021.jpg | 17 | 150 | | 200 | | 367 |
| 0013.jpg | 23 | | 40 | | | 63 |
| 0020.jpg | 13 | 200 | 60 | 150 | 600 | 1023 |
| 0018.jpg | 14.5 | | | | 400 | 414.5 |

It can be understood that the image of the image file name "0022.jpg" includes "Hanako SUZUKI" in addition to "Taro SATO", the image of the image file name "0019.jpg" includes "Haruko ITO" in addition to "Taro SATO", the image of the image file name "0021.jpg" includes "Haruko SUZUKI" in addition to "Taro SATO", the image of the image file name "0013.jpg" includes "Hanako ITO" in addition to "Taro SATO", the image of the image file name "0020.jpg" includes "Haruko SUZUKI", "Hanako ITO", "Jiro TANAKA", and "Ichiro WATANABE" in addition to "Taro SATO", and the image of the image file name "0018.jpg" includes "Ichiro WATANABE" in addition to "Taro SATO".

For example, the first image evaluation value of the image of the image file name "0022.jpg" is "20" for "Taro SATO", but is "200" for "Haruko SUZUKI", and the second image evaluation value that is the total image evaluation value of the image of the image file name "0022.jpg" is "220" that is the sum of "20" that is the first image evaluation value for "Taro SATO" and "200" that is the first evaluation value for "Haruko SUZUKI". Similarly, with respect to the other images, it can be understood that the second image evaluation value of the image of the image file name "0019.jpg" is "62.5", the second image evaluation value of the image of the image file name "0021.jpg" is "367", the second image evaluation value of the image of the image file name "0013.jpg" is "63", the second image evaluation value of the image with the image file name "0020.jpg" is "1023", and the second image evaluation value of the image of the image file name "0018.jpg" is "414.5". Accordingly, among the six images, the image of the image file name "0020.jpg" having the highest second image evaluation value has the highest importance as the image, and the image of the image file name "0019.jpg" having the lowest second image evaluation value has the lowest importance as the image. In this way, it is preferable to add up the first image evaluation values that are different for each person included in the image for each image, and calculating the sum obtained by the addition by the CPU 2 (second image evaluation value calculating unit) to set the sum as the second image evaluation value. The second image evaluation value may be calculated by any calculation method in which the second image evaluation value is larger as the first image evaluation value is larger on the basis of the first image evaluation value that is calculated for each person who appears in an image, and may be calculated by the sum of the first image evaluation values after weighting. For example, with respect to image groups in events in which entire children participate, taking into account the number of opportunities for future photography, large weights may be given to the first image evaluation values for children at higher grades (accordingly, small weights may be given for children at lower grades), and thus, the second image evaluation value may be calculated by the sum of the first image evaluation values.

In this embodiment, in a case where private images are determined from the six images, images having the low second image evaluation values are preferentially determined as private image candidates (non-extraction image candidates), and in a case where public images are determined therefrom, images with the high second image evaluation values are preferentially determined as public image candidates (extraction image candidates). In a case where an image is changed to be made public or private, the first image evaluation value and the second image evaluation value are calculated again.

In the above-described embodiment, in a case where an image includes a plurality of face image portions, the sum of evaluation values of the face image portions may be calculated, and the calculated sum may be used as a total image evaluation value. For example, referring to FIG. 5, it is assumed that the image of the image file name "0022.jpg" includes a face image portion with the name "Taro SATO" and an evaluation value of the face image portion is "20". Further, it is assumed that the image of the image file name "0022.jpg" includes a face image portion with the name "Haruko SUZUKI" and an evaluation value of the face image portion is "200". The sum of the evaluation values of the face image portions may be calculated, and the sum "220" of the obtained evaluation values may be used as the total image evaluation value.

In a case where an arrow button of the left arrow button 92 or the right arrow button 93 is clicked (YES in step 43 of FIG. 4), designation of an image is changed in accordance with the click of the left arrow button 92 or the right arrow button 93 (step 44 of FIG. 4). The numeral of the image specifying number 94 is also changed.

Figure 12:
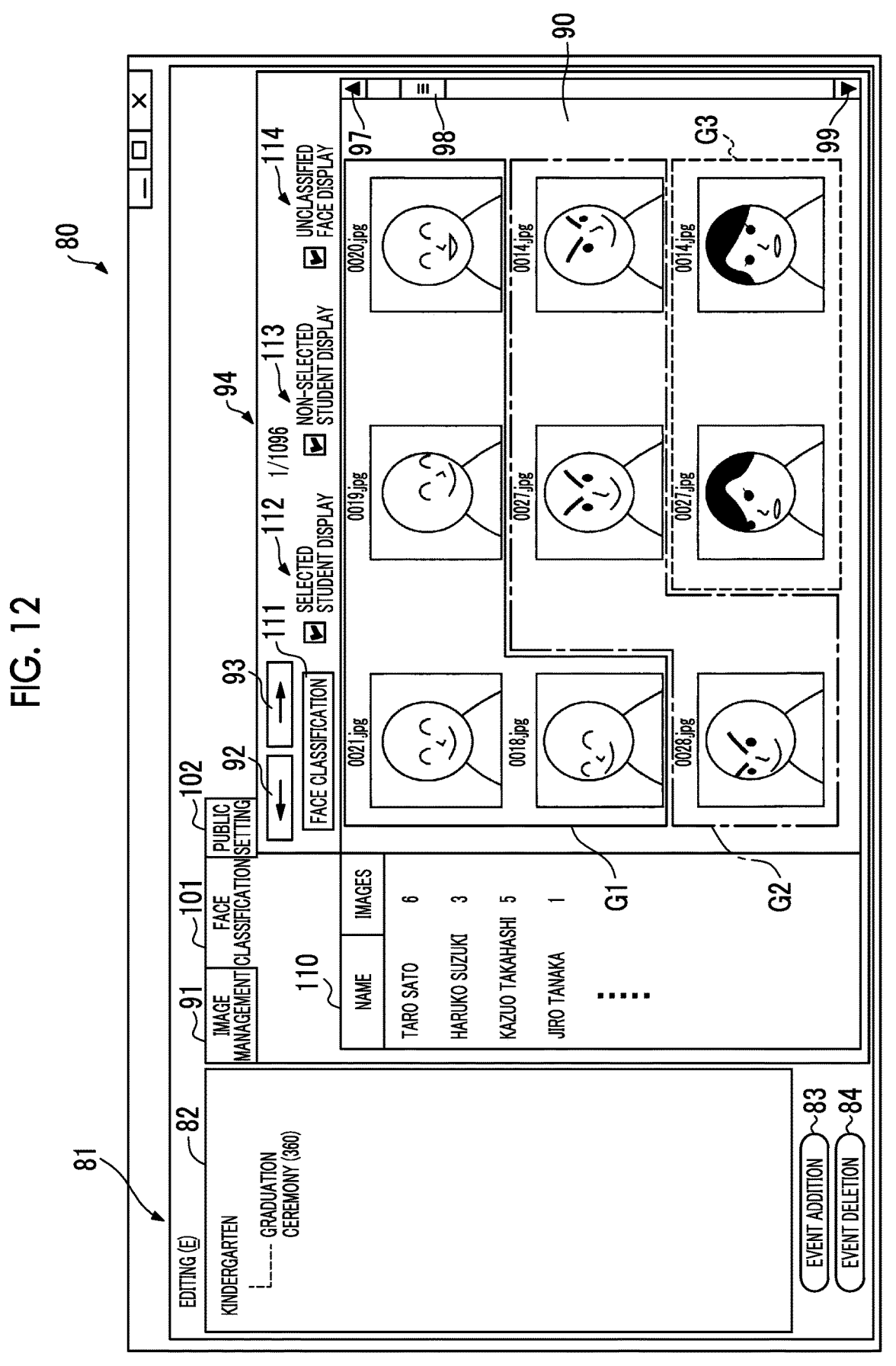

In a case where the face classification button 111 is clicked (YES in step 45 of FIG. 4), the face image portions are classified and displayed for each person as shown in FIG. 12 (step 46 of FIG. 4).

Referring to FIG. 12, a face image group G1 includes a face image portion included in the image with the image file name "0021.jpg", a face image portion included in the image with the image file name "0019.jpg", a face image portion included in the image with the image file name "0020.jpg", and a face image portion included in the image with the image file name "0018.jpg". The face image group G1 also includes a face image portion included in the image with the image file name "0022.jpg" and a face image portion included in the image with the image file name "0013.jpg", which are not shown in FIG. 12. The face image group G1 includes the face image portions of "Taro SATO".

Further, a face image group G2 includes a face image portion included in an image with an image file name "0027.jpg", a face image portion included in the image with the image file name "0014.jpg", and a face image portion included in an image with an image file name "0028.jpg". The face image portions included in the face image group G2 also represent the same person. Similarly, a face image group G3 includes a face image portion included in the image with the image file name "0027.jpg" and a face image portion included in the image with the image file name "0014.jpg". The face image portions included in the face image group G3 also represent the same person.

Similar to the image display window 80 in the state shown in FIG. 11, on the image display window 80 in the state shown in FIG. 12, in a case where a name displayed in the subject list area 110 is clicked (YES in step 39 of FIG. 4) and then a face image portion is clicked (step 40 of FIG. 4), the clicked face image portion and the name are associated with each other (step 41 of FIG. 4). Further, in a case where the face image group is classified as shown in FIG. 12, after the name displayed in the subject list area 110 is clicked (YES in step 39 of FIG. 4), as a face image portion included in a certain face image group or an area that is within an area of the certain face image group and is different from the face image portion is clicked, all the face image portions included in the face image group including the clicked portion and names may be associated with each other. The association of all the face image portions included in the face image group with the names may be relatively easily performed.

Further, in a case where the image management tab 91 is clicked (YES in step 47 of FIG. 4), the procedure proceeds to the process shown in FIG. 3. In addition, in a case where the public setting tab 102 is clicked (YES in step 48 of FIG. 4), a public/private setting image as shown in FIG. 13 is displayed on the image display window 80 (step 49 of FIG. 5).

In FIG. 13, the same reference numerals are given to the same objects as those shown in FIGS. 8 to 12.

An image specified by the image specifying number 94 before the public setting tab 102 is clicked is displayed in the image display area 90. In FIG. 13, it is assumed that the image with the image file name "0022.jpg" is specified by the image specifying number 94. The image with the image file name "0022.jpg" is displayed in the image display area 90. The image with the image file name "0022.jpg" includes "Taro SATO" and "Haruko SUZUKI". The face of "Taro SATO" is surrounded by a face frame F1, and the name of "Taro SATO" is displayed above the face frame F1. The face of "Haruko SUZUKI" is surrounded by a face frame F2, and the name of "Haruko SUZUKI" is displayed above the face frame F2.

The public/private information display area 120 is formed on a left side of the image display area 90. Names of subjects are displayed in the public/private information display area 120. Check boxes 121 to 126, and 129 are formed on left sides of the names of the subjects, for example. "Teacher/guardian" is displayed on a right side of the check box 129 as a person name. This is because, in the case of a kindergarten graduation ceremony, since students are leading characters and teachers or guardians are supporting characters, the teachers or guardians are treated as the same person without distinction of persons. As described above, adults such as teachers and guardians may be regarded as the same person, and may be grouped for each image by the CPU 2 (image grouping unit). The teachers and guardians may be separately treated for each person instead of being regarded as the same person. Check boxes of names corresponding to the persons (persons with the names) included in the image displayed in the image display area 90 are checked. In the example shown in FIG. 13, the image displayed in the image display area 90 includes "Taro SATO" and "Haruko SUZUKI". The check box 121 on the right side of the name "Taro SATO" and the check box 122 on the left side of the name "Haruko Suzuki" are checked.

Further, on the right sides of the names of the subjects, the number of sheets in a state of being set to "private" (the number of sheets of non-extraction images) and the number of sheets in a state of being set to "public", among images included in the subject, are displayed in the subject list area 110 of the image display window 80 displayed in the display device 3 (notification unit) under the control of the CPU 2 (display control unit) for each person.

Figure 5:
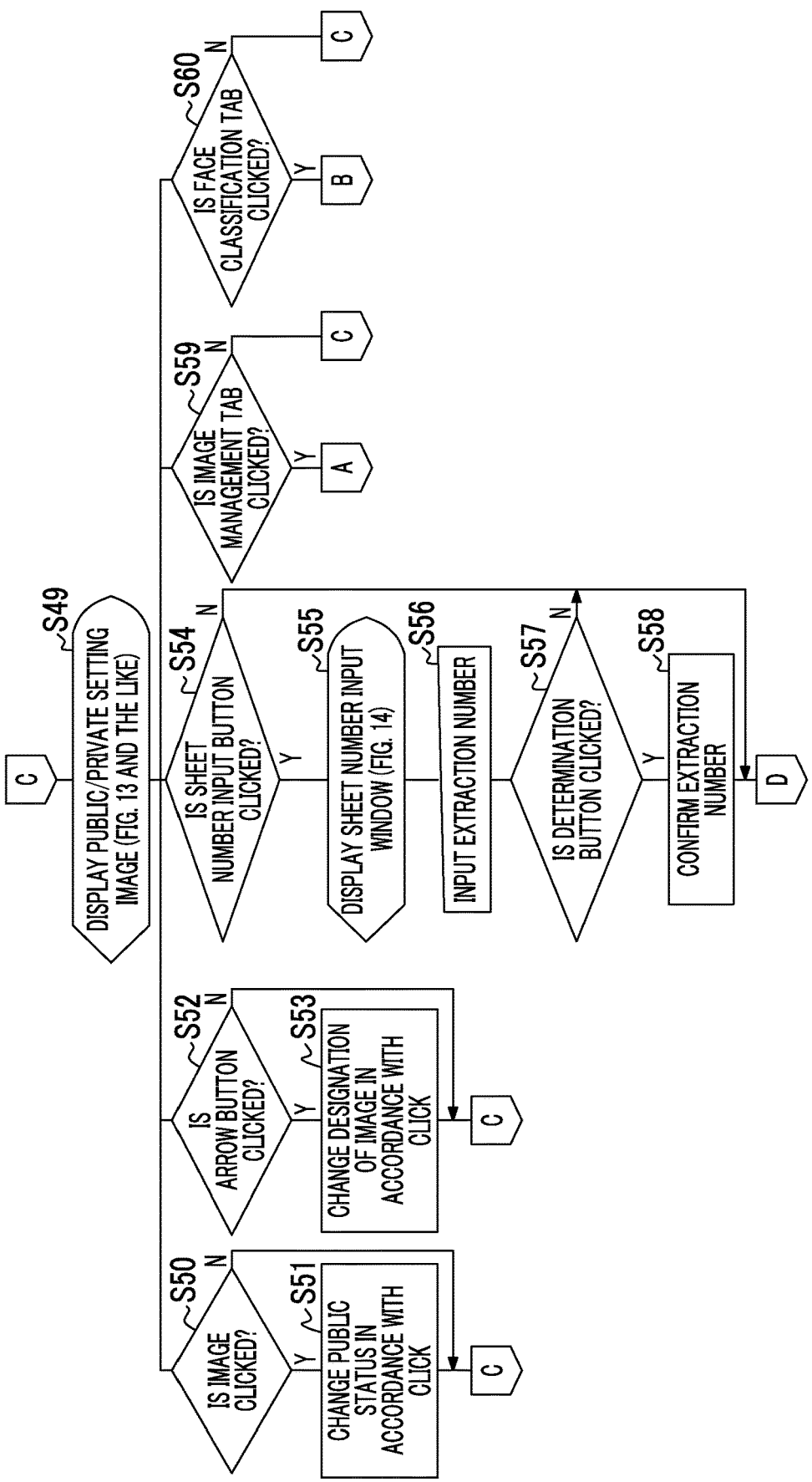
FIG. 5 is a flowchart showing a processing procedure of the image candidate determination apparatus.

In a case where the image displayed in the image display area 90 is clicked (YES in step 50 of FIG. 5), the disclosure status of the clicked image in accordance with the click in a similar way to the process of step 27 of FIG. 3 is changed (step 51 of FIG. 5). In a case where the image is clicked once in a state where the disclosure status of the image is "hold", the disclosure status becomes "public". The number of sheets of "public" of each name of "Taro SATO" and "Haruko SUZUKI" in the public/private information display area 120 is changed from "0" to "1". Further, the number of sheets of "hold" of the name "Sato TARO" is changed from "6" to "5", and the number of sheets of "hold" of the name "Haruko SUZUKI" is changed from "3" to "2". In a case where the image is clicked once more, the disclosure status becomes "private". The number of sheets of "public" of each name of "Taro SATO" and "Haruko SUZUKI" in the public/private information display area 120 returns from "1" to "0", and the number of sheets of "private" of each name thereof is changed from "0" to "1".

In the case of two kinds of "private" and "public" without including "hold" in the disclosure status, whenever the image included in the image display area 90 is clicked once, the disclosure status is switched between "private" and "public", the number of images of "private" and the number of images of "public" that are displayed in the public/private information display area 120 are updated by the CPU 2 for each person included in the image, and are displayed (notified) in the public/private information display area 120 of the image display window 80 displayed in the display device 3 (notification unit).

In a case where any arrow button of the left arrow button 92 or the right arrow button 93 is clicked (YES in step 52 of FIG. 5), the image specifying number 94 decreases or increases so that image designation is changed (step 53 of FIG. 5). In FIG. 13, one image among six images that include "Taro SATO" is displayed on the image display window 80, and the image specifying number 94 becomes "1/6". This is because the public setting tab 102 is clicked in a state where "Taro SATO" is selected in the subject list area 110 included in the image display window 80 shown in FIG. 12. The image displayed in the image display area 90 includes "Taro SATO" and "Haruko SUZUKI". The face of "Taro SATO" is surrounded by the face frame F1, and the name "Taro Sato" is displayed above the face frame F1. Similarly, the face of "Haruko SUZUKI" is surrounded by the face frame F2, and the name "Haruko SUZUKI" is displayed above the face frame F2.

In a case where the right arrow button 93 is clicked in a state where the image display window 80 shown in FIG. 13 is displayed, the image display window 80 shown in FIG. 14 is displayed on the display screen of the display device 3.

Referring to FIG. 14, the image displayed in the image display area 90 includes persons whose names are not determined (face image portions are not associated with names using FIGS. 11, 12, and the like), in addition to names "Taro SATO" and "Hanako ITO". The face of "Taro SATO" is surrounded by the face frame F1, and the name "Taro SATO" is displayed above the face frame F1. Similarly, the face of "Hanako ITO" is surrounded by a face frame F3, and the name "Hanako ITO" is displayed above the face frame F3. Faces of unclassified persons whose names are not determined are surrounded by face frames F. A character string of "unclassified" is displayed above the unclassified face frame F so that it can be understood that the face image portion and the name are not associated with each other. Further, the image specifying number 94 is changed from "1/6" to "2:6" so that it can be understood that the second image among six images that include "Taro SATO" is displayed.

Figure 15:
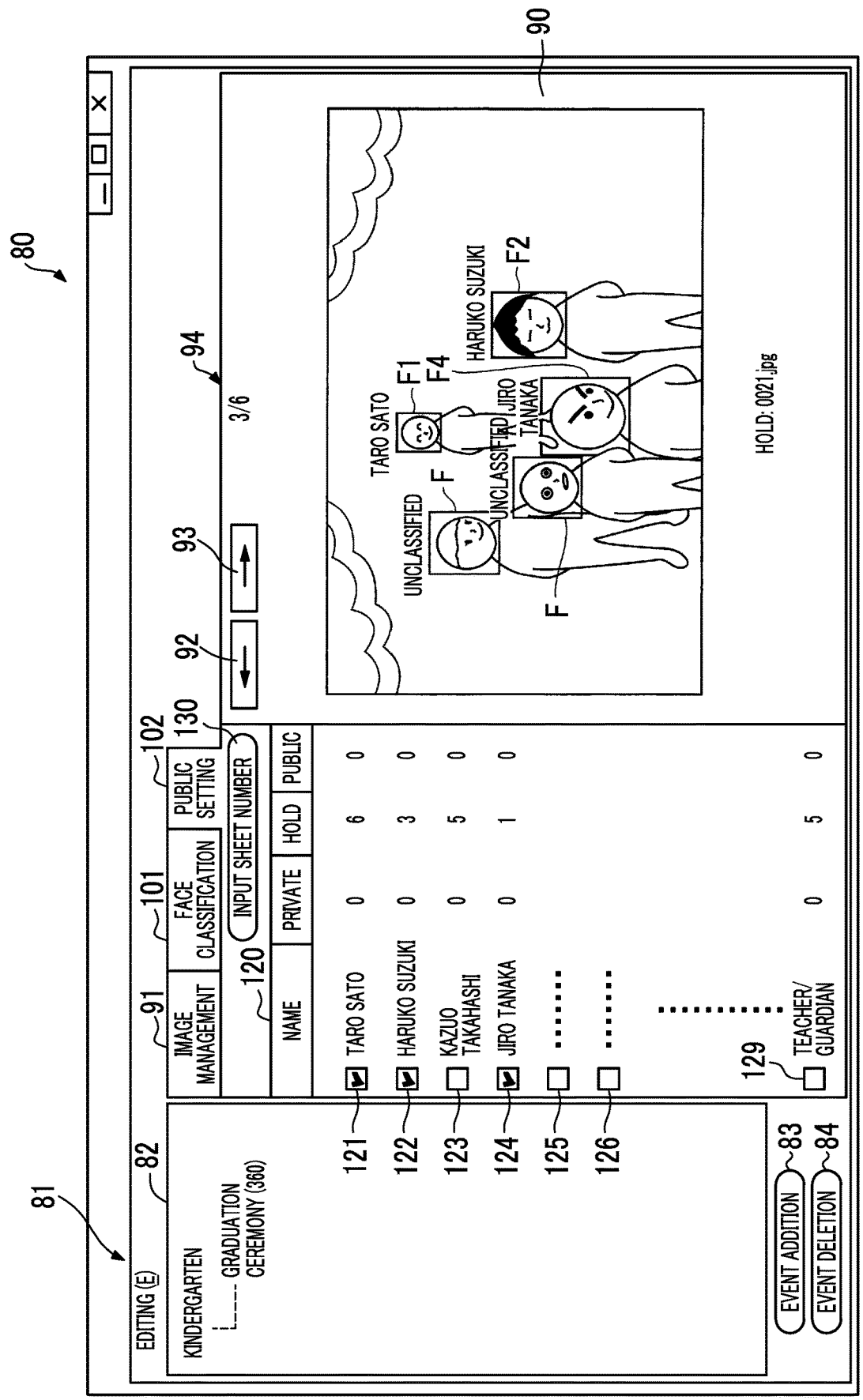
FIG. 15 is a diagram showing an example of an image display window.

In a case where the right arrow button 93 is clicked in a state where the image display window 80 shown in FIG. 14 is displayed, the image display window 80 shown in FIG. 15 is displayed on the display screen of the display device 3.

Referring to FIG. 15, the image displayed in the image display area 90 includes persons whose names are not determined (face image portions and names are not associated with each other using FIGS. 11, 12, and the like), in addition to the names "Taro SATO" and "Hanako ITO". The face of "Taro SATO" is surrounded by the face frame F1, and the name "Taro Sato" is displayed above the face frame F1. Similarly, the face of "Haruko SUZUKI" is surrounded by the face frame F2, the name "Haruko SUZUKI" is displayed above the face frame F2, the face of "Jiro TANAKA" is surrounded by a face frame F4, and the name "Jiro TANAKA" is displayed above the face frame F4. Faces of unclassified persons whose names are not determined are surrounded by face frames F. The character string of "unclassified" is displayed above the unclassified face frames F. Further, the image specifying number 94 is changed from "2/6" to "3/6" so that it can be understood that the third image among six images that include "Taro SATO" is displayed.

Figure 16:
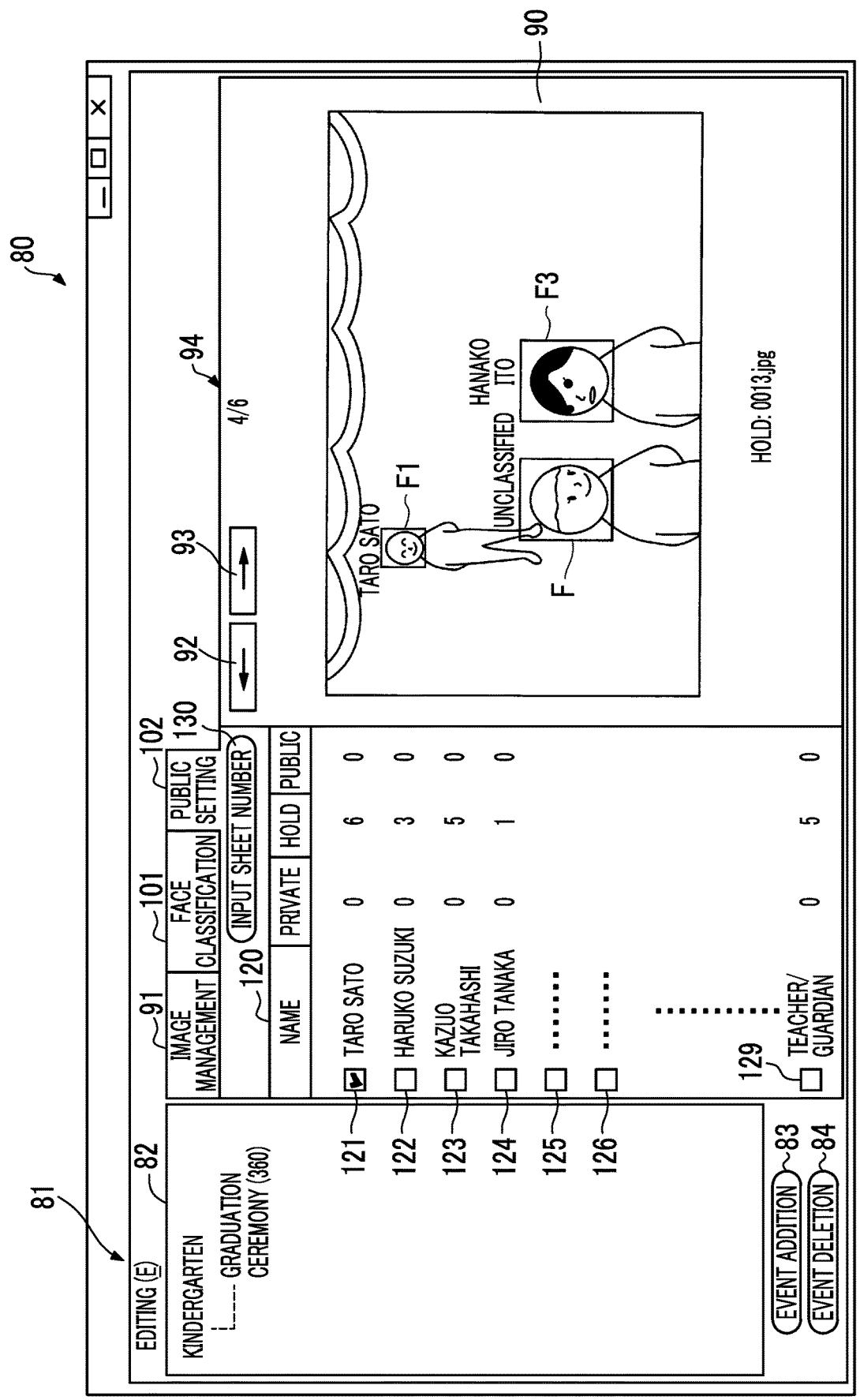
FIG. 16 is a diagram showing an example of an image display window.

In a case where the right arrow button 93 is clicked in a state where the image display window 80 shown in FIG. 15 is displayed, the image display window 80 shown in FIG. 16 is displayed on the display screen of the display device 3.

Referring to FIG. 16, the image displayed in the image display area 90 includes persons whose names are not determined (face image portions and names are not associated with each other using FIGS. 11, 12, and the like), in addition to the names "Taro SATO" and "Hanako ITO". The face of "Taro SATO" is surrounded by the face frame F1, and the name "Taro Sato" is displayed above the face frame F1. Similarly, the face of "Hanako ITO" is surrounded by the face frame F3, and the face of an unclassified person whose name is not determined is surrounded by the face frame F. The character string of "unclassified" is displayed above the unclassified face frames F. Further, the image specifying number 94 is changed from "3/6" to "4/6" so that it can be understood that the fourth image among six images that include "Taro SATO" is displayed.

Figure 17:
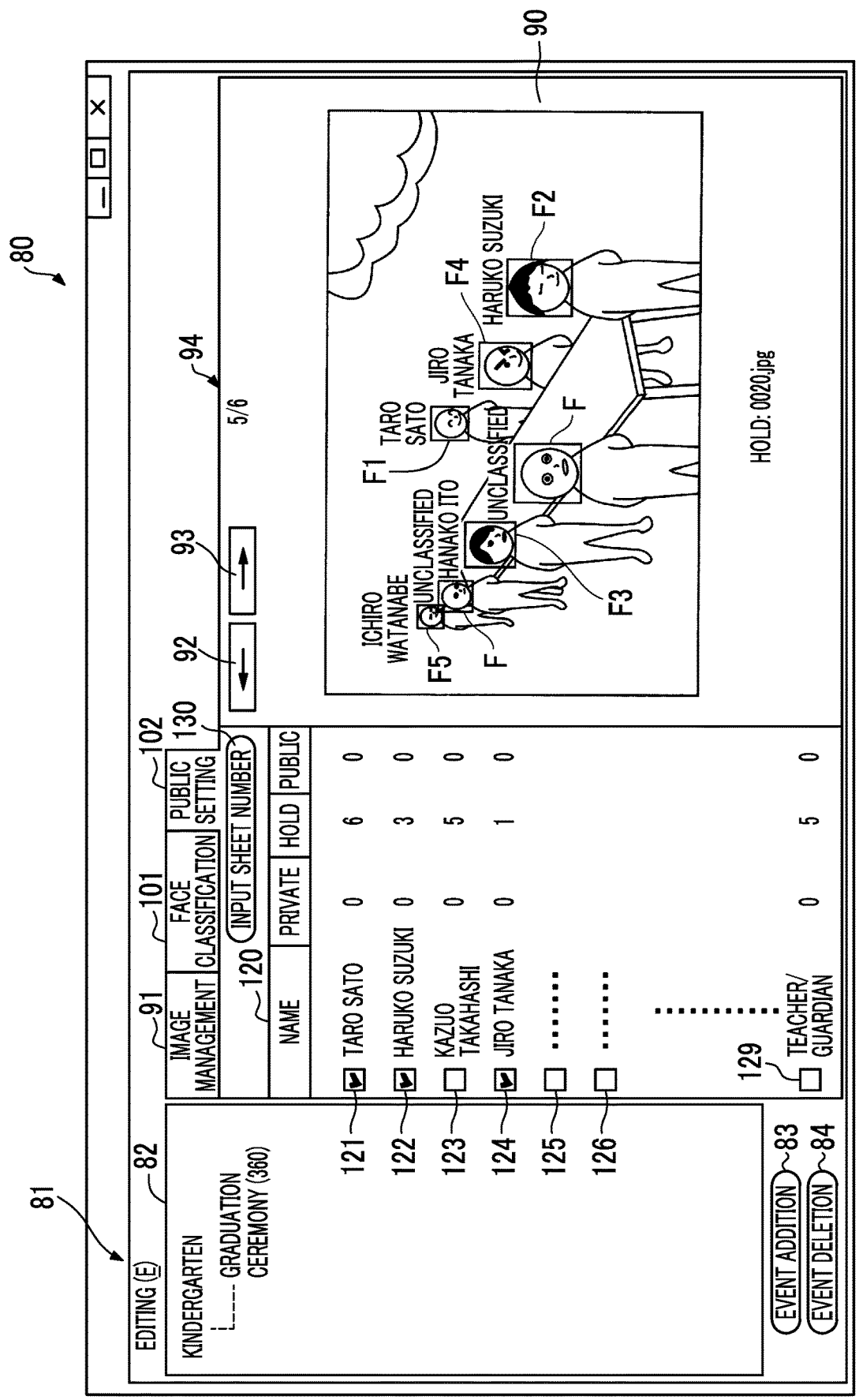
FIG. 17 is a diagram showing an example of an image display window.

In a case where the right arrow button 93 is clicked in a state where the image display window 80 shown in FIG. 16 is displayed, the image display window 80 shown in FIG. 17 is displayed on the display screen of the display device 3.

Referring to FIG. 17, the image displayed in the image display area 90 includes persons whose names are not determined (face image portions and names are not associated with each other using FIGS. 11, 12, and the like), in addition to the names "Taro SATO". "Haruko SUZUKI", "Hanako ITO", and "Jiro TANAKA". The face of "Taro SATO" is surrounded by the face frame F1, and the name "Taro Sato" is displayed above the face frame F1. Similarly, the face of "Haruko SUZUKI" is surrounded by the face frame F2, the face of "Hanako ITO" is surrounded by the face frame F3, and the face of "Jiro TANAKA" is surrounded by the face frame F4, and the face of "Ichiro WATANABE" is surrounded by a face frame F5. Faces of unclassified persons whose names are not determined are surrounded by the face frame F, and a character string of "unclassified" is displayed above the unclassified face frame F. Further, the image specifying number 94 is changed from "4/6" to "5/6" so that it can be understood that the fifth image among six images that include "Taro SATO" is displayed.

In a case where the right arrow button 93 is clicked in a state where the image display window 80 shown in FIG. 17 is displayed, the image display window 80 shown in FIG. 18 is displayed on the display screen of the display device 3.

Referring to FIG. 18, the image displayed in the image display area 90 includes "Taro SATO", "Ichiro WATANABE", and an adult or a guardian. The face of "Taro SATO" is surrounded by the face frame F1, and the name "Taro Sato" is displayed above the face frame F1. Further, the image displayed in the image display area 90 also includes persons whose names are not determined (face image portions and names are not associated with each other using FIGS. 11, 12, and the like). Similarly, the face of "Ichiro WATANABE" is surrounded by the face frame F5, and the face of the adult or guardian is surrounded by a face frame F6. Faces of unclassified persons whose names are not determined are surrounded by face frames F, and the character string of "unclassified" is displayed above the unclassified face frames F. Further, the image specifying number 94 is changed from "5/6" to "6/6" so that it can be understood that the sixth image among six images that include "Taro SATO" is displayed.

In a case where the left arrow button 92 is clicked in a state where the image display window 80 shown in FIG. 18 is displayed, the image displayed before the right arrow button 93 is clicked is displayed in the image display area 90 of the image display window 80 whenever the left arrow button 92 is clicked.

As shown in FIGS. 13 to 18, whenever the right arrow button 93 or the left arrow button 92 is clicked, persons including the name "Taro SATO" may be sequentially displayed in the image display area 90. In any of the images displayed in the image display area 90 of the image display window 80 shown in FIGS. 13 to 18, whenever the image is clicked, the disclosure status is changed in the order of "public", "private" or "hold", and the user may specify whether to make the image displayed in the image display area 90 public or private. With respect to an image that does not include a person including the name "Taro SATO", the user may similarly specify whether to make the image public or private.

For example, as shown in FIGS. 13 to 18, in a case where a name displayed in the subject list area 110 is clicked (selected) in a state where the public setting tab 102 is clicked, an image including a person with the clicked name is displayed in the image display area 90. For example, in a case where "Haruko SUZUKI" among the names displayed in the subject list area 110 is clicked, one image among the images including "Haruko SUZUKI" is displayed in the image display area 90. Since the number of the images including "Haruko SUZUKI" (images in which the name of "Haruko SUZUKI" and the images are associated with each other) is three (this is because the sum of the number of private images, the number of hold images, and the number of public images displayed corresponding to the name of "Haruko SUZUKI" in the subject list area 110 is three), in a case where the right arrow button 93 is clicked in a state where the image of "Haruko SUZUKI" is displayed in the image display area 90, the three images are sequentially displayed in the image display area 90.

Figure 19:
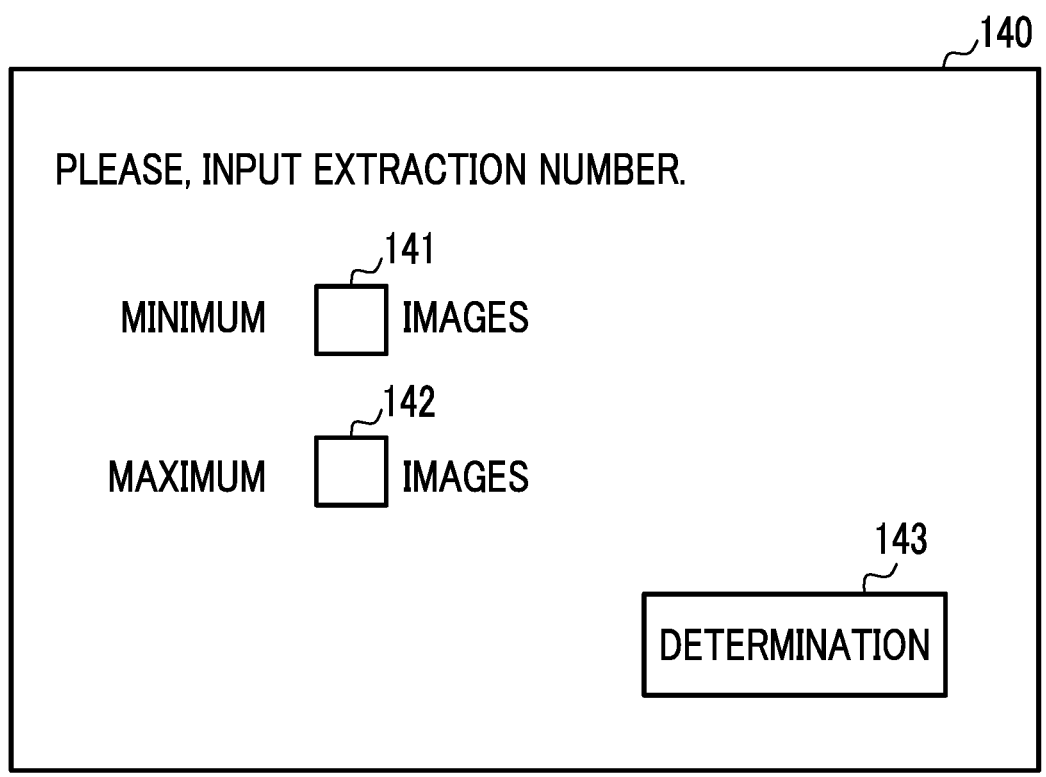
FIG. 19 is a diagram showing an example of an extraction number input window.

In a case where a sheet number input button 130 is clicked (YES in step 54 of FIG. 5), in a state where the image display window 80 is displayed (the image display window 80 may temporarily disappear), a sheet number input window 140 shown in FIG. 19 is displayed on the display screen of the display device 3 (step 55 in FIG. 5).

Referring to FIG. 19, the sheet number input window 140 is a window in which a minimum number and a maximum number of images to be disclosed in images including the same person are input (the minimum number and the maximum number of the images to be disclosed are limit values of an extraction number of images). A character string of "Please, input extraction number." is displayed on the sheet number input window 140, and a minimum sheet number input area 141 and a maximum sheet number input area 142 are formed. By clicking the minimum sheet number input area 141, the minimum number to be disclosed for images including the same person may be input in the minimum sheet number input area 141 through the keyboard 8, and by clicking the maximum sheet number input area 142, the maximum number of images to be disclosed for images including the same person may be input in the maximum sheet number input area 142 through the keyboard 8. On a lower right side of the sheet number input window 140, a determination button 143 in which a character string of "determination" is displayed is formed.

In a case where the minimum number is input in the minimum sheet number input area 141 and the maximum number is input in the maximum sheet number input area 142 (either the minimum number or the maximum number may be input) (step 56 of FIG. 5), and then, the determination button 143 is clicked (YES in step 57 of FIG. 5), an input extraction number (a minimum extraction number and a maximum extraction number) is stored in the memory 7 (step 58 of FIG. 5). The sheet number input window 140 disappears from the display screen of the display device 3.

Figure 6:
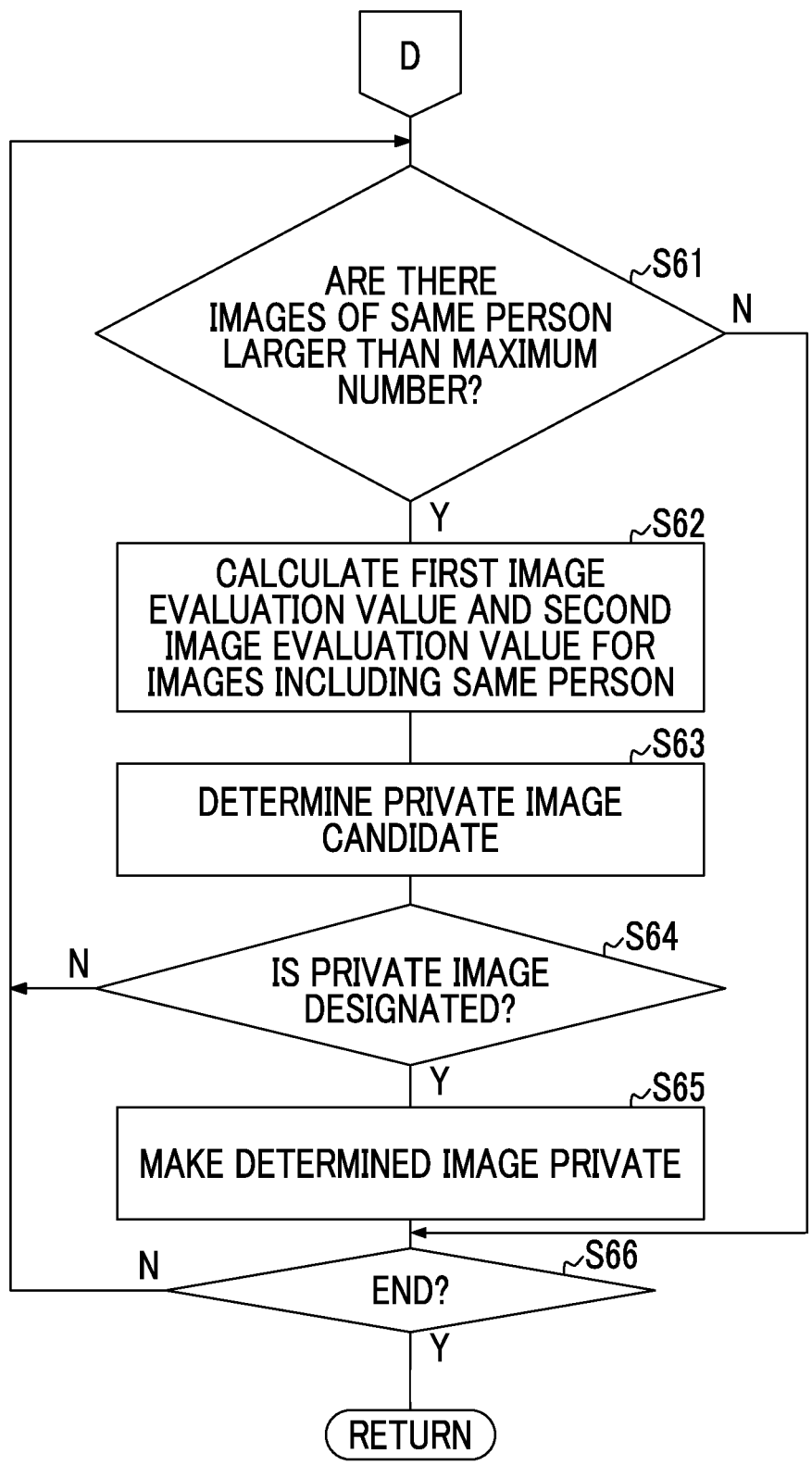
FIG. 6 is a flowchart showing a processing procedure of the image candidate determination apparatus.

The CPU 2 checks whether or not there are images that include the same person, in which the number of images that are made public is greater than the input maximum number (step 61 of FIG. 6). In a case where there are public images of which the number is greater than the input maximum number (YES in step 61 of FIG. 6), the first image evaluation and the second image evaluation value for the images including the same person are calculated by the CPU 2 (step 62 of FIG. 6), and a private image candidate is determined by the CPU 2 (image candidate determination unit) from among the images that are made public to be within the maximum number of images (within the limit value) including the same person (step 63 of FIG. 6).

For example, it is assumed that images including "Taro SATO" are six images including file names "0022.jpg", "0019.jpg", "0021.jpg", "0013.jpg", "0020.jpg", and "0018.jpg". Then, the six second image evaluation values are as shown in Table 5, for example. Further, it is assumed that the input maximum number is 5. Then, one of the six images is determined as a private image candidate by the CPU 2. As can be understood from Table 5, since an image with the lowest second image evaluation value among the second image evaluation values of the six images is an image having the image file name "0019.jpg", the image having the image file name "0019.jpg" is determined as a private image by the CPU 2 (image candidate determination unit). In this way, a private image candidate (non-extraction image candidate) is determined from grouped images based on the second image evaluation value and the limit value of the extraction number of images including the same person.

Conversely, five images among the six images in a descending order of the second image evaluation values may be determined as public image candidates (extraction image candidates) by the CPU 2 (image candidate determination unit). For example, a window containing a character string of "It is recommended that the image with the image file name "0019.jpg" is made private" may be displayed on the display screen together with the image (non-extraction image candidate) having the image file name "0019.jpg" under the control of the CPU 2 (image candidate display control unit). Conversely, the images (extraction image candidates) having the image file names other than the image file name "0019.jpg", among six images having the file names "0022.jpg", "0019.jpg", "0021.jpg", "0013.jpg", "0020.jpg", and "0018.jpg", may be displayed on the display screen together with a character string of "It is recommended that the images are made public" under the control of the CPU 2 (image candidate display control unit). As the user clicks the left arrow button 92 or the right arrow button 93, the image display window 80 in which the image having the image file name "0019.jpg" is displayed in the image display area 90 as shown in FIG. 14 is displayed on the display screen of the display device 3.

In a case where the user confirms the image displayed in the image display area 90 and makes the image private, the user clicks the image to determine the disclosure status to be private by the CPU 2 (image determination unit). Thus, the private image is designated (YES in step 64 and step 65 of FIG. 6). In a case where an end command is not given (NO in step 66), the processes from step 61 are repeated.

In the above-described embodiment, the private image candidate is determined, but instead of determining the private image candidate, the public image candidate may be determined. For example, the images with the image file names "0022.jpg", "0021.jpg". "0013.jpg". "0020.jpg", and "0018.jpg" may be used as public image candidates. In a case where an image to be made public from public image candidates is determined, by clicking the image, the disclosure status is determined to be public by the CPU 2 (image determination unit).

Further, in determining a private image candidate or a public image candidate, in a case where an extraction number of images including a specific person exceeds the maximum number or is smaller than the minimum number as the determined private image candidate is set to be a private image or the determined public image candidate is set to be a public image (in a case where the extraction number of the images including the specific person is out of the limit value as the determined one non-extraction image candidate is set to be a non-extraction image or the determined one extraction image candidate is set to be an extraction image), it is preferable that such an image is excluded from the private image candidates (non-extraction image candidates) or the public image candidates (extraction image candidates) under the control of the CPU 2 (image candidate stopping unit). For example, in Table 5, in a case where the image with the image file name "0019.jpg" is determined as a private image as described above, the number of public images of a specific person (for example, "Hanako ITO") is smaller than the minimum number, it is preferable that the image with the image file name "0019.jpg" is not determined as a private image candidate, and instead, another image is determined as a private image candidate, or it is preferable that the image with the image file name "0019.jpg" is determined as a public image.

In a case where the end command of the program is not given to the image candidate determination apparatus 1 (NO in step 66 of FIG. 6), the processes from step 61 of FIG. 6 are repeated. In a case where there are still images that are public images, in which the number of images including the same person is larger than the maximum number (YES in step 61 of FIG. 6), an image evaluation value for such an image is calculated again (step 62 of FIG. 6).

In a case where there is no image that is made public, in which the number of images including the same person is larger than the maximum number (NO in step 61 of FIG. 6), the procedure is finished.

In the above-described embodiment, a state where a group of images capable of being used as public images after an event is ended is settled is assumed. However, the above-described processes may be performed in real time during the event to image a person with a small number of images. In this case, in the process of step 61 of FIG. 6 (NO in step 61), in a case where there are no images in which the number of images including the same person is larger than the input maximum number, the procedure proceeds to the process of step 67 shown in FIG. 7.

Figure 7:
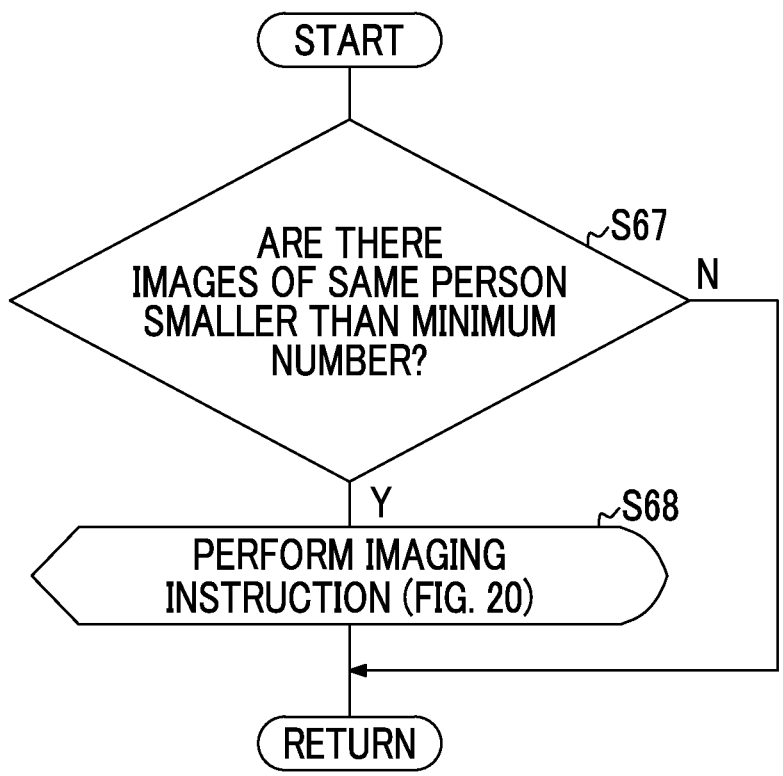
FIG. 7 is a flowchart showing a processing procedure of the image candidate determination apparatus.

In the process of step 67 shown in FIG. 7, it is confirmed whether or not there are images that are public images, in which the number of images including the same person is smaller than the minimum number (step 67 of FIG. 7). In a case where there are images in which the number of images including the same person is smaller than the minimum number (YES in step 67 of FIG. 7), an imaging instruction window 150 shown in FIG. 20 is displayed on the display screen of the display device 3 (step 68 of FIG. 7). That is, such a person that the number of the same person included in one or more grouped images is equal to or smaller than a threshold is detected by the CPU 2 (person detection unit), and an imaging instruction for the person is performed by the CPU 2 (imaging instruction unit).

Referring to FIG. 20, an imaging instruction window 150 prompts the user to image a person whose number of captured images is smaller than the minimum number.

In the imaging instruction window 150, a character string of "Images of ○○ are insufficient" (a name of a person whose number of images is insufficient is written in ○○) to inform the user of the name of the person whose number of images is insufficient is displayed, and also, a character string of "Please take one to five more photos" to inform the user of the number of insufficient images (in which the number of insufficient images varies depending on situations, but it is preferable that the number of images after imaging is equal to or larger than the input minimum number and is equal to or smaller than the input maximum number) is displayed. On a lower right side of the imaging instruction window 150, a confirm button 151 in which "confirm" is displayed is formed. In a case where the user confirms how many images are insufficient, the user clicks the confirm button 151. Then, the imaging instruction window 150 disappears from the display screen of the display device 3.

In a case where there are no images in which the number of images including the same person is smaller than the minimum number of imaging (NO in step 67 of FIG. 7), the display of the imaging instruction window 150 shown in FIG. 20 is skipped.

In a case where a program end command is given to the image candidate determination apparatus 1 (YES in step 66 of FIG. 6), the program ends (YES in step 66 of FIG. 6), and in a case where the program end command is not given (NO in step 66 of FIG. 6), the processes from step 61 in FIG. 6 are repeated. However, in a case where the end command is not given (NO in step 66 of FIG. 6), the procedure may return to step 49 of FIG. 5.

In a case where the public private setting image is displayed (step 49 in FIG. 5), and in a case where the image management tab 91 is clicked (YES in step 59 of FIG. 5), the processes from step 25 in FIG. 3 are performed. Further, in a case where the public/private setting image is displayed (step 49 of FIG. 5), and in a case where the face classification tab 101 is clicked (YES in step 60 of FIG. 5), the processes from step 38 in FIG. 4 are performed.

In the above-described embodiment, in a case where the program end determination process in step 66 of FIG. 6 and the program end determination process in FIG. 7 are performed, the image candidate determination program ends, but in other processes, similarly, in a case where the end command is given to the image candidate determination apparatus 1, the image candidate determination program ends in accordance with interruption of the end command.

Further, in the above-described embodiment, a configuration in which image data representing a plurality of images stored in the memory card 13 is read by the memory card reader/writer 12 is shown, but a configuration in which image data representing a plurality of images is stored in a database server different from the image candidate determination apparatus 1 and the images represented by the image data transmitted from the database server through communication of the database server and the image candidate determination apparatus 1 are displayed on the display screen of the display device 3 of the image candidate determination apparatus 1 as described above may be used.

Further, in the above-described embodiment, a configuration in which image data recorded on the memory card 13 is read is shown, but a configuration in which in a case where the communication device 4 of the image candidate determination apparatus 1 is able to communicate with a digital camera (not shown) by a wireless communication unit, image data representing images captured using the digital camera are transmitted from the digital camera to the image candidate determination apparatus 1 to perform the above-described processes may be used. Similarly, a configuration in which image data representing images captured by a smartphone is transmitted from the smartphone to the communication device 4 of the image candidate determination apparatus 1 to perform the above-described processes may be used. A configuration in which image data representing images captured by a digital camera or a smartphone is transmitted to the image candidate determination apparatus 1 in real time to perform the above-described processes during imaging may be used. Further, a configuration in which the image data representing the images captured by the digital camera or the smartphone is transmitted to the image candidate determination apparatus 1 after all imaging ends may be used.

Further, in the above-described embodiment, a configuration in which in calculating a raw score of the first image evaluation value, an evaluation value related to the face such as a face size score or an expression score or an evaluation value related to a factor other than the face such as a person number score or an image quality score are used is shown, but a configuration in which only the evaluation value related to the face is used as the raw score of the first image evaluation value, or a configuration in which only the evaluation value related to the factor other than the face is used as the raw score of the first image evaluation value may be used.

Further, in the above-described embodiment, a configuration in which the user associates a face image portion with a name while the user views the face image portion is shown, but a configuration in which the user associates the face image with the name of the person of the face in advance, performs comparison with the face image associated with the name to automatically determine whose the face is, and associates the face image portion with the name may be used. In addition, in the above-described embodiment, a configuration in which name association is performed using a face image portion is shown, but a configuration in which in a case where a person has a name tag, the user confirms the name tag instead of the face image portion to associate the face image portion with the name, or a configuration in which the name written on the name tag is automatically analyzed to associate the face image portion with the name may be used.

FIGS. 21 to 26 show modification examples.

Figure 21:
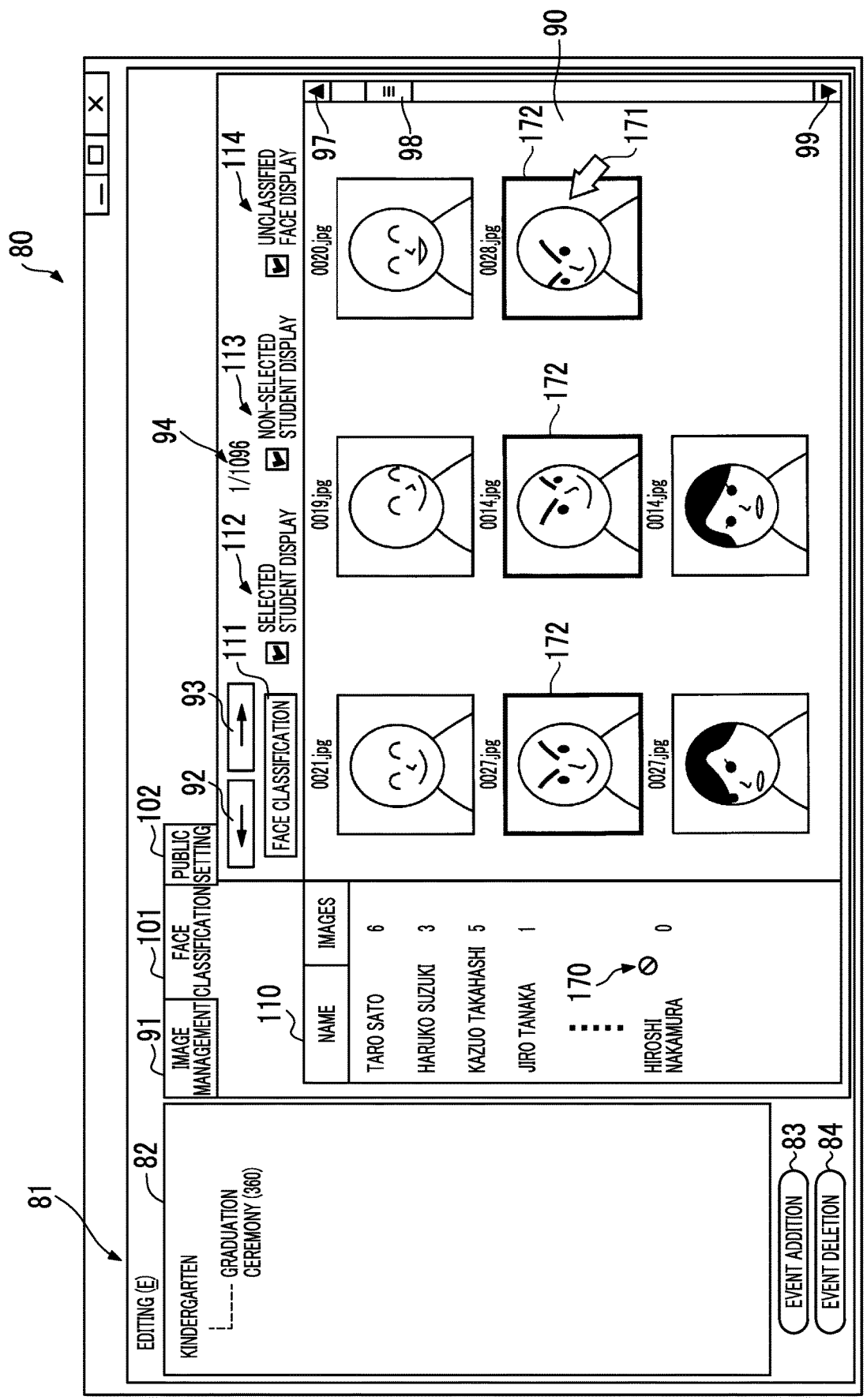
FIG. 21 is a diagram showing an example of an image display window.
Figure 22:
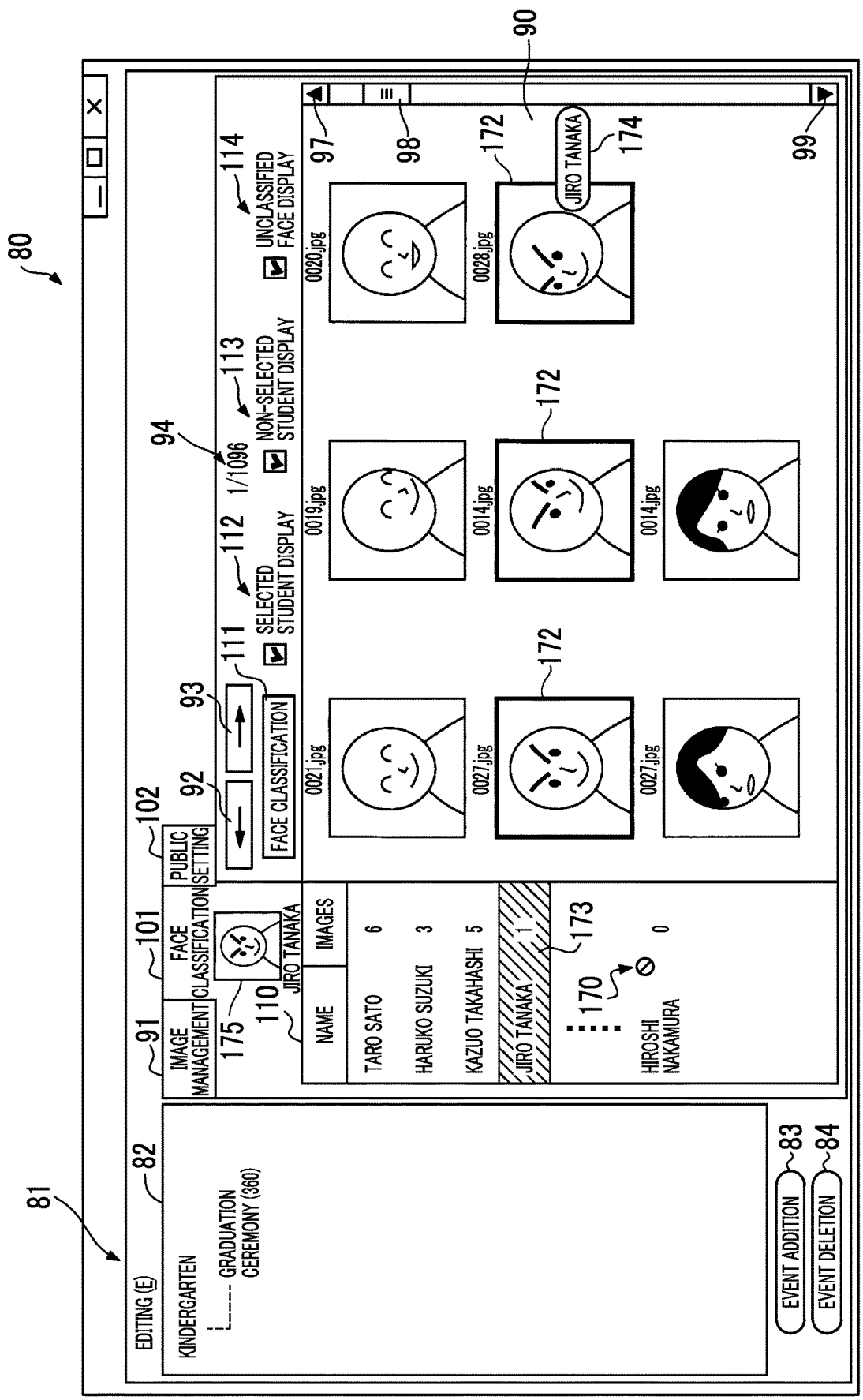
FIG. 22 is a diagram showing an example of an image display window.
Figure 23:
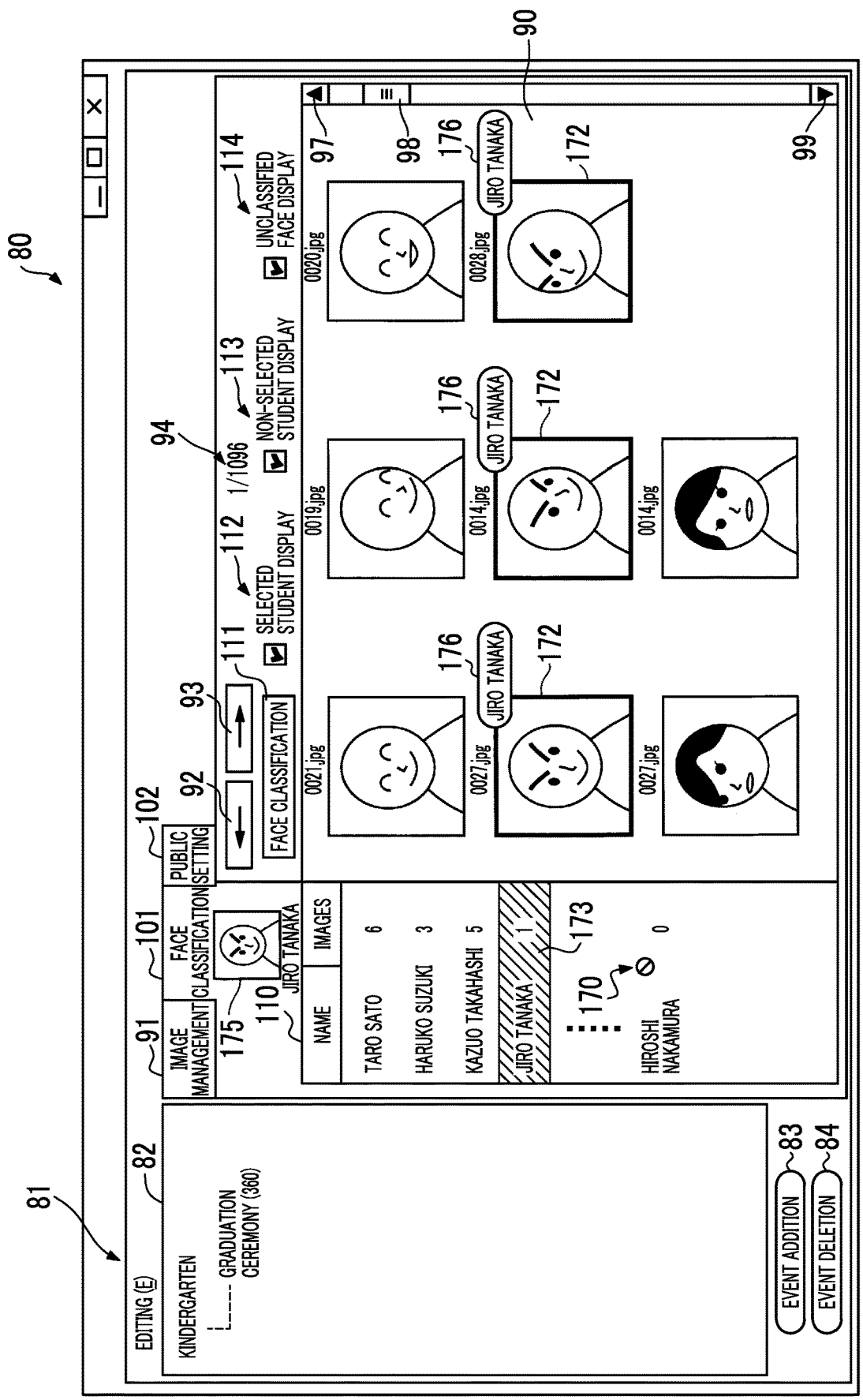
FIG. 23 is a diagram showing an example of an image display window.

FIGS. 21 to 23 are diagrams showing examples of the image display window 80. FIGS. 21 to 23 correspond to the image display window 80 of FIG. 11 or the like, the same reference numerals are given to the same objects, and description thereof will not be repeated. In FIGS. 21 to 23, a plurality of face images of the same person and a name are collectively associated with each other.

The user selects images to be collectively associated with a name using the mouse 9. Specifically, the user drags a cursor 171 on face images to be collectively associated with a name using the mouse 9. Then, a frame of the selected images becomes a thick frame 172. In FIG. 21, it is shown that three images in the second line (central line) are selected from images displayed in three lines in the image display area 90.

Subsequently, the name of the selected face images is selected by the user from names displayed in the subject list area 110. Here, it is assumed that the name of the selected face images is "Jiro TANAKA" and "Jiro TANAKA" is selected. Then, a color around the selected name "Jiro TANAKA" is changed.

FIG. 22 shows a state where the vicinity of the selected name "Jiro TANAKA" is changed. In FIG. 22, the vicinity of the name "Jiro TANAKA" is indicated by hatching 173, so that the vicinity of the selected name "Jiro TANAKA" is changed. Further, a representative face image 175 (registered in advance) of the selected "Jiro TANAKA" is displayed on the subject list area 110. The user compares the representative face image 175 with the face image selected from the face images displayed in the image display area 90, to thereby confirm whether they are the same person. Subsequently, the user moves the cursor 171 on the selected name "Jiro TANAKA", and drags the cursor 171 on the selected image. Then, the cursor 171 is temporarily changed to a name display area 174 indicating the selected name "Jiro TANAKA". Then, as shown in FIG. 23, a name display area 176 is displayed on each of the selected images.

In FIGS. 21 to 23, a prohibit mark 170 is given to a name of a person who is prohibited from being made public among the names displayed in the subject list area 110. By viewing the prohibit mark 170, it is possible to prevent the name from being accidentally made public.

Further, in FIGS. 21 to 23, images are recognized as face images, but in the case of images in which faces are too sideways or face images are burred, "flags such as "too sideways", "too blurry", "unsuitable for public" may be added to the images. In selecting an image to be disclosed, it is possible to determine whether the image is to be made public or private with reference to such a flag.

Further, the images displayed in the image display area 90 in FIGS. 21 to 23 may be displayed in the order of the number of appearances and the order of imaging times points so that the images are displayed on an upper side as the number of appearances of a subject is larger, and is displayed on a left side as the imaging time point is earlier.

Figure 24:
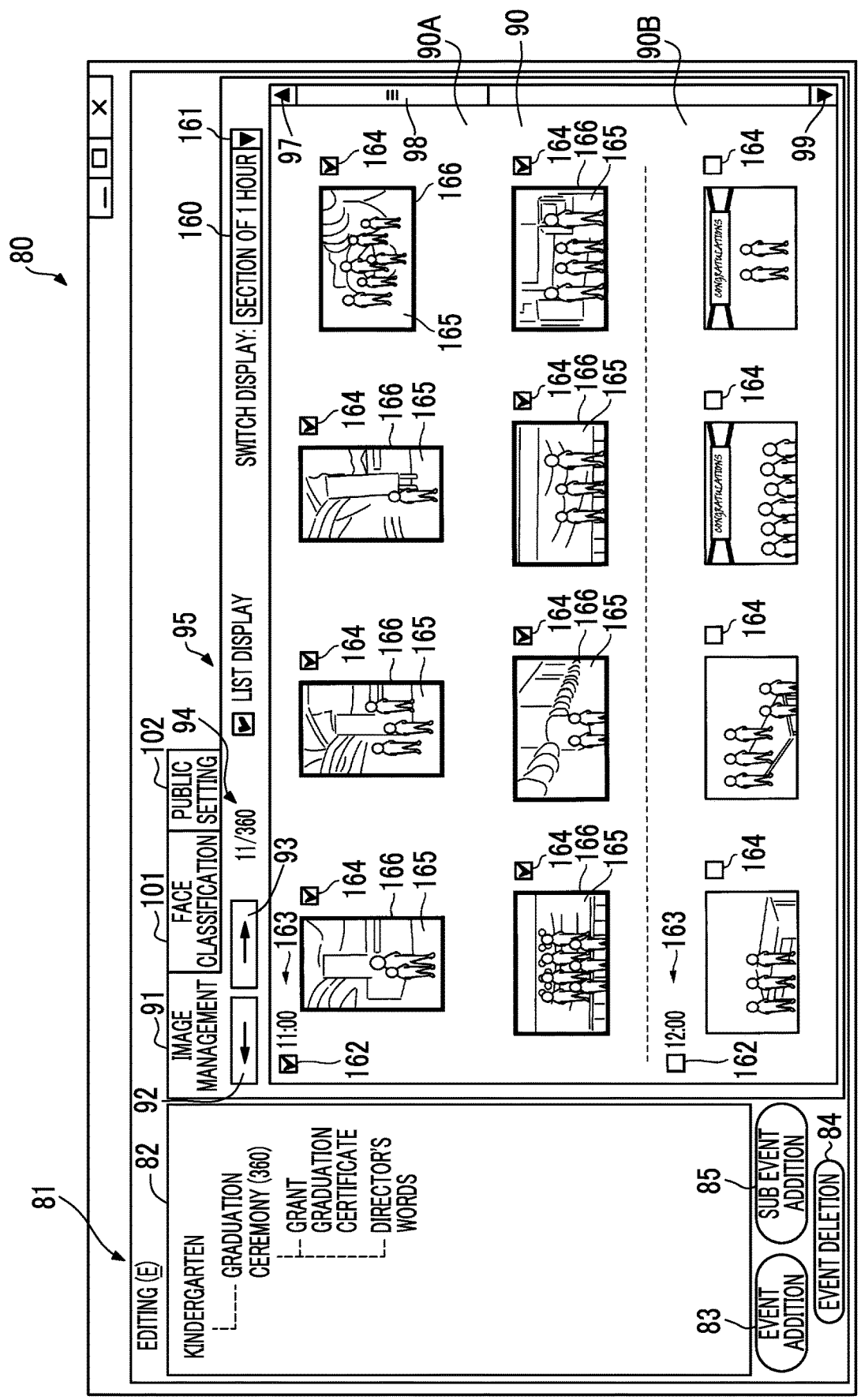
FIG. 24 is a diagram showing an example of an image display window.

FIG. 24 is a diagram showing another example of the image display window 80. In FIG. 24, the same reference numerals are given to the same objects as those shown in FIG. 8 or the like, and description thereof will not be repeated.

In an event management area 82, a sub event of "graduation certificate grant" and a sub event of "director's words" are generated below the event "graduation ceremony". Images managed as the event "graduation ceremony" are managed as sub events such as "graduation certificate grant" and "director's words". Further, a sub event addition button 85 in which a string of "add sub event" is included is formed on a right side of an event addition button 83.

For example, in a case where the sub event addition button 85 is clicked after the string of "graduation ceremony" is clicked, a sub event input window appears on the image display window 80, and the user inputs a new sub event using the sub event input window. At that time, in a case where the user inputs the character string of "graduation certificate grant" using the keyboard 8, the character string of "graduation certificate grant" is displayed below the character string of "graduation ceremony". Similarly, a character string of "director's words" is displayed below the character string of "graduation ceremony".

As the images managed as the event of "graduation ceremony" are dragged and dropped in the image display area 90 in a state where the character string of "graduation certificate grant" is clicked, the dragged and dropped images are managed by the event of "graduation certificate grant". In a case where an event deletion button 84 is clicked after a character string indicating a sub event displayed in the event management area 82 is clicked, the sub event specified by the clicked character string and images managed by the sub event are deleted.

The public setting tab 102 is clicked on the image display window 80 shown in FIG. 24, and thus, multiple images 165 managed by the event with the name of "graduation ceremony" are displayed in the image display area 90.

A display switching pull-down 160 is formed on an upper right side of the image display area 90. The display switching pull-down 160 is used in displaying the images in the image display area 90 to be divided according to imaging times or the like. As the pull-down button 161 is clicked, a plurality of time-date display switching menus such as a section of "1 hour" or a section of "2 hours" appear, and a display division is selected therefrom by the user. Images are displayed in the image display area 90 in accordance with the display division designated by the display switching pull-down 160.

It is assumed that the section of 1 hour is selected by the display switching pull-down 160. Then, the image display area 90 is divided every hour. In FIG. 24, a first image display area 90A and a second image display area 90B appear. The first image display area 90A and the second image display area 90B are divided by a broken line, but may be divided by other methods. Areas other than the image display areas 90A and 90B also appear in the image display area 90 by moving a slide bar 98.

A display time 163 displayed in the first image display area 90A is displayed in an upper left portion of the first image display area 90A. In FIG. 24, characters of "11:00" are displayed as the display time 163. Since the display division is the section of 1 hour, images captured at a time slot of 11:00 among images managed by the event or the like displayed in the event management area 82 are displayed in the first image display area 90A.

A check box 162 is formed on a left side of the display time 163, and a check box 164 is formed on an upper right side of an image 165 formed in the first image display area 90A. Both the check boxes 162 and 164 are provided to specify publication of the image. In a case where the check box 162 formed on the left side of the display time 163 is checked, the check box 164 formed on the upper right side of the image 165 (all images 165 displayed in the first image display area 90A) specified by the display time 163 is checked, and publication of the image 165 is designated. In a case where the check box 164 formed on the upper right side of the image 165 is checked, publication of the checked image is designated. In a case where the check box 164 formed on the upper right side of the image 165 is unchecked, the image is set to be private. In a case where the check box 164 is checked, the vicinity of the image 165 is surrounded by a thick frame 166. This is performed to easily distinguish an image for which the check box 164 is checked and an image for which the check box 164 is not checked. Instead, a color of the frame may be changed.

A character string of "12:00" is displayed in the display time 163 of the second image display area 90B, and images 165 captured at a time slot of 12:00 are displayed in the second image display area 90B. The check box 162 is formed on a left side of the display time 163, and the check box 164 is on an upper right side of the image 165. By checking the check box 162 or 164, the checked image is made public in the same manner as described for the images displayed in the first image display area 90A.

Figure 25:
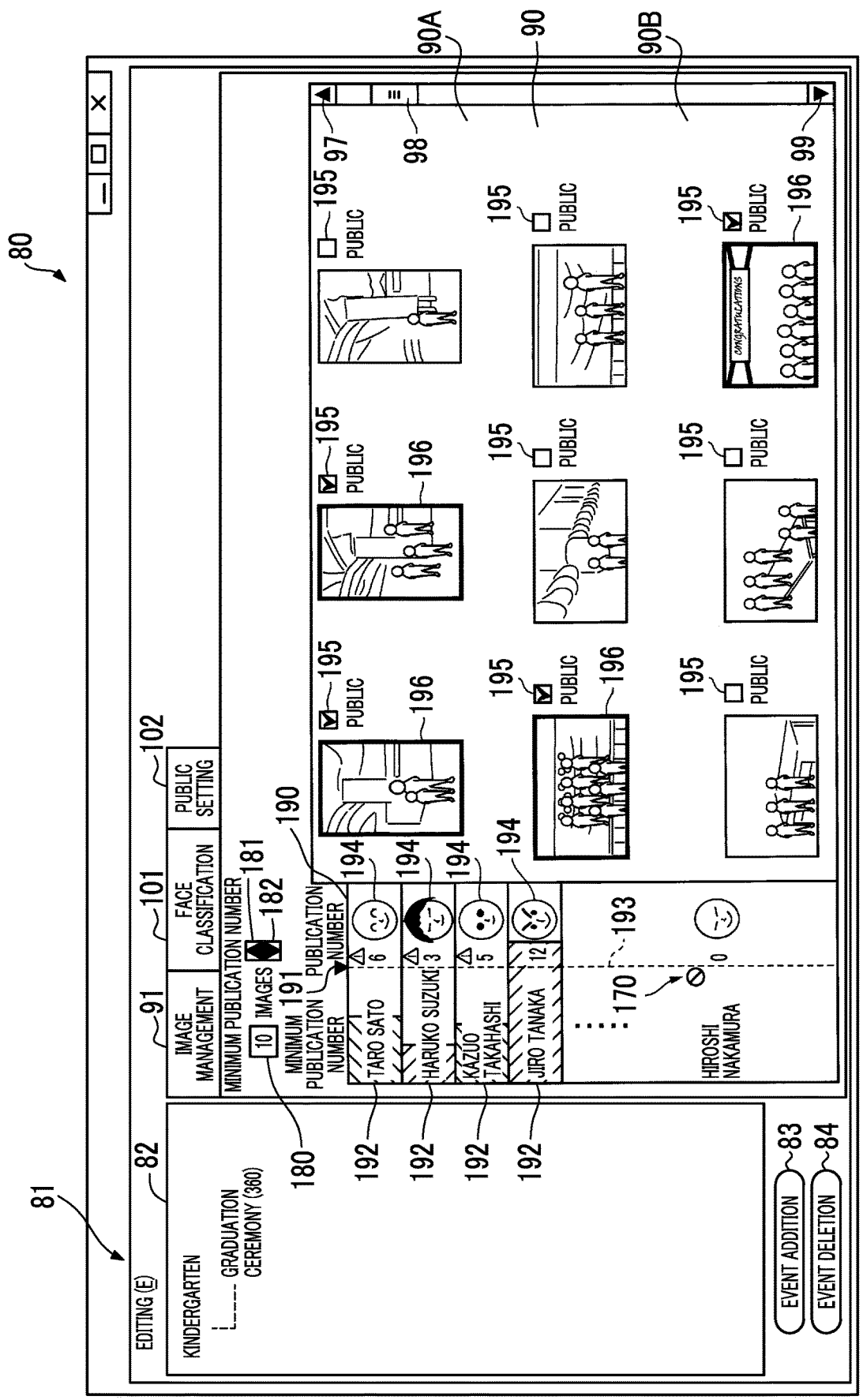
FIG. 25 is a diagram showing an example of an image display window.

FIG. 25 is an example showing another example of the image display window 80. In FIG. 25, the same reference numerals are given to the same objects as those shown in FIG. 8.

The check boxes 195 are also formed on the upper right sides of the images displayed in the image display area 90 of the image display window 80 shown in FIG. 25, and as the check boxes 195 are checked, corresponding images are set to be made public. An image for which the check box 195 is checked is surrounded by the thick frame 196. In a case where the check box 195 is not checked, the image is set to be private.

A minimum publication number setting area 180 is formed on an upper left side of the image display area 90. The minimum publication number setting area 180 is provided to set a minimum number of images to be made public. An up arrow button 181 and a down arrow button 182 are formed on a right side of the minimum publication number setting area 180. Whenever the up arrow button 181 is clicked, a numeral displayed in the minimum publication number setting area 180 is increased one by one, and whenever the down arrow button 182 is clicked, the numeral displayed in the minimum publication number setting area 180 is decreased one by one.

A publication number display area 190 is formed on a left side of the image display area 90. The publication number display area 190 is provided to display the number of images to be made public in correspondence with names of persons included in the images to be made public.

In the publication number display area 190, a name of a subject included in an image (for example, Taro SATO), a publication number (for example, 6), and a representative face image 194 of the subject are displayed. Further, in the publication number display area 190, a mark 191 and a line 193 that serve as a guideline for the minimum publication number set in the minimum publication number setting area 180 are also displayed. In addition, a publication number for each name of a subject is indicated by a bar graph (indicated by hatching) 192.

As the publication number is smaller, the length of the bar graph 192 is shorter, and as the publication number is larger, the length of the bar graph 192 is longer. As the bar graph 192 extends further rightward, it shows that the publication number is greater. In a case where a right end of the bar graph 192 does not exceed the line 193, the publication number of subject indicated by the bar graph 192 does not reach the minimum publication number, in a case where the right end of the bar graph 192 reaches the line 193, the publication number of the subject indicated by the bar graph 192 matches the minimum publication number, and in a case where the right end of the bar graph 192 exceeds the line 193, the publication number of the subject indicated by the bar graph 192 exceeds the minimum publication number. By checking whether or not the right end of the bar graph 192 exceeds the line 193, it is possible to check whether or not the setting is made so that images of the minimum publication number or greater are disclosed, for each subject.

In addition, a mark 197 for calling attention of the user is displayed on the name of the subject corresponding to the image that does not reach the minimum publication number. By viewing the mark 197, images to be made public are selected so as to reach the minimum publication number. A configuration in which the color of the name of the subject corresponding to the image that does not reach the minimum publication number and the color of the name of the subject corresponding to the image that reaches the minimum publication number are changed may be used. Further, the prohibit mark 170 is also displayed in correspondence with the name displayed in the publication number display area 190. It is possible to prevent an image including a private subject from being erroneously set as a public target.

Figure 26:
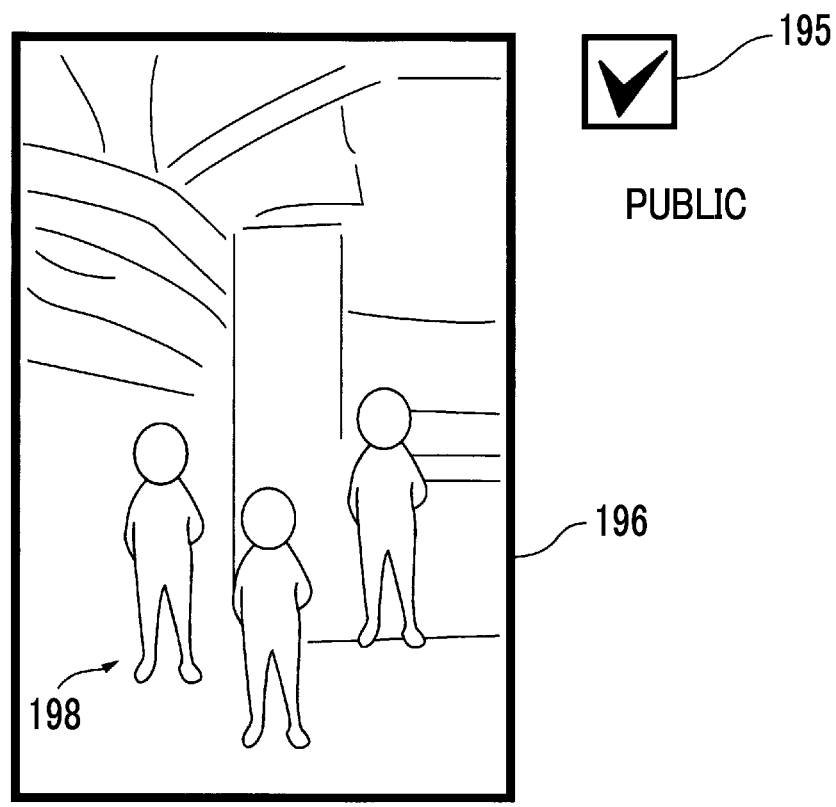
FIG. 26 is a diagram showing an example of an image.

FIG. 26 is a diagram showing an example of an image set as a public target as the check box 195 is checked, for example.

It is assumed that a private subject 198 is included in an image set as a public target. In such a case, the private subject 198 is trimmed from the images. The private subject 198 is removed from the public images.

Figure 27:
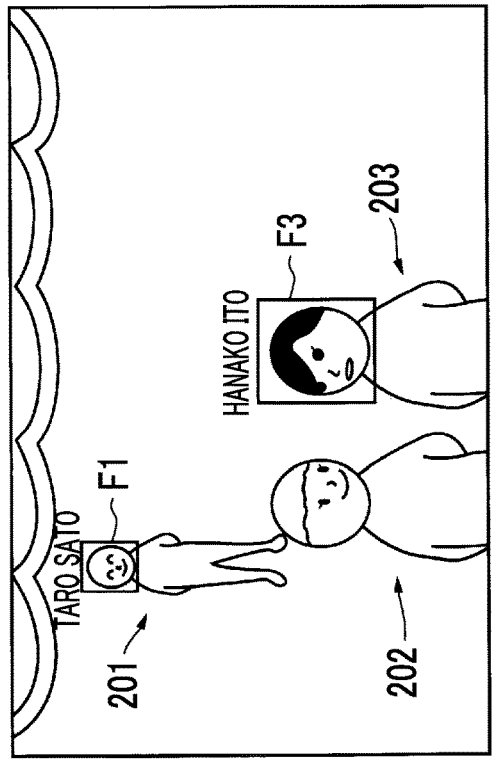
FIG. 27 is a diagram showing an example of an image display window.

FIG. 27 is a diagram showing another example of the image display window 80.

An image 200 is displayed in the image display area 90. The image 200 includes three persons of subjects 201, 202, and 203. In a case where the image 200 includes the subjects 201, 202, and 203, face images of the subjects 201, 202, and 203 are respectively recognized, and the face images corresponding to the subjects 201, 202, and 203 should be detected.

However, there is a case where face images corresponding to the number of subjects are not detected. For example, the face image of the subject 201 is detected and the face frame F1 is displayed and the face image of the subject 203 is detected and the face frame F3 is displayed, but the face image of the subject 202 may not be displayed.

A subject detection number 210 is displayed above the image 200. Two persons are displayed as the number of subjects detected from the image 200. A confirm message 211 indicating whether the number of persons detected from the image 200 is correct is displayed below the image. By viewing the confirm message, the user can recognize that the face that is not detected is included in the image 200. For example, by selecting a name corresponding to a name of the subject 202 of the face that is not detected, for example, from the names displayed in the public/private information display area 120 and clicking the corresponding face, the selected name and the image 200 are associated with each other.

Second Embodiment

FIGS. 28 to 50 are diagrams showing a second embodiment.

In the second embodiment, as in the first embodiment, an album (electronic album) is produced using the image candidate determination apparatus 1 shown in FIG. 1.

In the second embodiment, an album (electronic album) is produced for each of a plurality of persons (for example, children of a kindergarten or a nursery school). The plurality of albums corresponding to the number of persons are produced. The second embodiment relates to an embodiment for producing a kindergarten album, but it may also be applied to a case where other albums are produced.

Figure 28:
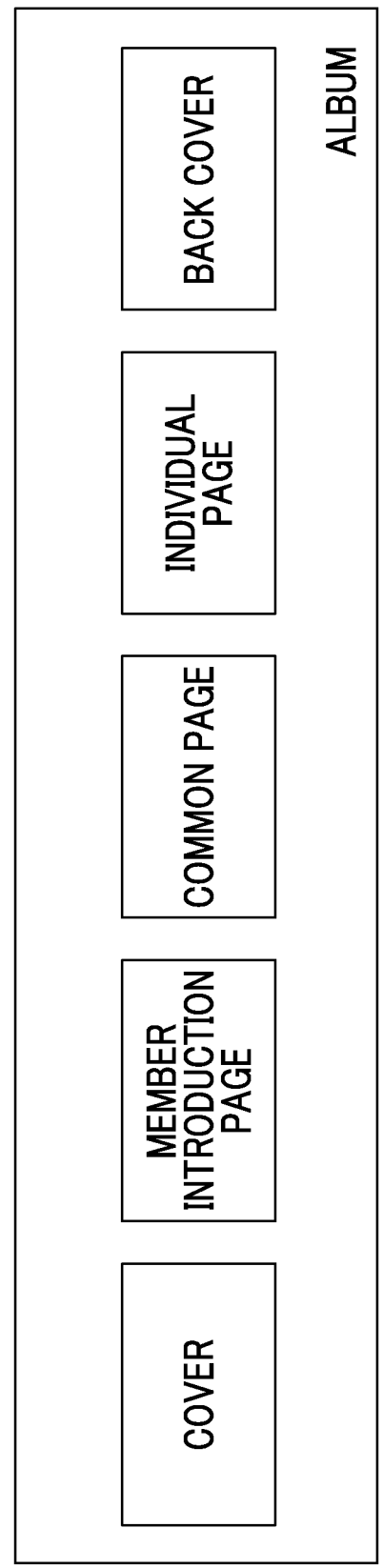
FIG. 28 is a diagram showing an overview of an album.
Figure 29:
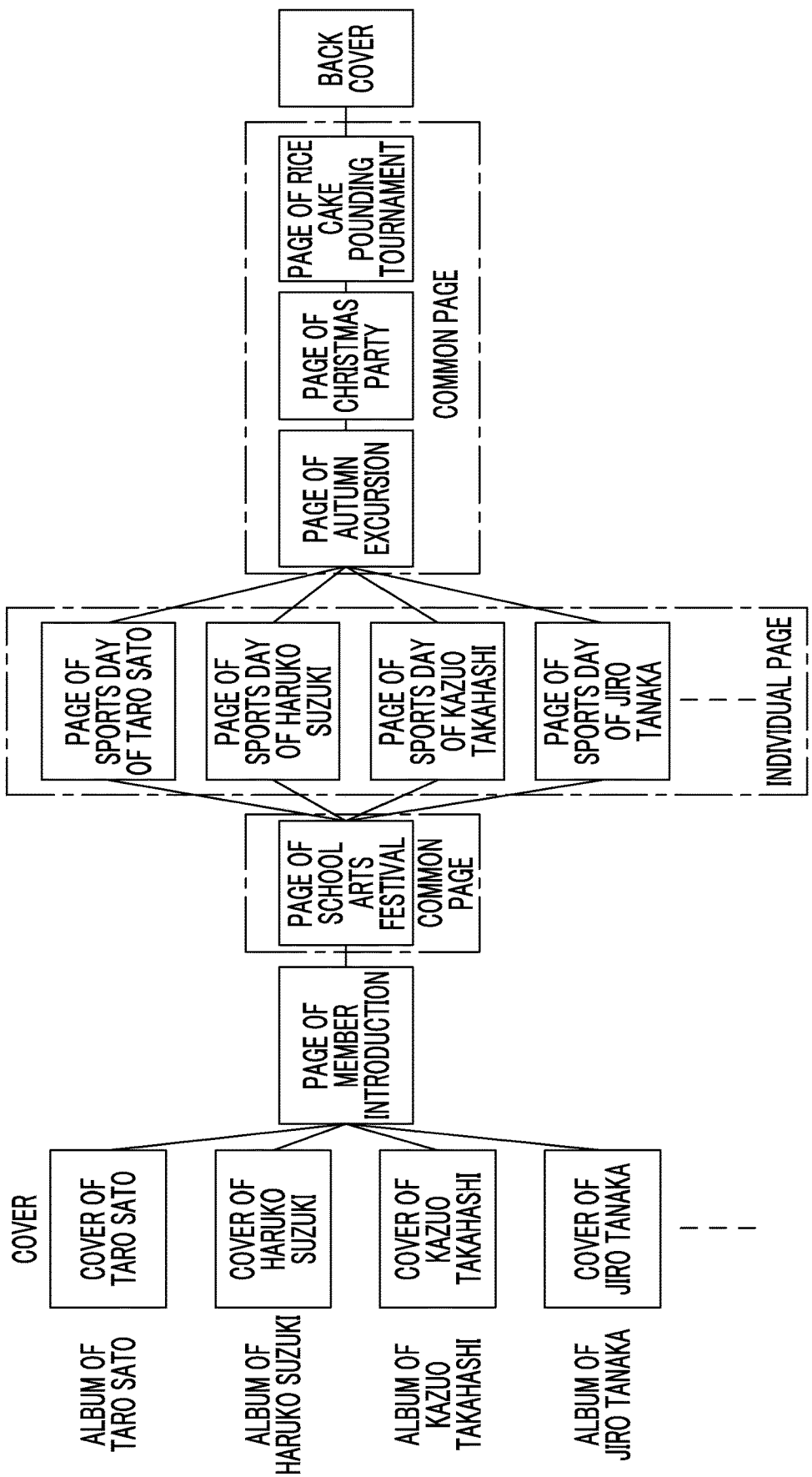
FIG. 29 is a diagram showing an overview of an album.

FIGS. 28 and 29 are diagrams showing an outline of an album. Referring to FIG. 28, each album includes a cover, a member introduction page, a common page, an individual page, and a back cover. The cover page and the individual page are different for each album, and the member introduction page, the common page, and the back cover are common to the plurality of albums. For example, an image of a person who receives the album is pasted on the cover, and an image of an event of which main subject is the person who receives the album is pasted on the individual page. In the common page, images pasted in all albums are the same, and the content of the back cover is also the same for all albums. Here, the cover may be common to the plurality of albums, and the back cover may be different for each album.

Referring to FIG. 29, an album of "Taro SATO" who is one of persons who receive albums is configured of a cover unique to "Taro SATO", a common page, an individual page unique to "Taro SATO", and a back cover. In the example shown in FIG. 29, images of an "sports day" event are pasted on the individual page, and in the album of "Taro SATO", images in which "Taro SATO" is a main subject among the images of the "sports day" event are pasted. Further, an image of "Taro SATO" alone is pasted on the cover. Similarly, in albums other than the album of "Taro SATO", images in which a person who receives each album is a main subject are pasted on the cover and the individual page.

On the common page, images common to all albums are pasted. In the example shown in FIG. 29, the common page includes a page where images of a "school arts festival" event are pasted, a page where images of an "autumn excursion" event are pasted, and a page where images of a "Christmas party" event are pasted, and a page where images of a "rice cake pounding tournament" event are pasted. On a page where a "member introduction" image, images common to all albums are pasted.

In this embodiment, images captured for each event are divided into folders and stored in the memory card 13 in advance. Further, as described in the first embodiment, with respect to the images captured for each event, face image portions are extracted, and one or more images including the same person are grouped by the CPU 2 (image grouping unit). For example, for each event, the groups such as a group of images including "Taro SATO" and a group of images including "Haruko SUZUKI" are set in advance. In addition, extracted face image portions are also grouped in advance for each same person.

FIGS. 30 to 35 are flowcharts showing a processing procedure of the image candidate determination apparatus 1 according to the second embodiment.

Figure 36:
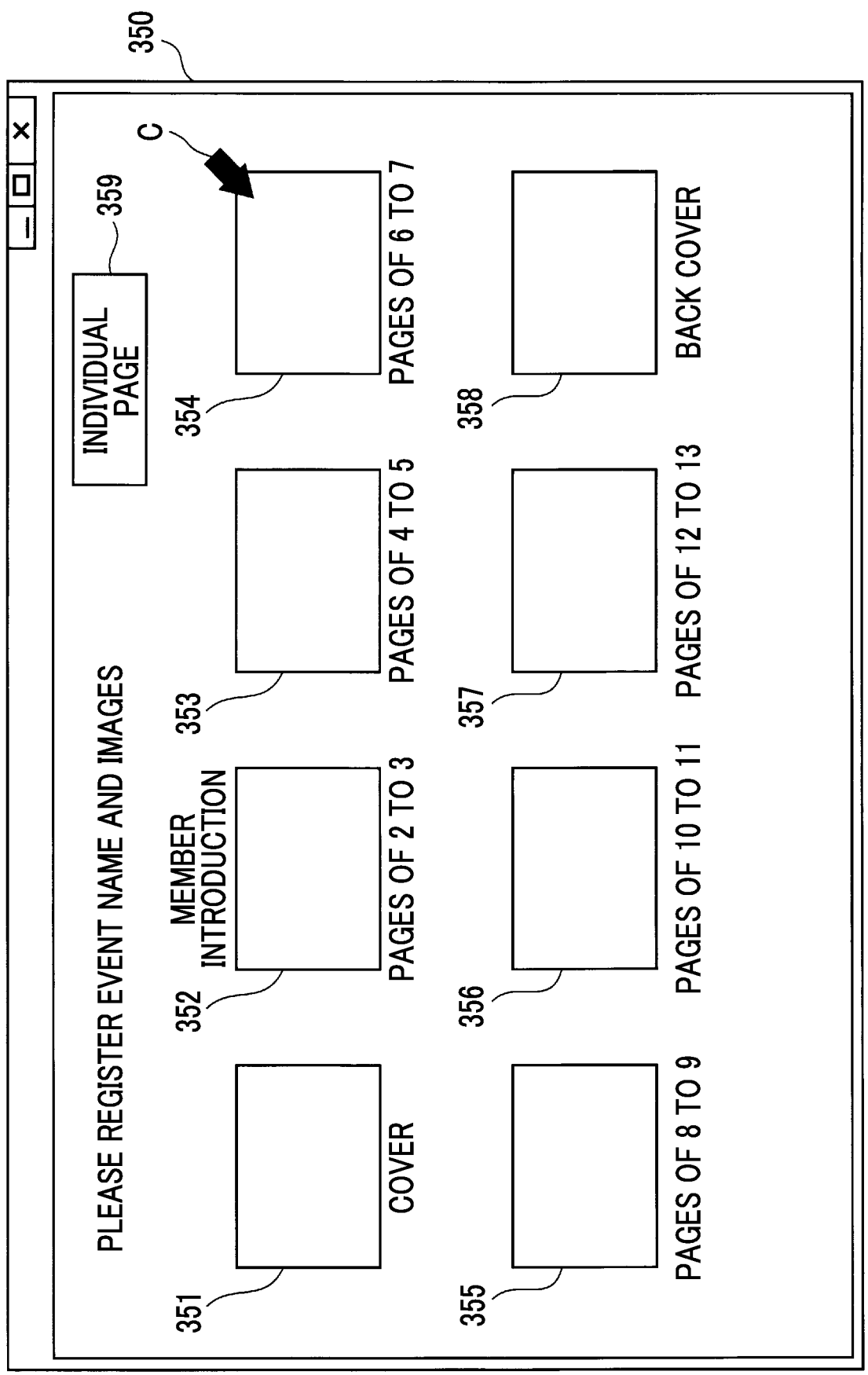
FIG. 36 is a diagram showing an example of a page selection window.

On the display screen of the display device 3, a page selection window 350 shown in FIG. 36 is displayed (step 301).

On the page selection window 350, a cover page icon 351, common page icons 352 to 357, and a back cover page icon 358 are formed. The common page icons 352 to 357 are clicked by a user (for example, a teacher of a kindergarten or a nursery school) in a case where an event name of each page of an album is registered and images corresponding to the event are selected. An individual page button 359 is also formed at an upper right portion of the page selection window 350. The individual page button 359 is clicked in setting an individual page. In a case where the individual page button 359 is clicked, an individual page setting window 450 (see FIG. 46) for setting an event or the like to become an individual page as described later is displayed on the display screen of the display device 3.

A cursor C is positioned on an icon of any one of the common page icons 352 to 357, and then, is clicked (YES in step 302). In this embodiment, it is assumed that a common page icon 354 representing pages 6 and 7 of the album is clicked. It is confirmed whether or not an event name of a common page specified by the clicked common page icon 354 has been input (step 303). In a case where the event name has not been input (NO in step 303), an event name input window 360 shown in FIG. 37 is displayed on the display screen of the display device 3 (step 304).

Figure 37:
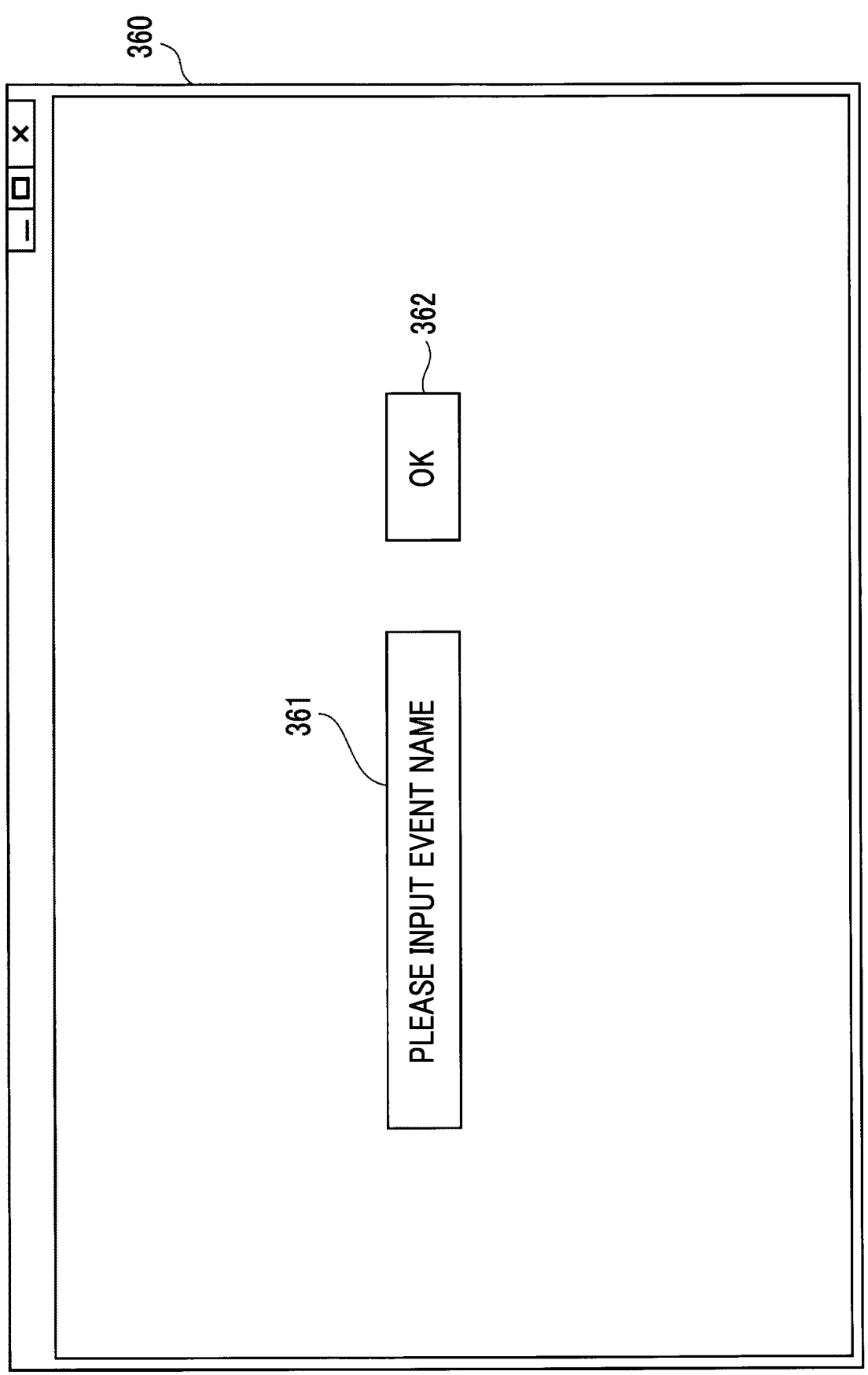
FIG. 37 is a diagram showing an example of an event name input window.

Referring to FIG. 37, in an event name input window 360, an event name input box 361 on which a character string of "Please input event name" is displayed, and an OK button 362 on which a character string of "OK" is displayed are formed. In a case where the cursor C is positioned in the event name input box 361 and is clicked, an event name may be input to the event name input box 361. The event name (school arts festival, sports day, autumn excursion, Christmas party, rice cake pounding tournament, or the like) is input using the keyboard 8 (step 305). In a case where the OK button 362 is clicked after the event name is input, an image selection window 370 shown in FIG. 38 is displayed on the display screen of the display device 3 (step 306).

Figure 38:
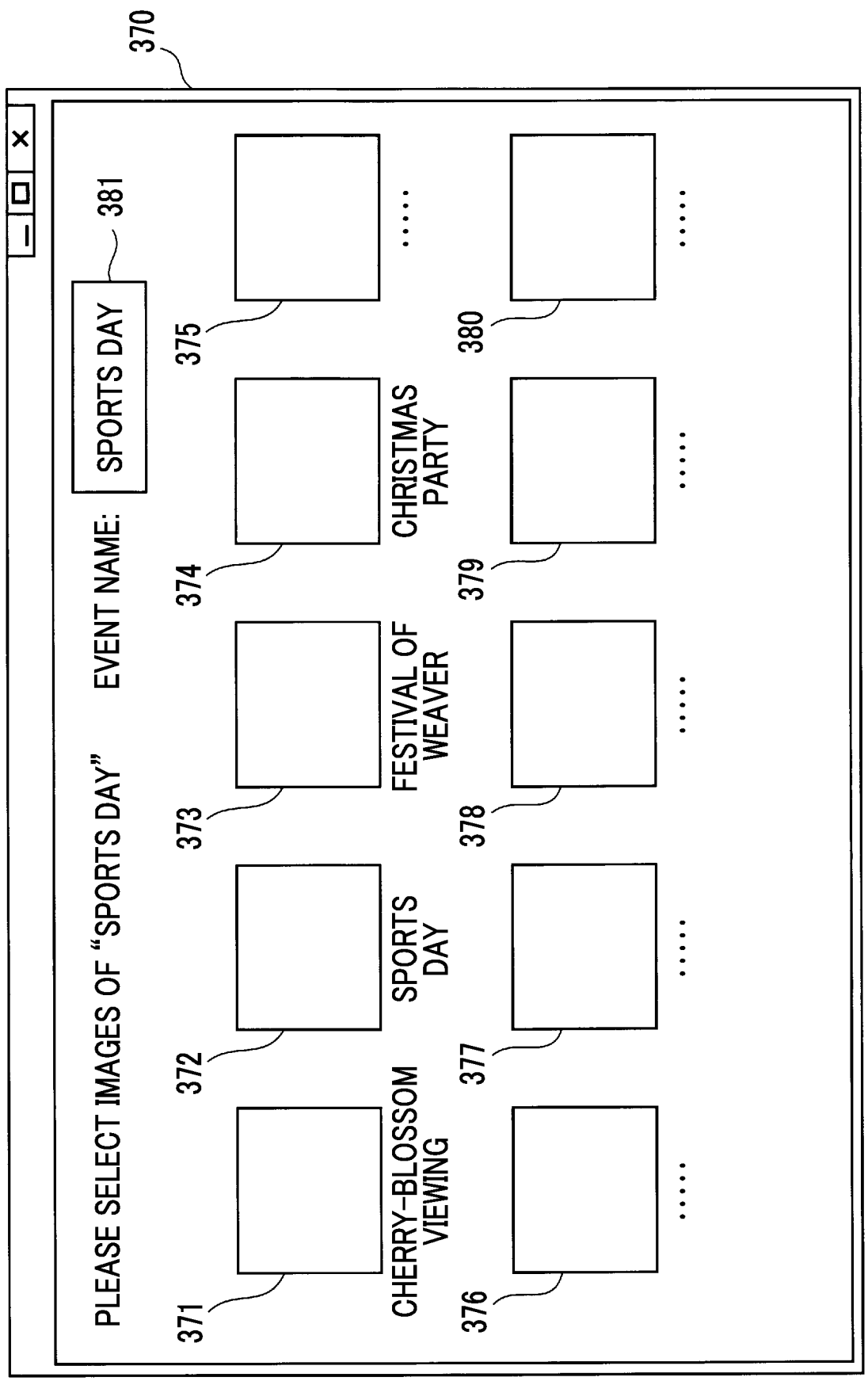
FIG. 38 is a diagram showing an example of an image selection window.

Referring to FIG. 38, a plurality of image folder icons 371 to 380 are formed in the image selection window 370. The image folder icon 371 represents an image folder in which images captured at the time of a "Cherry-blossom viewing" event are stored. Similarly, the image folder icons 372, 373, and 374 represent image folders in which images captured at respective events of "sports day", "festival of the Weaver", and "Christmas party" are stored. The folder names of the image folders are respectively named as "sports day". "festival of the Weaver", and "Christmas party". This is similarly applied to the other image folder icons 375 to 380. Images are captured for each event, are stored in an image folder for each event, and are stored in the memory card 13 in advance, as described above. The image folder icons 371 to 380 representing the image folders stored in the memory card 13 are displayed on the image selection window 370.

At an upper right portion of the image selection window 370, an event name display box 381 for displaying an event name input in the event name input window 360 shown in FIG. 37 is formed. In this embodiment, in the event name input window 360, it is assumed that "sports day" is input as the event name. For this reason, the character string of "sports day" is displayed in the event name display box 381.

Figure 40:
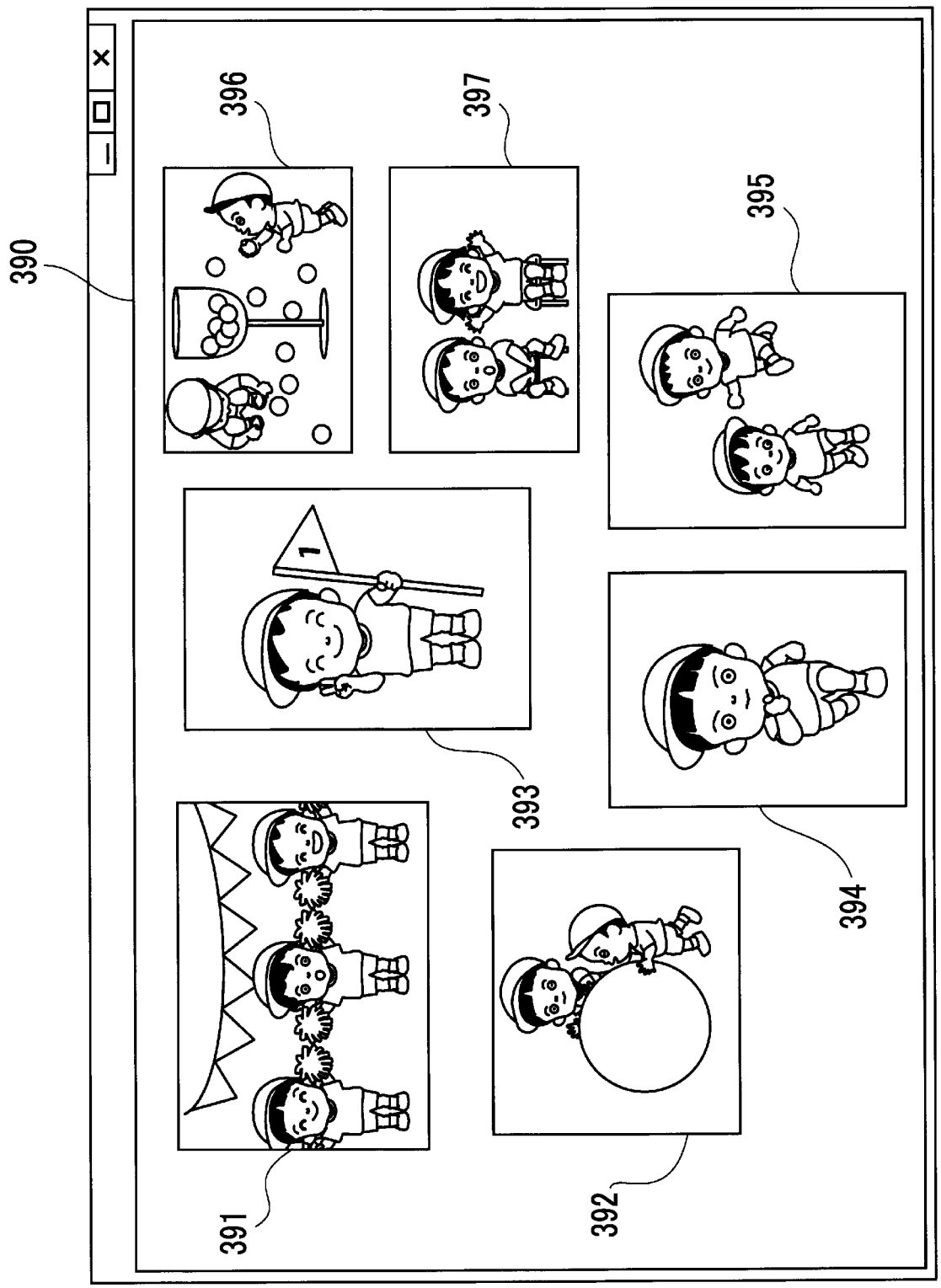
FIG. 40 is a diagram showing an example of a double-page spread.

An image folder icon representing an image folder in which images corresponding to an event name displayed in the event name display box 381 are stored is clicked (YES in step 307). In this embodiment, since the folder name of "sports day" is input as the event name, an image folder icon 372 to which the folder name of "sports day" is assigned is clicked. Then, images of the sports day stored in the image folder represented by the clicked image folder icon 372 are automatically laid out on a double-page spread of the designated pages 6 and 7, as shown in FIG. 40 (step 308). In the automatic layout, among the images captured corresponding to the event name, extraction image candidates determined on the basis of a total image evaluation value determined as described in the first embodiment may be used (or non-extraction image candidates may be determined and images other than the non-extraction image candidates may be used as extraction image candidates). An electronic album is generated by the CPU 2 (electronic album generating unit) using the extracted image candidates. Further, as described with reference to FIG. 19, images within a predetermined limit number may be determined as extraction image candidates by the CPU 2 (image candidate determination unit), and may be automatically laid out so that a large number of images of a specific person are not pasted on the double-page spread.

Referring to FIG. 40, images 391 to 397 included in the sports day folder are automatically laid out on the double-page spread of the pages 6 and 7. Since the double-page spread 390 of the pages 6 and 7 is a common page, the images 391 to 397 are not images in which a specific person is included too many times, but are selected so that images of persons who receive the album are included on average (so that the number of images is within the limit value as described above).

Subsequently, the number of images for each person included in the images 391 to 397 pasted on the double-page spread 390 is calculated by the CPU 2 (step 309). Thereafter, the page selection window 350 as shown in FIG. 36 is displayed on the display screen of the display device 3. In an initial state, the event name is not displayed on the common page icon 354 included in the page selection window 350, but by performing the above processing, since the images of the sports day event are pasted on pages 6 and 7 represented by the common page icon 354, the character string of "sports day" is displayed on the common page icon 354, as shown in FIG. 39.

Figure 30:
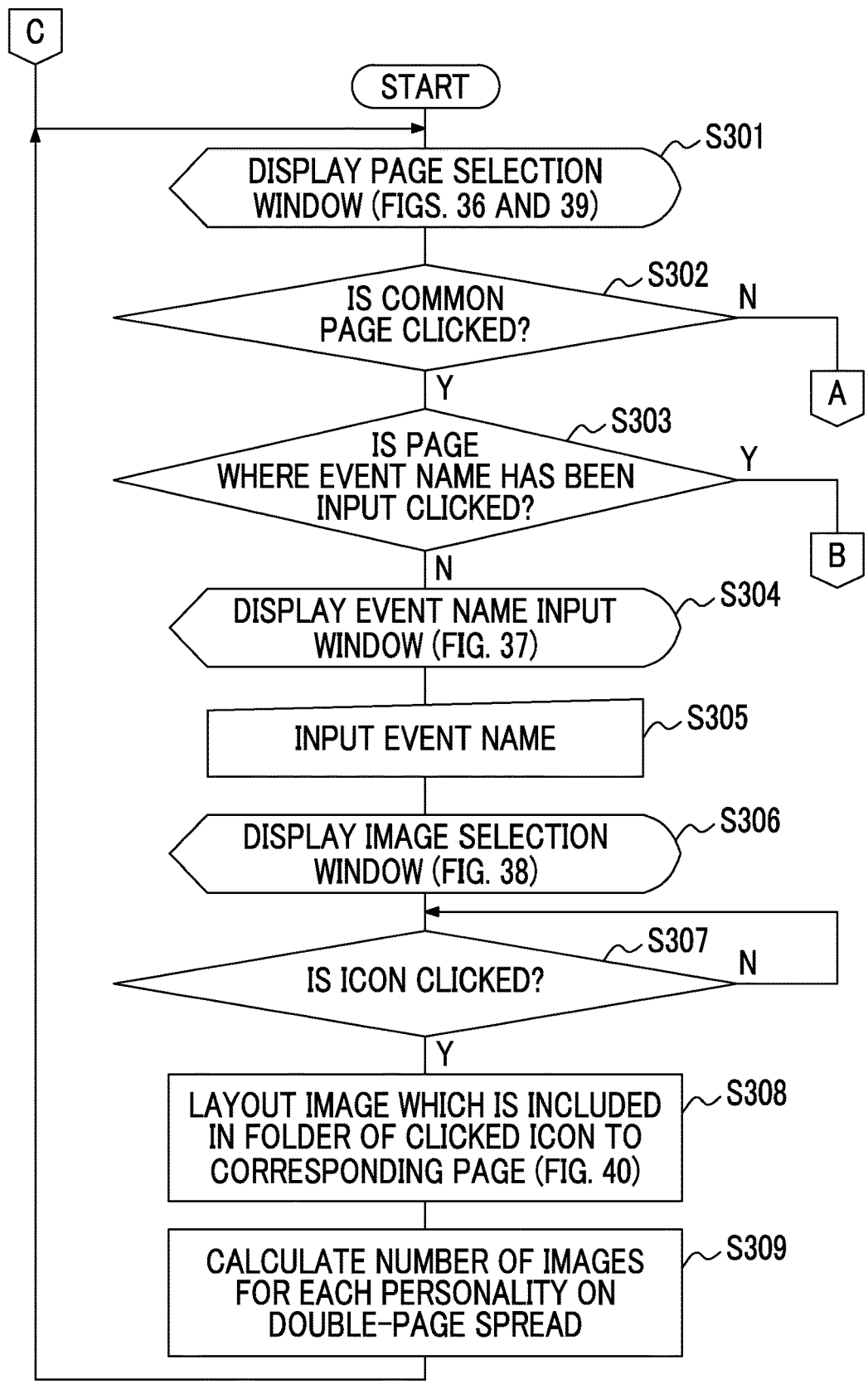
FIG. 30 is a flowchart showing a processing procedure of the image candidate determination apparatus.
Figure 31:
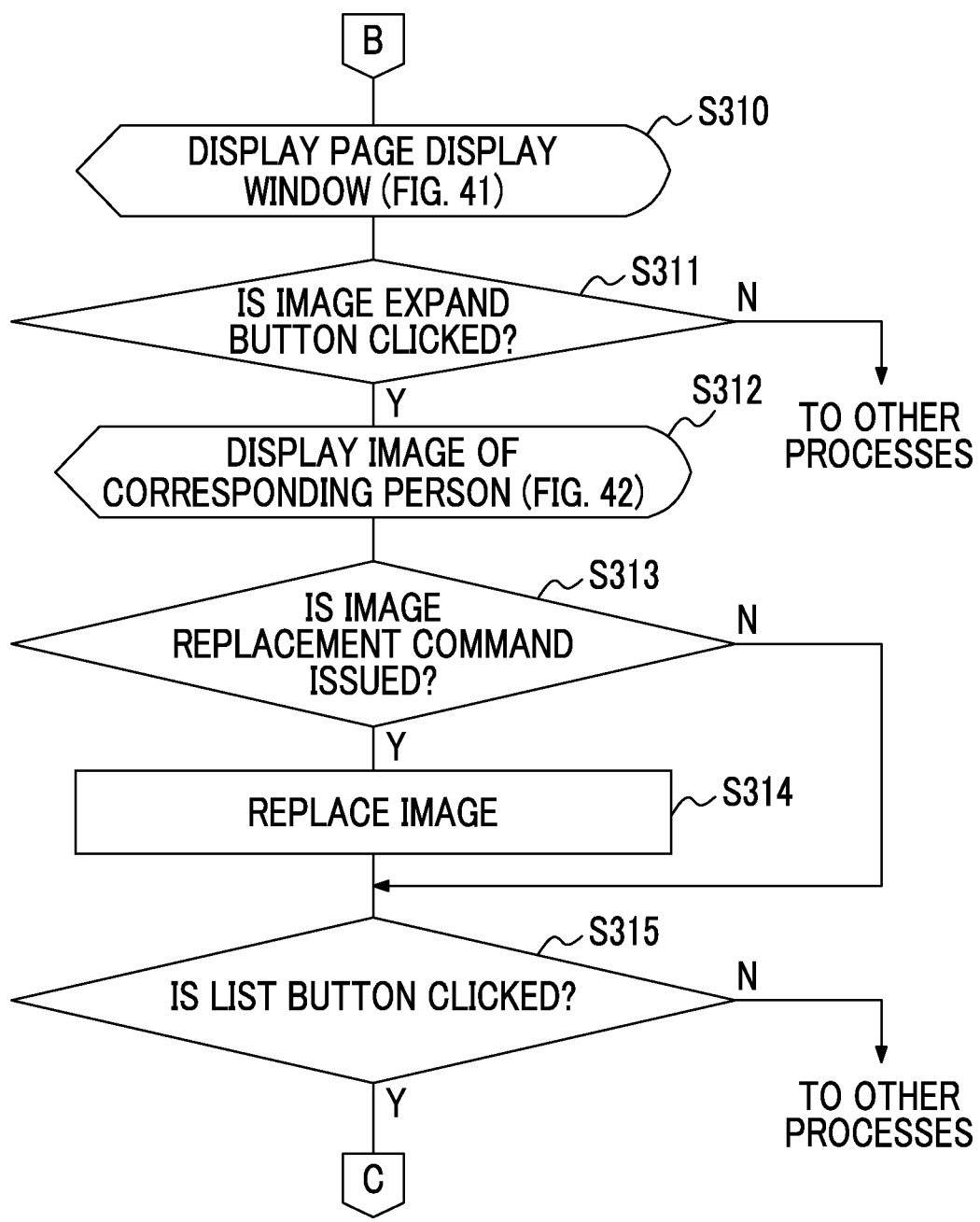
FIG. 31 is a flowchart showing a processing procedure of the image candidate determination apparatus.
Figure 32:
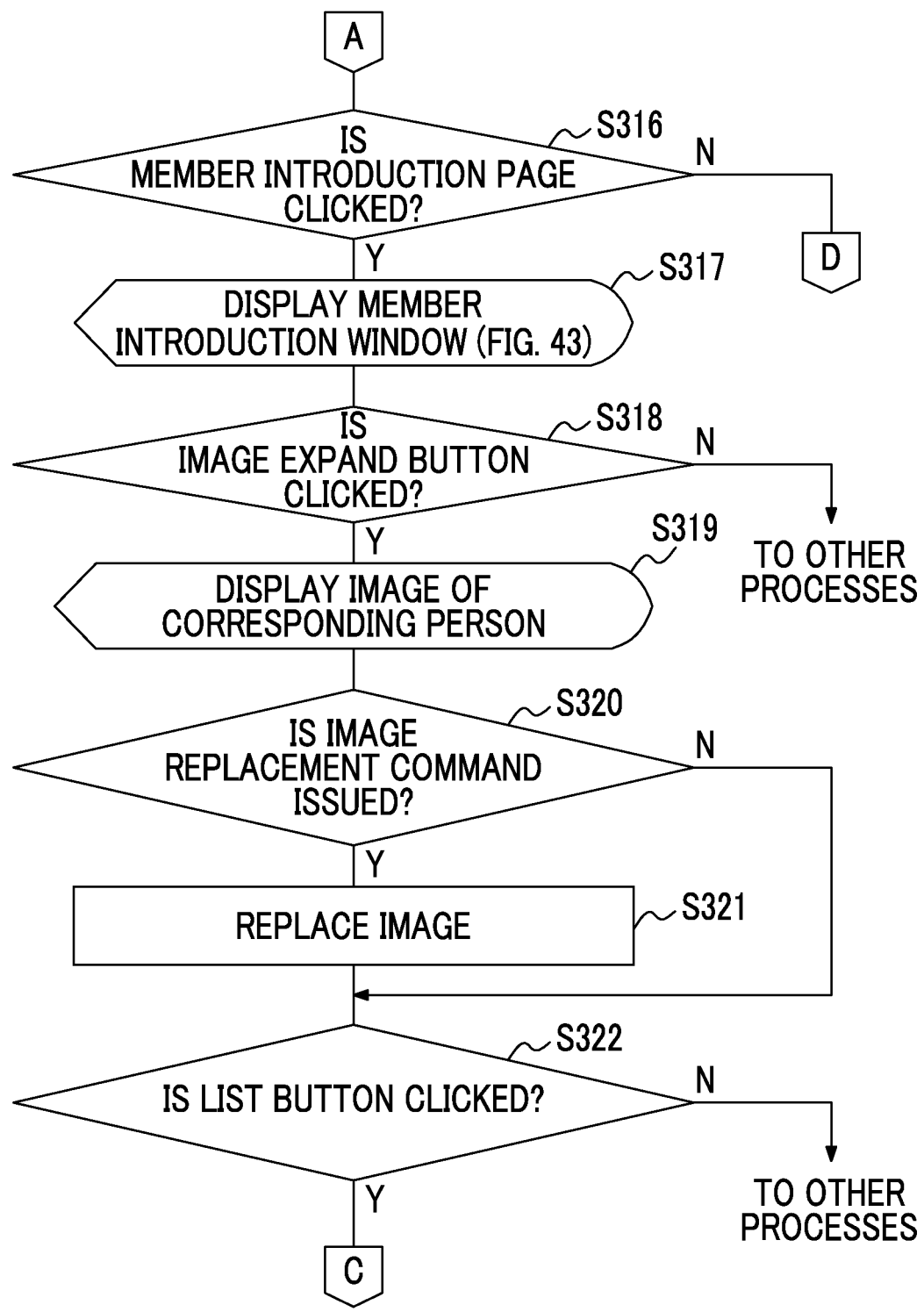
FIG. 32 is a flowchart showing a processing procedure of the image candidate determination apparatus.
Figure 33:
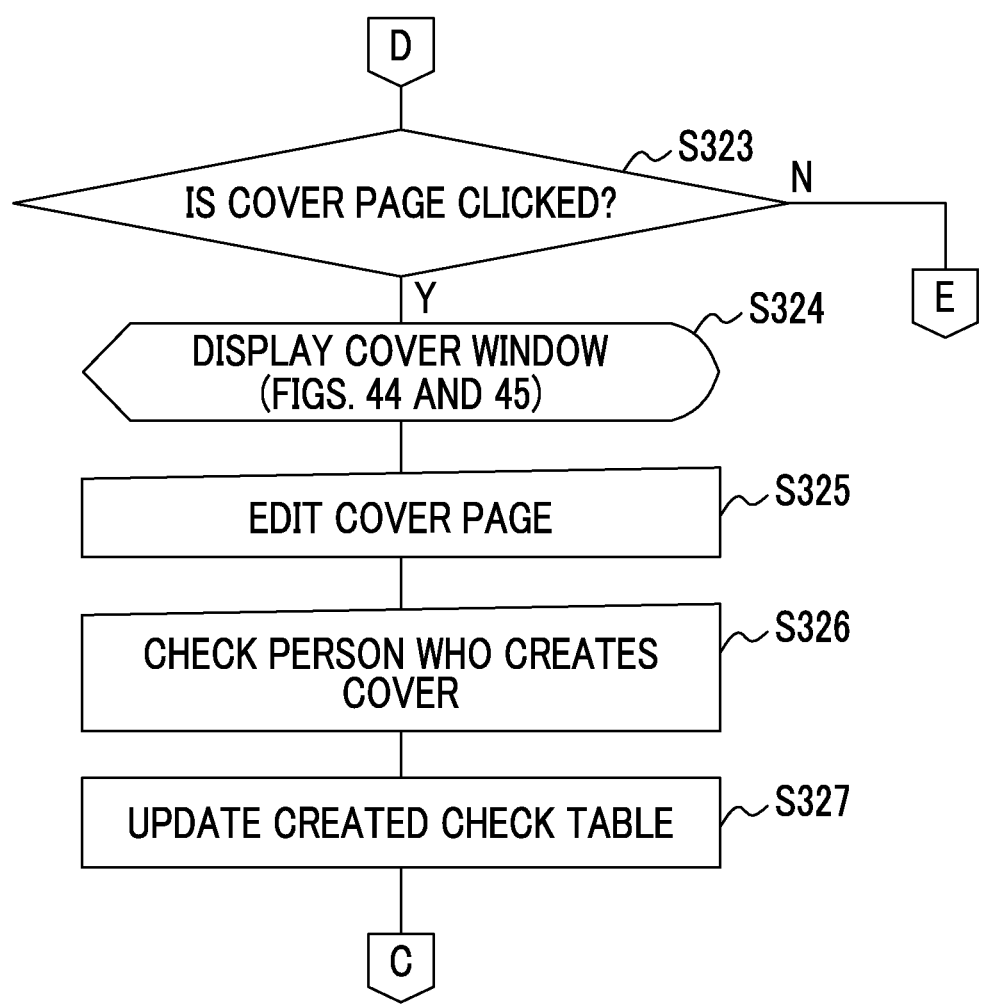
FIG. 33 is a flowchart showing a processing procedure of the image candidate determination apparatus.
Figure 34:
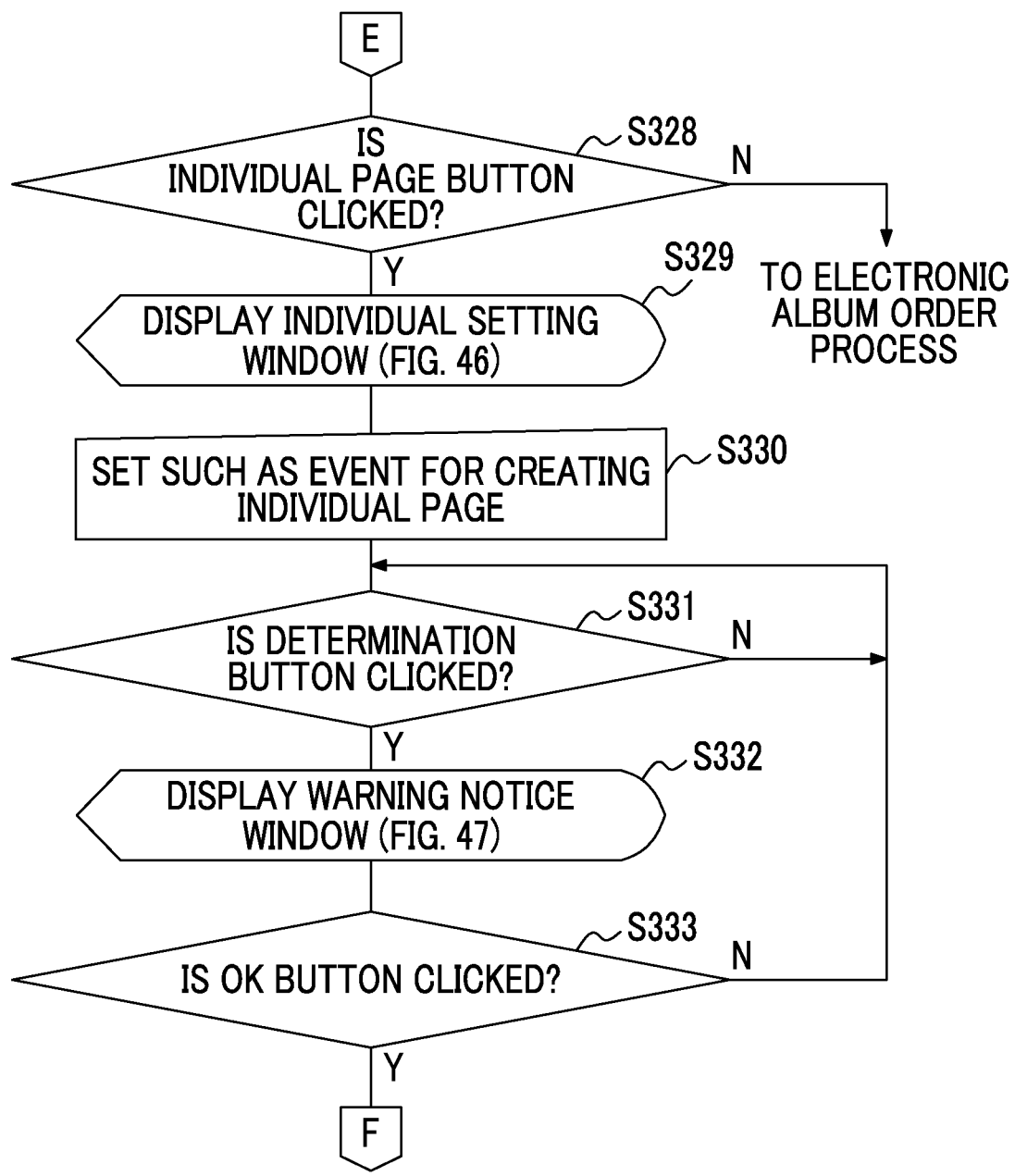
FIG. 34 is a flowchart showing a processing procedure of the image candidate determination apparatus.
Figure 35:
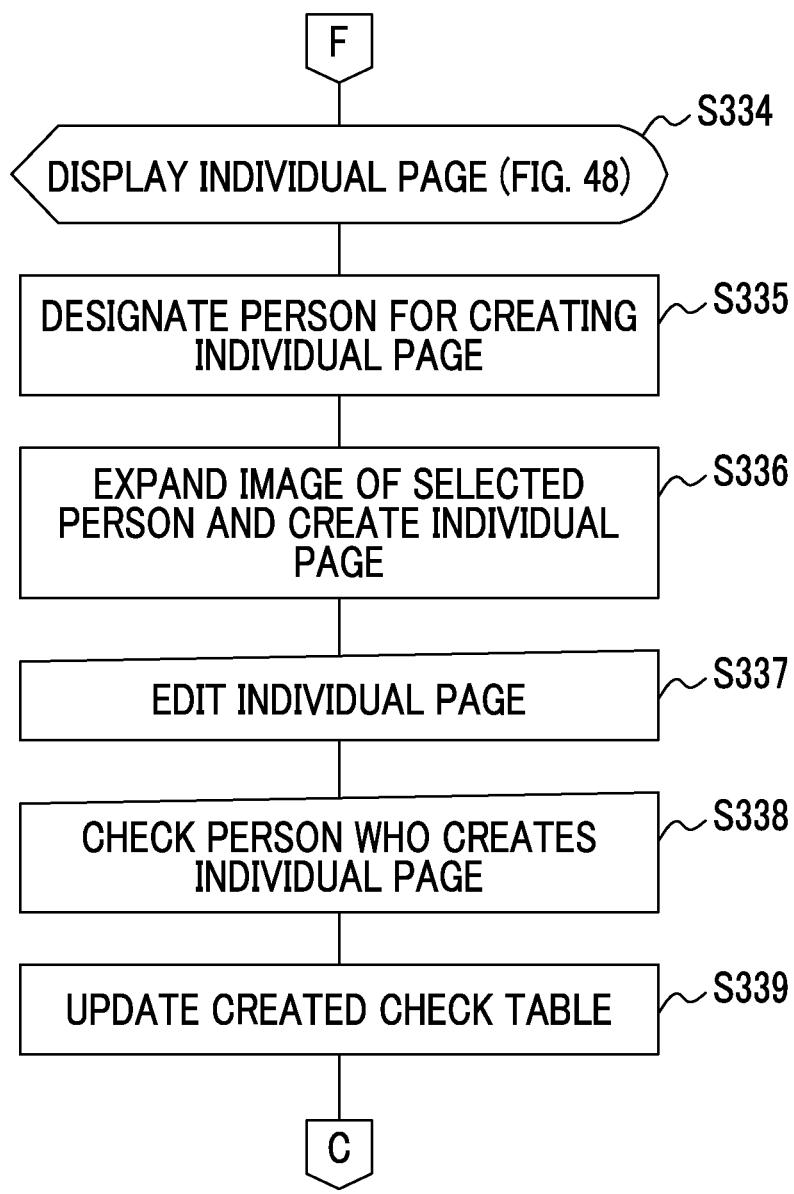
FIG. 35 is a flowchart showing a processing procedure of the image candidate determination apparatus.
Figure 39:
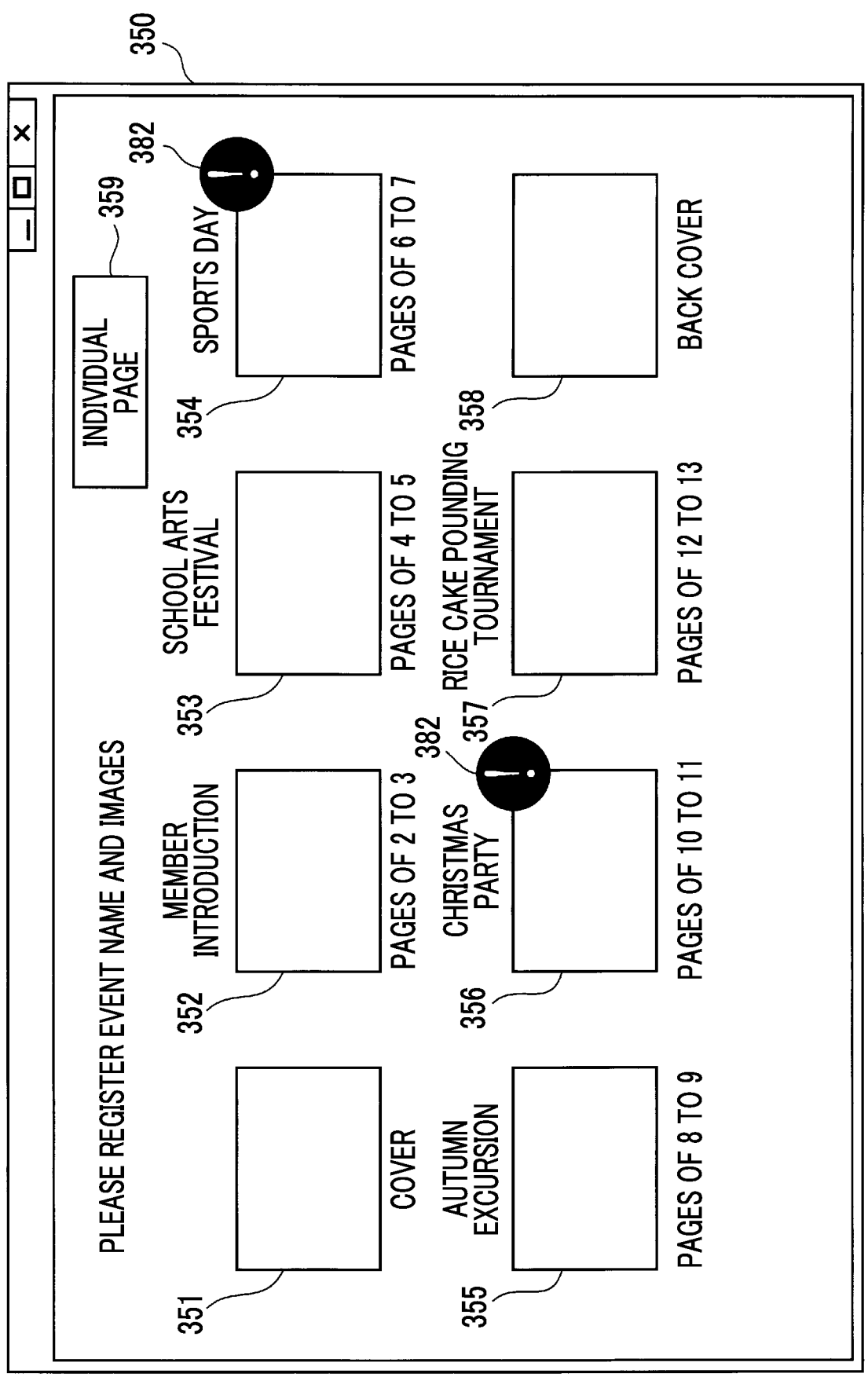
FIG. 39 is a diagram showing an example of a page selection window.

By repeating the processes from step 301 to step 309 in FIG. 30, as shown in FIG. 39, event names (input event names) represented by the images pasted on the respective pages are displayed on the common page icons 352 to 357. For example, on the respective pages of pages 4 and 5, pages 6 and 7, pages 8 and 9, pages 10 and 11, and pages 12 and 13, images of the respective events of "school arts festival", "sports day", "autumn excursion", 'Christmas party", and "rice cake pounding tournament" are pasted.

On the page selection window 350 shown in FIG. 39, a caution mark 382 is displayed (by the second display control unit) at upper right portions of the page icons 354 and 356. The caution mark 382 shows that a person who is not included in all persons among the images pasted on the pages 6 and 7 and the pages 10 and 11 of the double-page spreads represented by the page icons 354 and 356 on which the caution mark 382 is displayed. Since the images are pasted so that the number of images of persons included in the images pasted on the double-page spread 390 or the like is within the limit value, there may be a case where a person is not included in the images pasted on the double-page spread 390 or the like. The caution mark 382 is displayed in a case where such a thing occurs. By displaying the caution mark 382, it is possible to distinguish between the double-page spread 390 which does not include at least one person among a plurality of predetermined persons and a double-page spread (for example, a double-page spread of the school arts festival of the pages 4 and 5) which includes all the plurality of predetermined persons, to thereby display double-page spreads (icons representing the double-page spreads).

Figure 41:
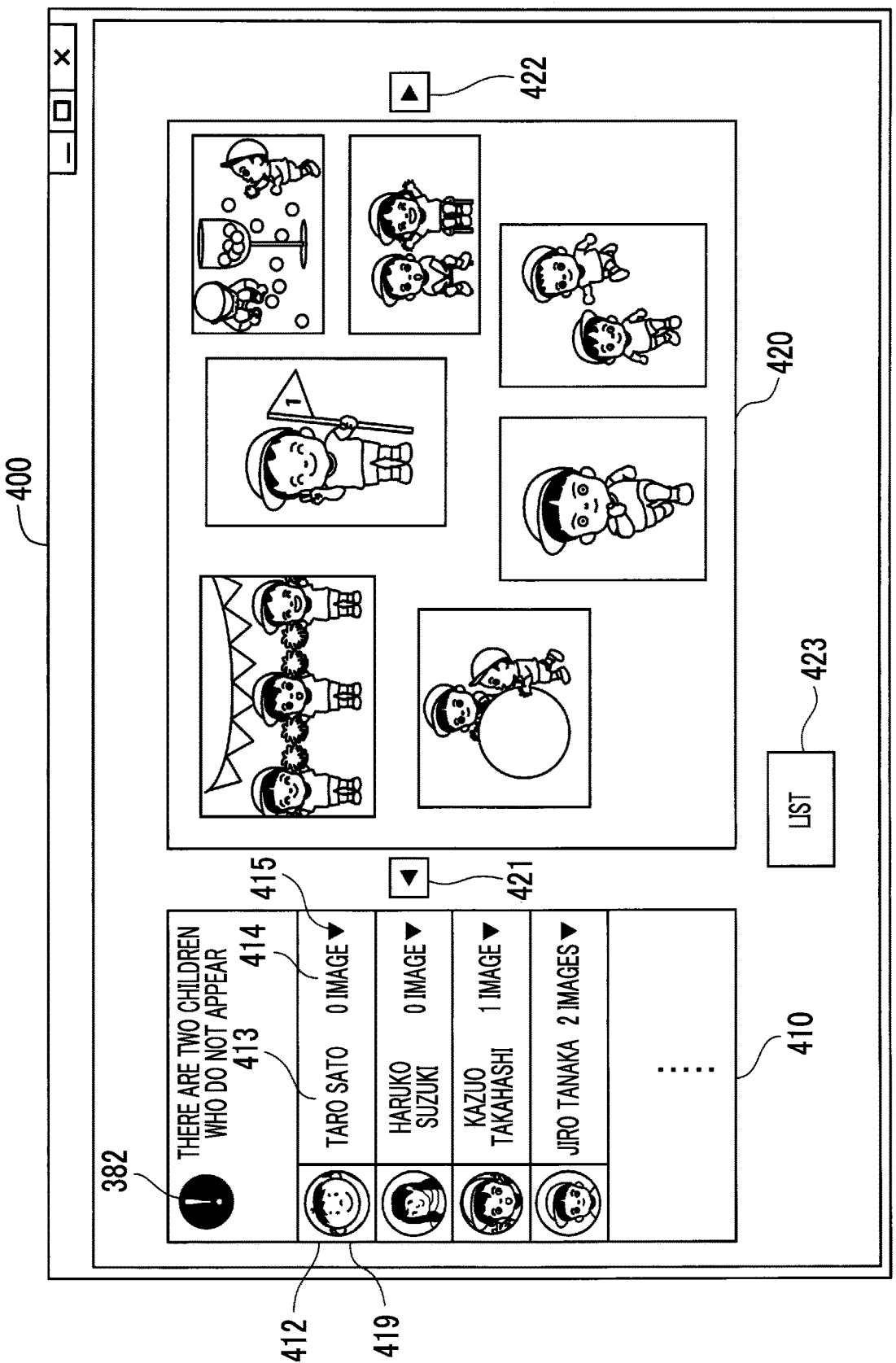
FIG. 41 is a diagram showing an example of a page display window.

In a state where the page selection window 350 is displayed, in a case where any one of the page icons 352 to 357 for which the event name has already been input as shown in FIG. 39 is clicked (YES in step 303), a page display window 400 is displayed on the display screen of the display device 3 as shown in FIG. 41 (step 310). It is assumed that the page icon 354 in which "sports day" is input as the event name is clicked.

Referring to FIG. 41, on the page display window 400, a double-page spread 420 is displayed on which images captured at the sports day event of pages 6 and 7 are pasted. On a left side of the double-page spread 420, a left arrow button 421 that is clicked in a case where a double-page spread one page before is displayed on the page display window 400 is formed. On a right side of the double-page spread 420, a right arrow button 422 that is clicked in a case where a double-page spread one page after is displayed on the page display window 400 is formed.

A list button 423 on which characters "list" are displayed is formed on a lower left side of the double-page spread 420. As the list button 423 is clicked, the page selection window 350 is displayed as shown in FIG. 36 or FIG. 39.

On a left side of the double-page spread 420, an image number display area 410 for displaying, for each person, the number of images including a person among images pasted on the double-page spread 420 is formed. A caution section 411 at the top of the image number display area 410 displays the caution mark 382 together with a sentence of "There are two children who do not appear". By viewing the caution mark 382 and the sentence (first notification unit) displayed in the caution section 411, it is possible to confirm persons who are not included in the images 391 to 397 pasted on the double-page spread 390 among the plurality of determined persons (all students), and the number of the persons. However, since among the images pasted on the double-page spread 390, the number of images of persons included in the images is also displayed in a person information display section 419 (second notification unit and third notification unit), it is also possible to confirm a person in the images and the number of images in which the person is included. The person information display section 419 is formed for each person below the caution section 411. The person information display section 419 includes a representative face image 412 of a person, a person name 413, the number of images 414 including the person among the images pasted on the double-page spread 390, and an image expand button 415. Persons ("Taro SATO" and "Haruko SUZUKI") for which the number of images 414 is zero are persons that are not included in the images 391 to 397 pasted on the double-page spread 390.

Figure 42:
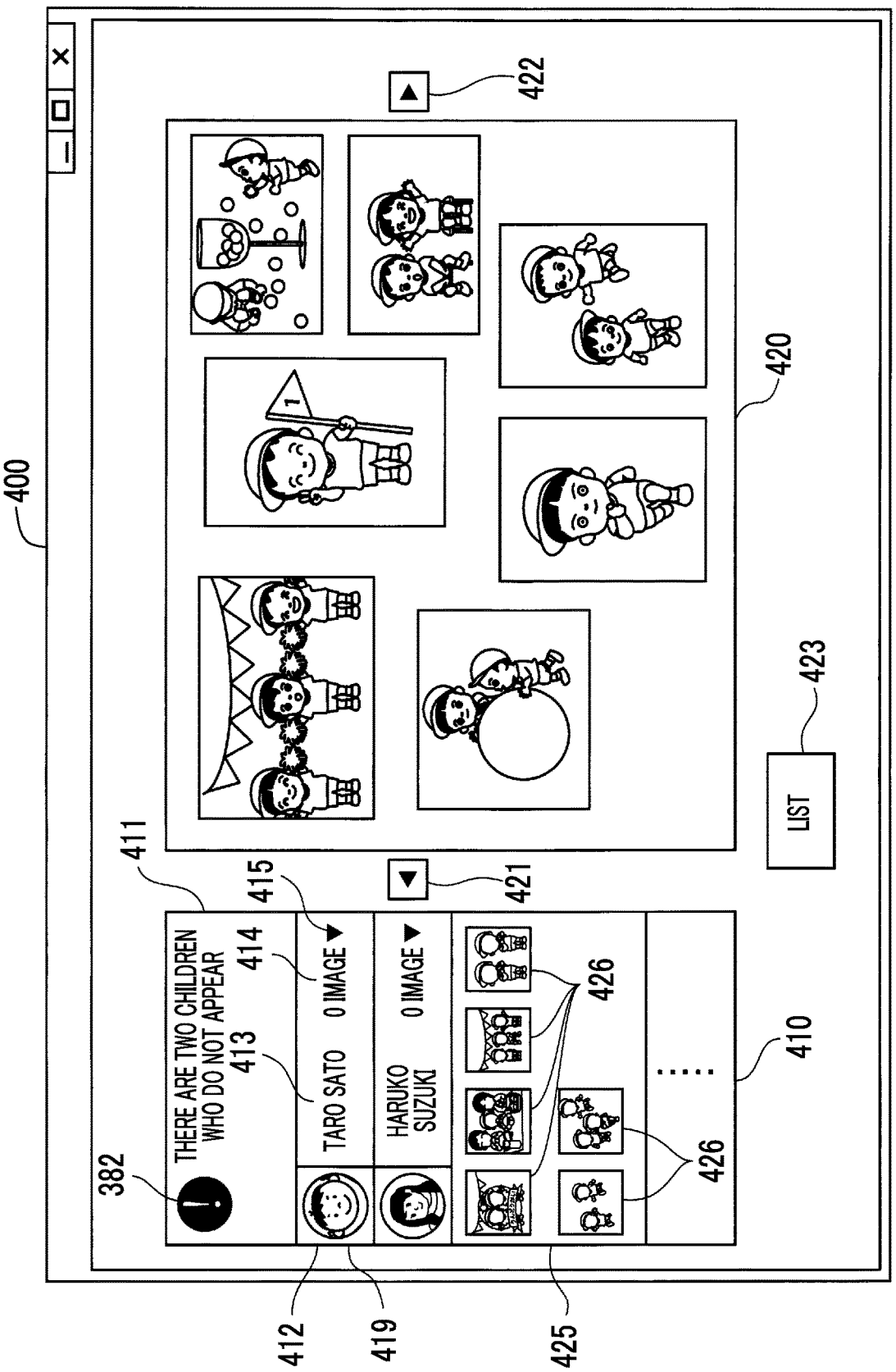
FIG. 42 is a diagram showing an example of a page display window.

In a case where the image expand button 415 is clicked (YES in step 311), an image window 425 appears under the control of the CPU 2 (first display control unit) as shown in FIG. 42. In the image window 425, images (images grouped for each person by the grouping unit) of a person corresponding to a person clicked on the image expand button 415 (person specifying unit for designating a certain person), that is, images 426 captured at the event of the double-page spread 390 are displayed by the CPU 2 (first display control unit) (step 312). In a case where the image expand button 415 displayed in the person information display section 419 of "Haruko SUZUKI" is clicked, the images 426 of "Haruko SUZUKI" are displayed on the image window 425.

In a case where a desired image is selected from the images 426 displayed on the image window 425 using the mouse 9 (image designating unit) and is dragged and dropped at a position of any one of the images pasted on the double-page spread 390, an image replacement command is issued (YES in step 313), and the image is replaced (step 314). However, the image may be positioned at a desired position of the double-page spread 390 without replacing the image, and may be added at the position. An image of a person who is not included in the image pasted on the double-page spread 390 is pasted on the double-page spread 390.

In a case where the list button 423 is clicked (YES in step 315), the page selection window 350 is displayed as described above (step 301).

Figure 43:
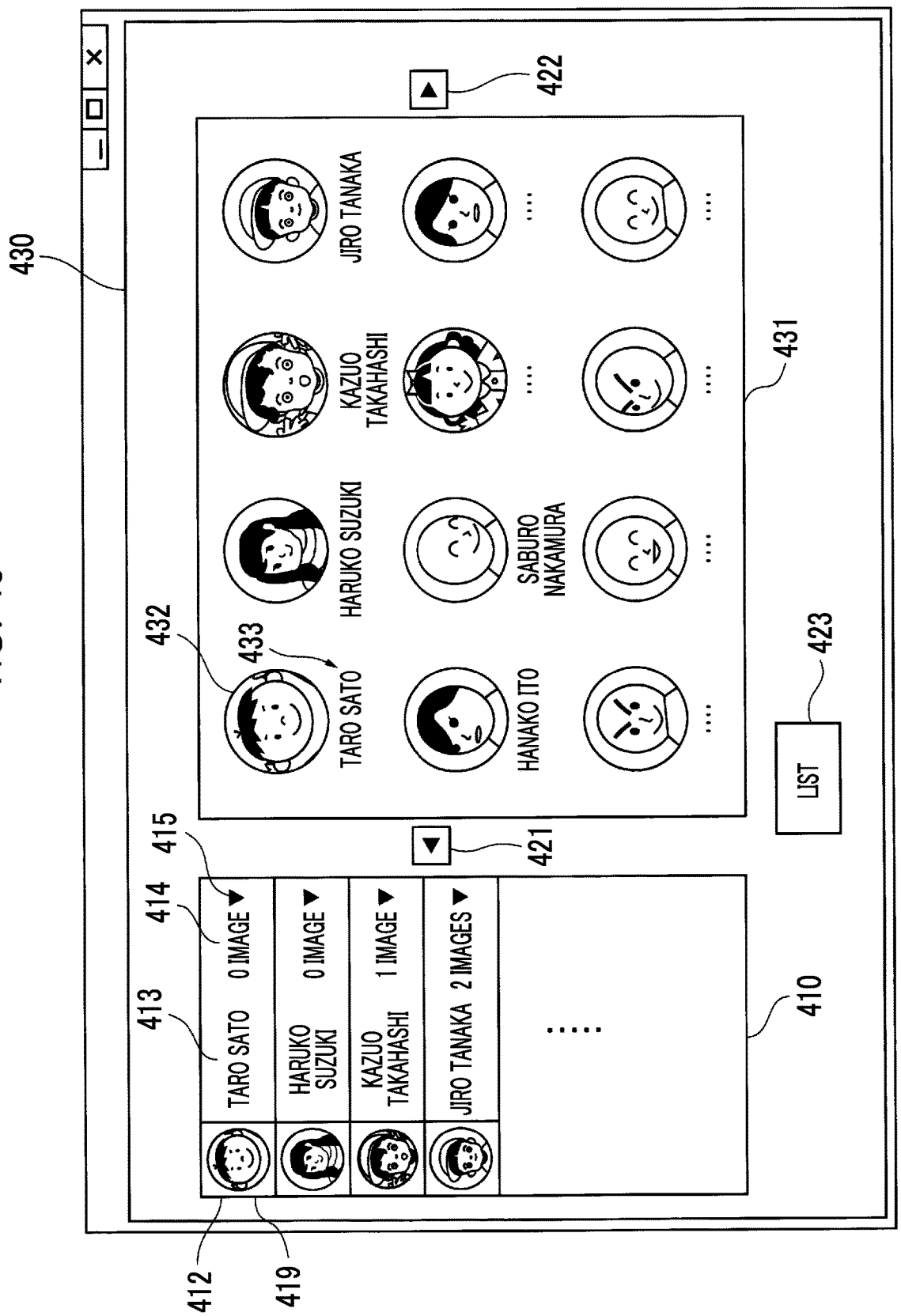
FIG. 43 is a diagram showing an example of a member introduction window.

In a case where the member introduction page icon 352 is clicked in a state where the page selection window 350 shown in FIG. 36 or FIG. 39 is displayed (NO in step 302 and YES in step 316), the member introduction window 430 shown in FIG. 43 is displayed on the display screen of the display device 3 (step 317).

In FIG. 43, the same reference numerals are given to the same objects as shown in FIG. 41 or the like. Referring to FIG. 43, the member introduction window 430 includes a member introduction page 431. On the member introduction page 431, face images 432 of all persons are displayed as a list. Names 433 of corresponding students are displayed under the face images 432. The face images 432 are prepared in advance as described above, and the names 433 of the corresponding students are input in advance while viewing the face images 432.

In a case where the image expand button 415 is clicked (YES in step 318), an image window appears in a similar way, and images corresponding to persons in a person information display section 419 of the clicked image expand button 415 are displayed. In a case where a desired image is dragged and dropped from the images displayed on the image window onto the member introduction page 431, an image replacement command is issued (YES in step 320), and the image is replaced (step 321).

In a case where the list button 423 is clicked (YES in step 322), the page selection window 350 is displayed (step 301).

Figure 44:
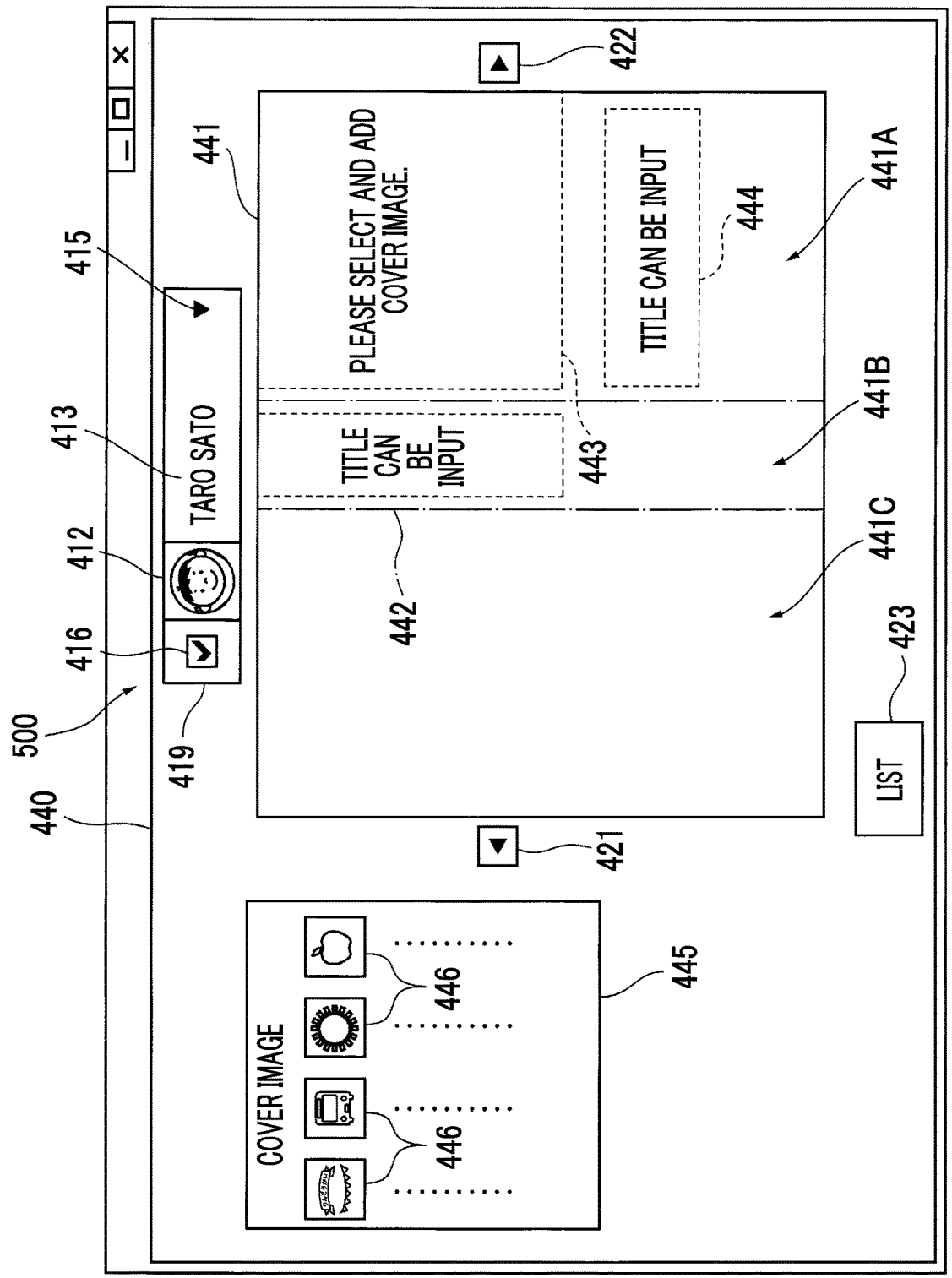
FIG. 44 is a diagram showing an example of a cover window.

In a case where none of the common page icons 353 to 357 is clicked (NO in step 302), the member introduction page icon 352 is not also clicked (NO in step 316), and in a case where the cover page icon 351 is clicked (NO in step 323), a cover window 440 as shown in FIG. 44 is displayed on the display screen of the display device 3 (step 324).

Figure 45:
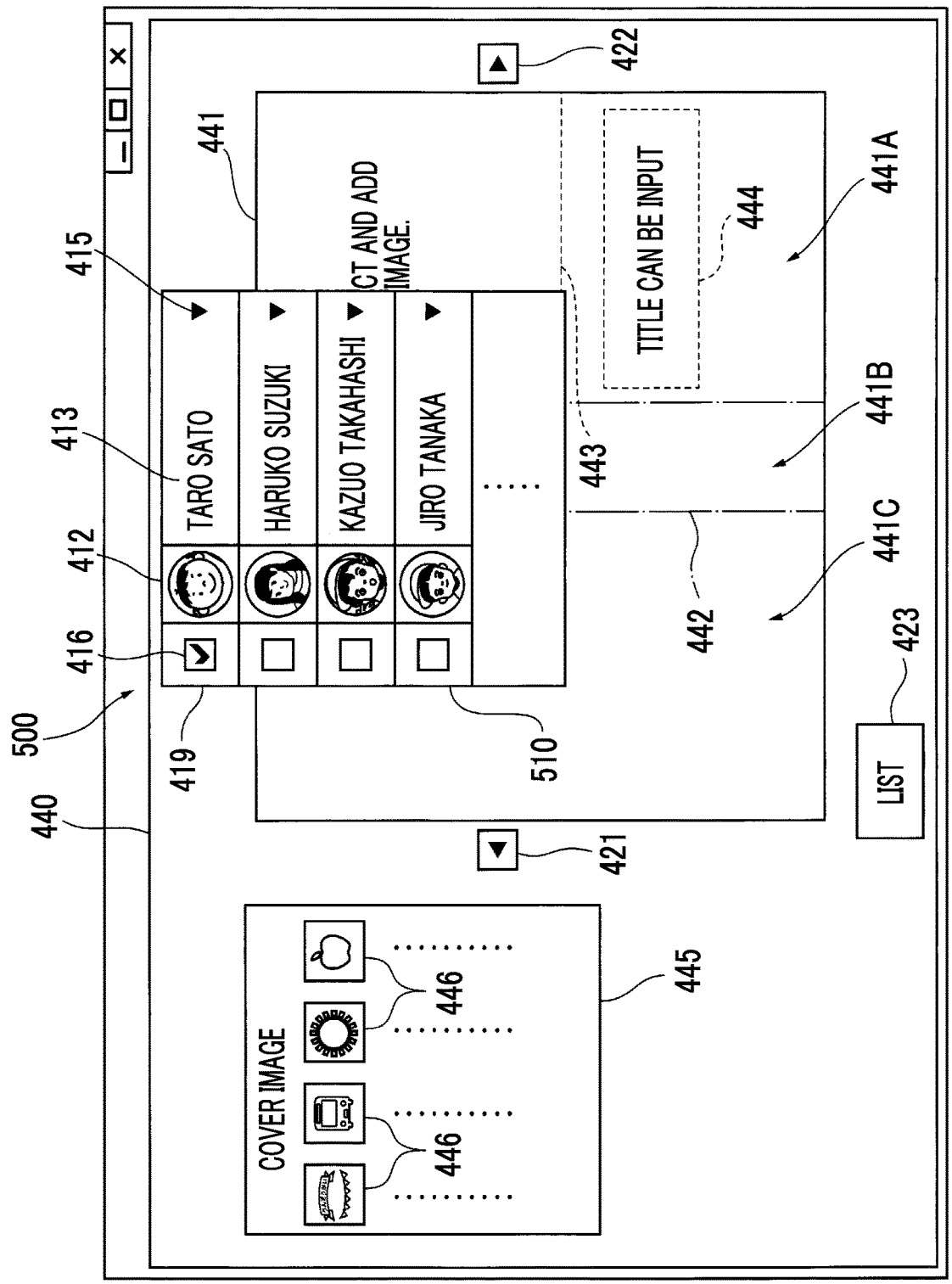
FIG. 45 is a diagram showing an example of a cover window.

Referring to FIG. 44, a person information display area 500 is displayed in an upper portion inside the cover window 440. The person information display section 419 displayed in the person information display area 500 includes a check box 416, a person's face image 412, a person's name 413, and an expand button 418. In a case where the expand button 418 is clicked, a person list display area 510 appears as shown in FIG. 45. By clicking a section of a name 413 of a desired person, it is possible to edit a cover unique to the person. For example, in the state shown in FIG. 44, since the name of the person "Taro SATO" is displayed in the person information display area 500, the cover of the album unique to "Taro SATO" is edited.

A cover image display area 445 is formed on a left side of the person information display area 500. Cover images 446 capable of being used for the cover of the album are displayed in the cover image display area 445. A desired image unique to a person may be selected from the cover images 446. An image unique to the person named "Taro SATO" (for example, an image in which "Taro SATO" is shown as a main subject, an image of a picture drawn by "Taro SATO", or the like), an image suitable for an image of the person "Taro SATO", or the like may be used as a cover.

A cover page 441 is displayed on a right side of the cover image display area 445. The cover page 441 includes a cover area 441A corresponding to a cover part of an album, a binding area 442B corresponding to a binding part of the album, and a back cover area 441C corresponding to a back cover part of the album. In a case where the back cover page icon 358 of the page selection window 350 is clicked, similarly, the cover page 441 shown in FIG. 44 is displayed, but in a case where the cover page icon 351 is clicked, the cover page 441 including the cover area 441A and the binding area 441B without including the back cover area 441C may be displayed, and in a case where the back cover page icon 358 is clicked, the back cover page including the back cover area 441C without including the cover area 441A and the binding area 441B may be displayed.

In the cover area 441A of the cover page 441, a cover image display area 443 and a title input area 444 are formed. A desired image is selected from the cover images 446 displayed in the cover image display area 445, and the selected cover image 446 is pasted on the cover image display area 443 by being dragged and dropped onto the cover image display area 443. In a case where the cursor C is positioned in the title input area 444 and is clicked, a title may be input to the title input area 444. For example, a unique title to a person such as "Taro SATO's memories" may be given. A title input area 442 is also formed in the binding area 441B of the cover page 441. In the title input area 442, similarly, in a case where the cursor C is positioned in the title input area 442 and is clicked, a title unique to the person may be input in the title input area 442. In this way, it is possible to edit a cover unique to a person (step 325).

A left arrow button 421 is formed on a left side of the cover page 441, and a right arrow button 422 is formed on a right side of the cover page 441. In a case where the left arrow button 421 is clicked, a previous page of the back cover is displayed, and in a case where the right arrow button 422 is clicked, a next page of the cover is displayed. In a case where a list button 423 is clicked, the page selection window 350 is displayed (step 301).

In a case where editing of a cover of a desired person is finished, a check box 416 corresponding to the person is checked (step 326). In a case where the check box 416 is checked, a created check table shown in Table 6 is updated (step 327). The created check table is created in advance, and is stored in the memory 7. The created check table is obtained by checking whether the cover page 441 and individual pages have been created corresponding to names of all persons. With respect to the cover page 441, in a case where the check box 416 is checked and the editing of the cover page 441 of the desired person is finished, "completed" is added. In a case where the editing is not finished, a blank section remains.

TABLE 6

| Name | Cover page | Individual page |
| --- | --- | --- |
| Taro SATO | Done | Sports day |
| Haruko SUZUKI | Done | |
| Kazuo TAKAHASHI | | Sports day |
| Jiro TANAKA | | |

Referring to FIG. 44, in a case where the editing of the cover of "Taro SATO" is finished and a cover of another person is being edited, the expand button 418 is clicked, and the person information display section 419 is displayed as shown in FIG. 45.

Referring to FIG. 45, in a case where the person information display section 419 is displayed, by confirming a check state of the check box 416, it is possible to confirm a person whose editing of the cover page 441 is finished and a student whose editing of the cover page 441 is not finished. By displaying the check of the check box 416 (second confirmation mark) by the CPU 2 (fourth display control unit) for confirmation, it can be recognized that the cover page 441 for a specific person is generated for each album.

In a case where the cover page 441 is edited for the person whose editing of the cover page 441 is not finished, a section of the name 413 of the person is clicked. Then, as shown in FIG. 44, the person list display area 510 is hidden, and the person information display section 419 for the name 413 of the clicked person appears. As described above, the cover page 441 is edited.

Figure 46:
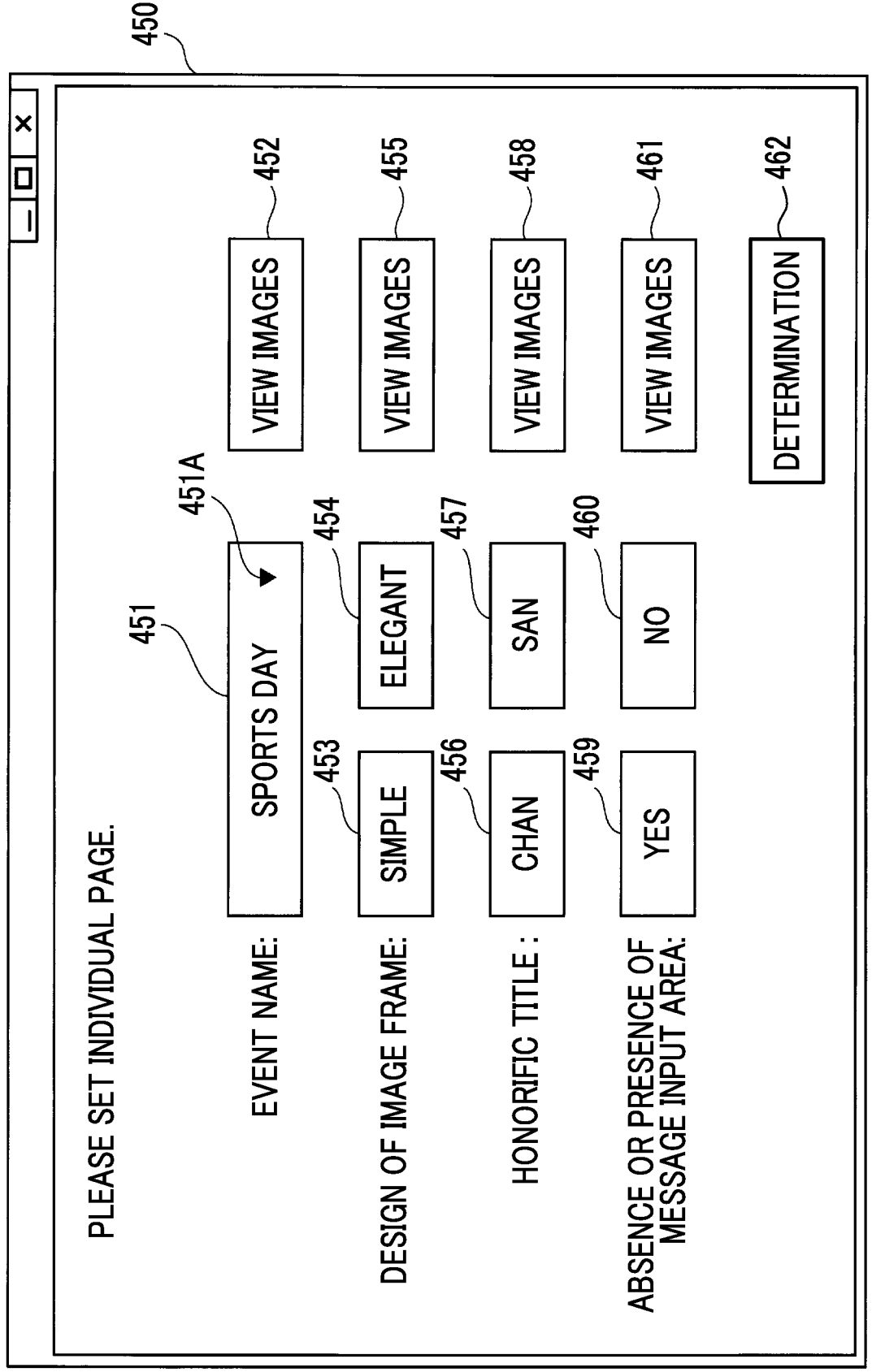
FIG. 46 is a diagram showing an example of an individual page setting window.

As shown in FIGS. 36 and 39, in a state where the page selection window 350 is displayed, in a case where the individual page button 359 is clicked (YES in step 328) while the common page icons 353 to 357, the member introduction page icon 352 or the cover page icon 351 are not clicked (NO in step 302, NO in step 316, and NO in step 323), the individual page setting window 450 shown in FIG. 46 is displayed on the display screen of the display device 3 (step 329).

Referring to FIG. 46, the individual page setting window 450 includes an event name selection area 451 for selecting an event name to become an individual page, an image display area 452 to be clicked in displaying a sample image of the individual page, and a simple button 453 to be clicked in setting design of an image frame of the individual page, an elegant button 454 to be clicked in setting the design of the image frame of the individual page as an elegant one, an image area 455 to be clicked in displaying a sample image of the image frame, a first honorific button 456 to be clicked in setting an honorific given to a name of a student disclosed in the individual page as "Chan(Mr. or Miss)", a second honorific button 457 to be clicked in setting the honorific given to the name of the student disclosed in the individual page as "San", an image portion 458 clicked in displaying a sample image of the honorific given to the name of the student disclosed in the individual page, a message setting button 459 to be clicked in providing a message input area on the individual page, a message non-setting button 460 to be clicked in non-setting of the message input area on the individual page, a message area 461 to be clicked in displaying a sample image of the message input area, and a determination button 462 to be clicked in finishing the setting of the individual page. In a case where a pull-down button 451A in the event name selection area 451 is clicked, a pull-down menu appears, and input event names are displayed in a list. An event name for setting an individual page is set from the pull-down menu (step 330).

The individual page may be set for any event of the input events. A page of the set event becomes an individual page for all albums. For example, in a case where a sports day event is selected as an event of an individual page, the sports day event becomes an individual page in all albums. However, in a case where no image of a specific person is shown in images captured at the event set as the individual page, the individual page of the person is not created but becomes a common page. In the common page, images pasted on the page is common regardless of albums, while in the individual page, images pasted on the page are different for each album. For example, on the individual page, many images in which a person to whom the album is given is a main subject are pasted. In the case of an album of the person named "Taro SATO", many images in which "Taro SATO" is a main subject are pasted on the individual page, and in the case of an album of the person named "Haruko SUZUKI", many images in which "Haruko SUZUKI" is a main subject are pasted on the individual page.

Figure 47:
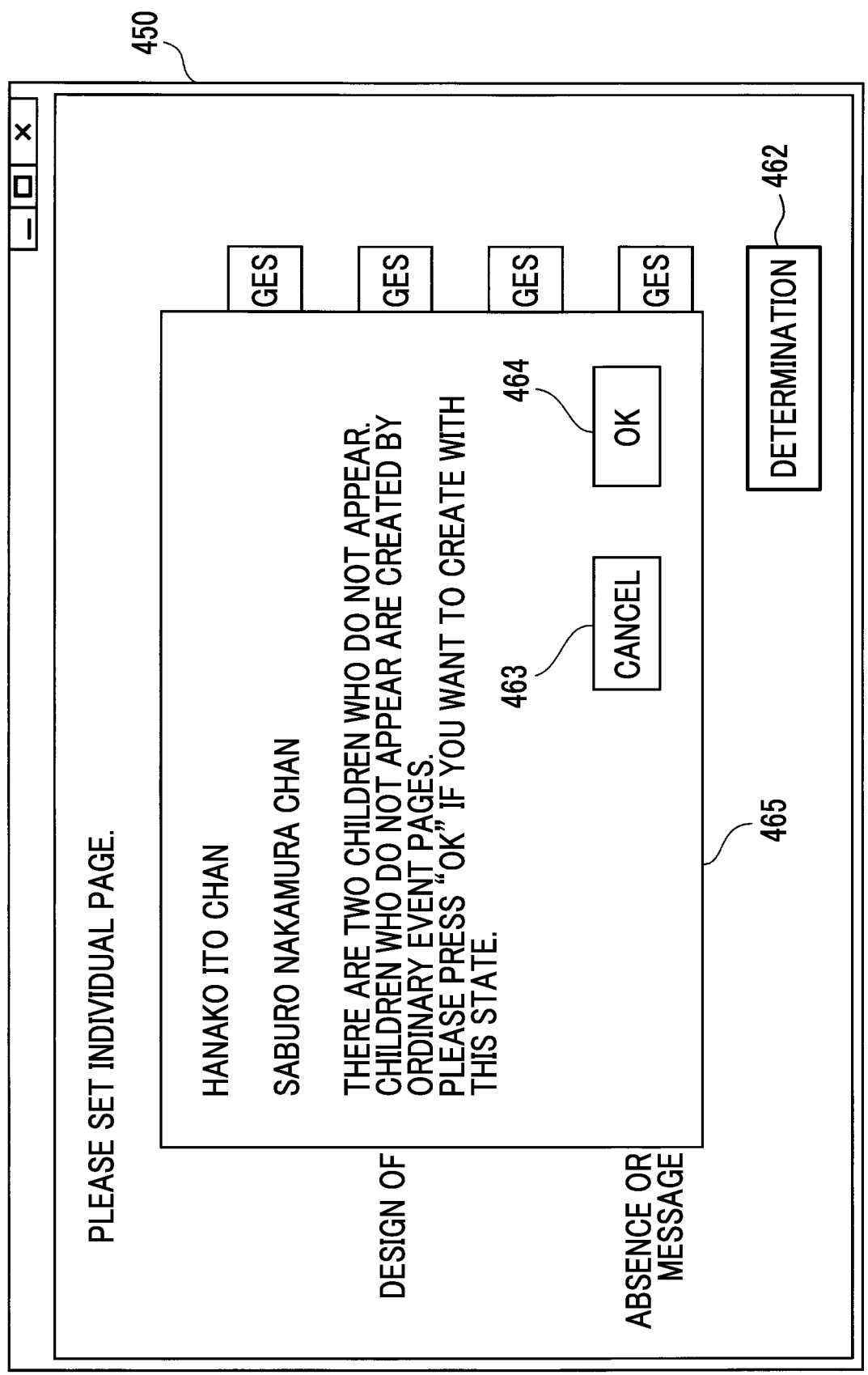
FIG. 47 is a diagram showing an example of an individual page setting window.

In a case where the setting of the individual page is finished and the determination button 462 is clicked (YES in step 331), a warning notice window 465 shown in FIG. 47 is displayed on the display screen of the display device 3 (step 332). In warning notice window 465, in a case where there is a person who is not shown in images captured at the event of the set individual page, a name of the person is notified. The example shown in FIG. 47 shows that a person named "Hanako ITO" and a person called "Saburo NAKAMURA" are not included in images captured at the event of the set individual page. For example, in a case where the person called "Hanako ITO" and the person called "Saburo NAKAMURA" are absent on a day when the set event is performed, it is notified that they do not exist in the images captured at the event. For an album of a person who is not absent in the images captured at the event of the set individual page, a common page is created without creating the individual page.

Figure 48:
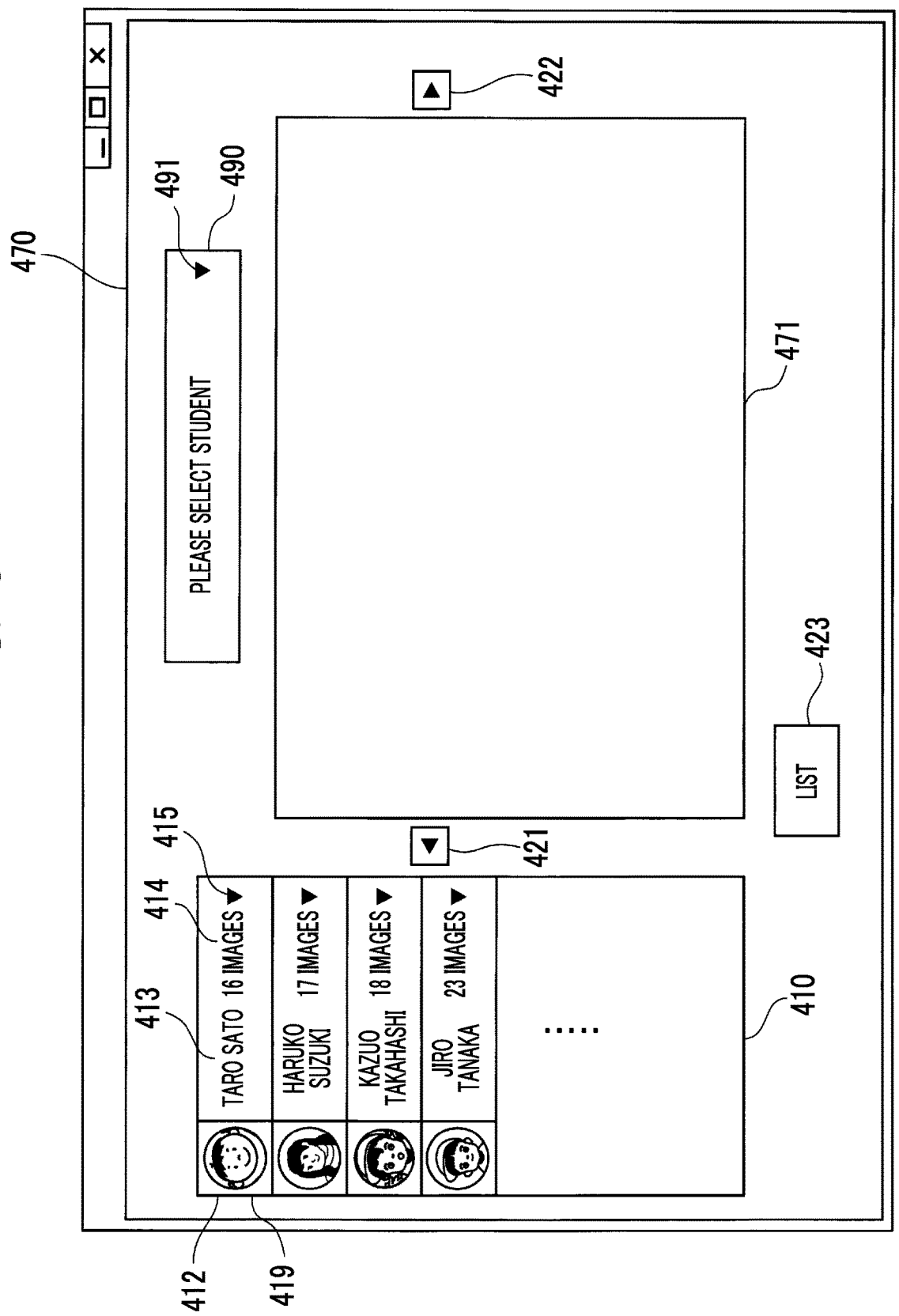
FIG. 48 is a diagram showing an example of an individual page window.

In the warning notice window 465, a cancel button 463 and an OK button 464 are formed, and in a case where the OK button is clicked (YES in step 333), an individual page as shown in FIG. 48 is displayed (step 334).

Figure 50:
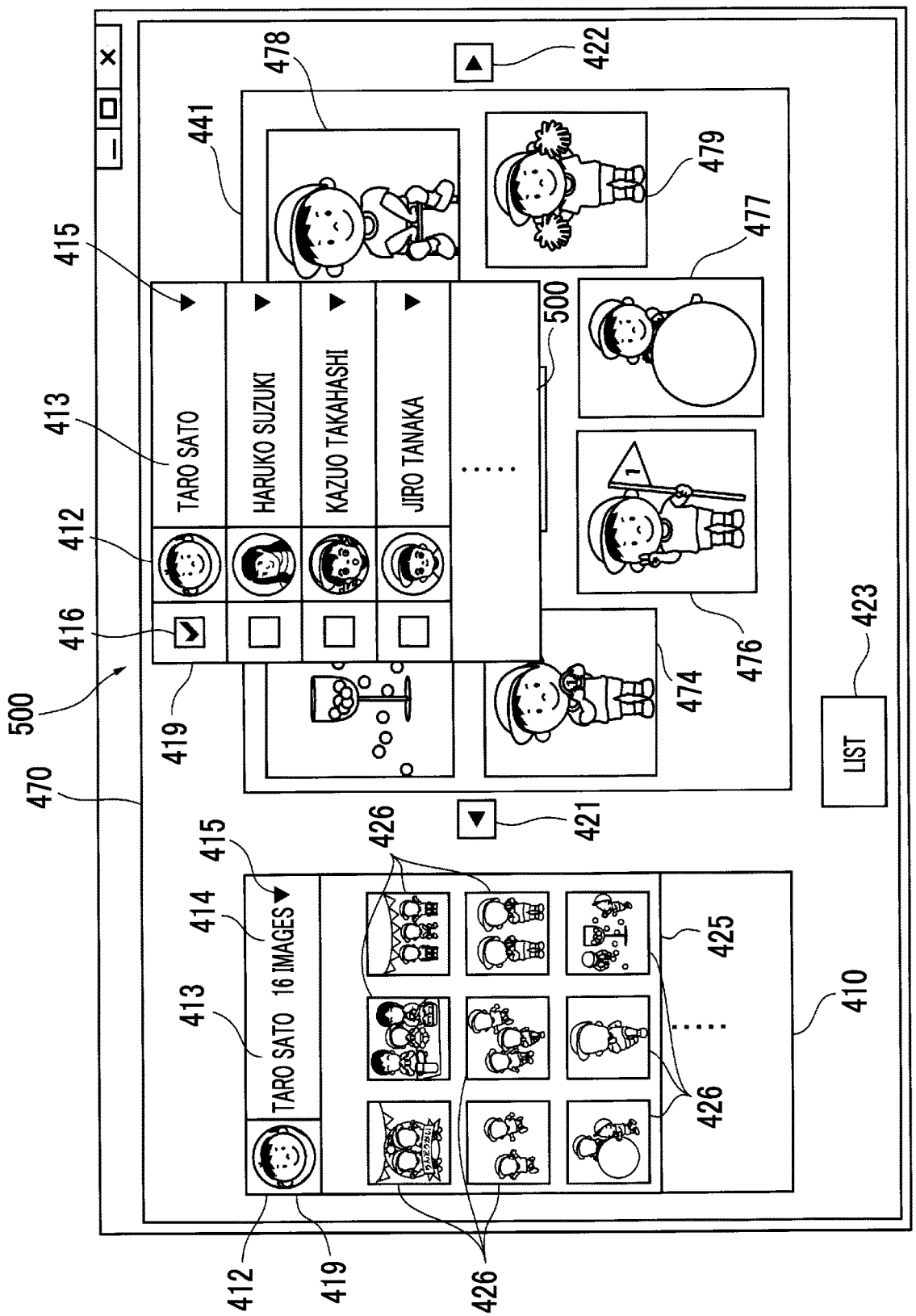
FIG. 50 is a diagram showing an example of an individual page window.

Referring to FIG. 48, a person selection window 490 is formed in a person selection window 470. A pull-down button 491 is formed in the person selection window 490. In a case where the pull-down button 491 is clicked, the person information display section 419 as shown in FIG. 50 appears. Names of persons are displayed in the person information display section 419 in a list, and a person for whom the person selection window 470 is to be created is selected.

The individual page 471 is formed below the person selection window 490. An image including the selected student is pasted on the individual page 471. The previous page button 421 is formed on a left side of the individual page 471, and the right arrow button 422 is formed on a right side of the individual page 471. Further, the list button 423 is formed on a lower left side of the individual page 471.

The image number display area 410 is formed in a left portion side inside the person selection window 470. In the person information display section 419 of the image number display area 410, the person's face image 412, the person's name 413, and the number of images 414 in which the person is captured (in which the number corresponds to the number of images in which the person is shown, among the images captured at the set event as the individual page 471), and the image expand button 415 are displayed in FIG. 41. In a case where the image expand button 415 is clicked, an image showing a corresponding person appears.

In a case where the pull-down button 491 is clicked and the person for whom the individual page 471 is to be created is designated (step 335), an automatic layout is formed on the individual page 471 using images including the designated person among the images captured at the set event.

Figure 49:
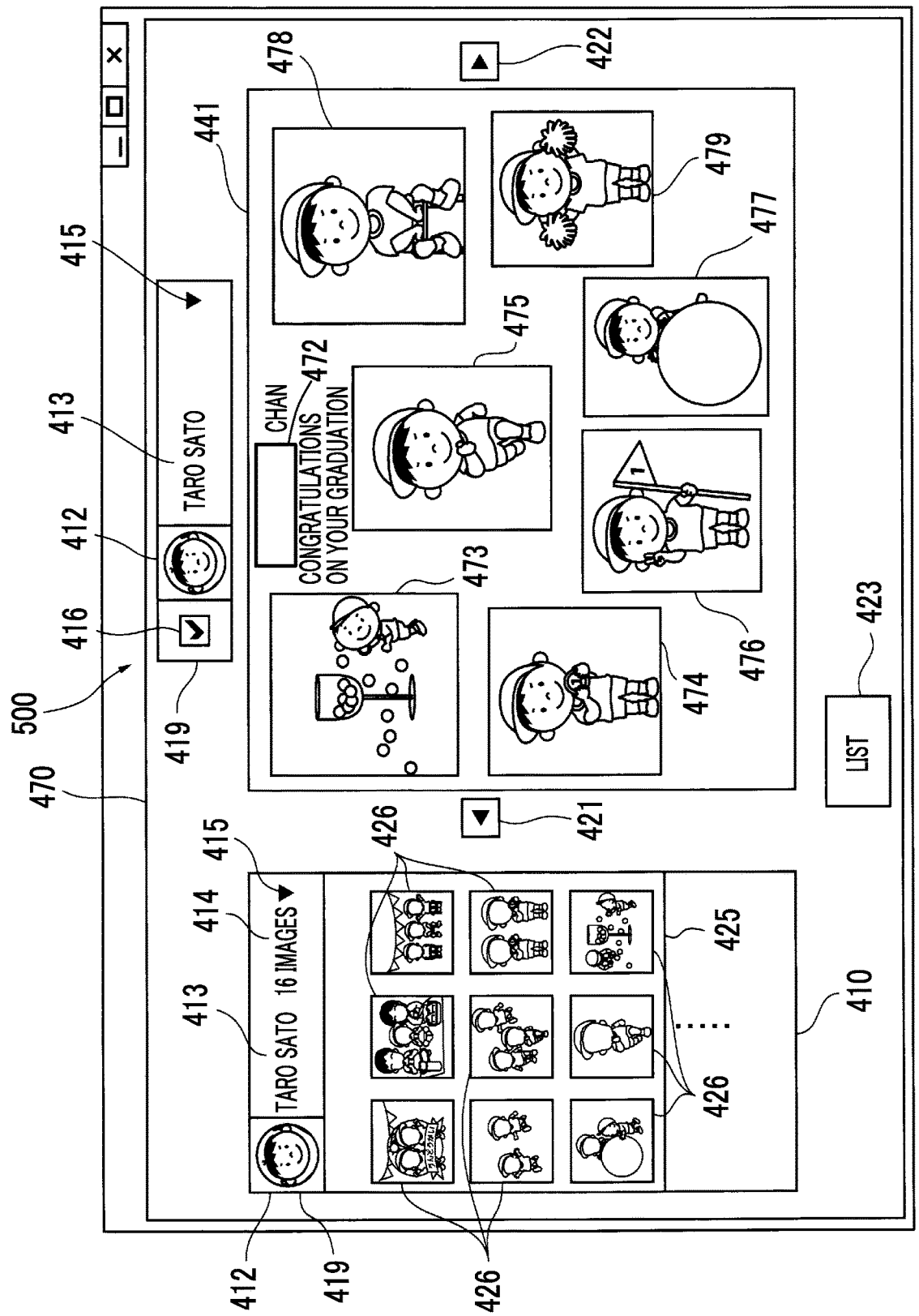
FIG. 49 is a diagram showing an example of an individual page window.

FIG. 49 is a diagram showing an example of the individual page 471 in a case where "Taro SATO" is designated as the person for whom the individual page 471 is to be created.

Referring to FIG. 49, images 473 to 479 showing "Taro SATO" are laid out on the individual page 471. In this way, the individual page 471 having many images in which "Taro SATO" who is the selected person is a main character is created (step 336). A name display area 472 is formed in an upper portion of the individual page 471. In a case where the cursor C is positioned and clicked on the name display area 472, input to the name display area 472 becomes possible. A name of the selected person is input to the name display area 472. The name of the selected person may be automatically input.

In FIG. 49, the image expand button 415 in the person information display section 419 corresponding to the selected person is clicked, and the image window 425 appears. Images 426 of the selected person are displayed on the image window 425. As a desired image 426 among the images 426 of the person displayed on the image window 425 is dragged and dropped onto the individual page 471, the desired image 426 may be pasted on the individual page 471. In this way, editing of the individual page is performed (step 337).

In a case where the editing of the individual page 471 is finished, the check box 416 is checked (step 338), and the checked check box 416 is displayed. Thus, the check box 416 that is checked as the pasting of the images on the individual page (individual double-page spread) 471 for the specific person is finished is displayed. Further, the created check table shown in Table 6 is updated (step 339). In this embodiment, after the "sports day" event is created as the individual page 471 for the person "Taro SATO", "sports day" is added to the individual page of "Taro SATO" in Table 6. In a case where an individual page is created for an event other than "sports day", its event name is added to the created check table.

In a case where an individual page of another person is created with respect to the same event as that for which the individual page is created, the image expand button 415 is clicked. Then, as shown in FIG. 50, the person list display area 510 in which face images 412 of all persons and names 413 of the persons are displayed appears. By checking the check (first confirmation mark) of the check box 416 displayed in the person list display area 510 under the control of the CPU 2 (third display control unit), it is possible to check whether an individual page of a person is created with respect to the event displayed on the individual page 471.

In a case where the list button 423 is clicked, the page selection window 350 is displayed on the display screen of the display device 3 (step 301).

Details disclosed in the above-described first embodiment and details disclosed in the above-described second embodiment may be combined.

A variety of processing units that execute the processes of the first embodiment and the second embodiment may include the CPU 2 that executes software to function as the variety of processing units, or may include a programmable logic device of which a circuit configuration is changeable after manufacturing, such as a field-programmable gate array (FPGA), a dedicated electric circuit that is a processor having a circuit configuration that is dedicatedly designed for executing a specific process, such as an application specific integrated circuit (ASIC), or the like.

One processing unit may be configured by one processor among the variety of processors described above, or may be configured by a combination of the same type or different types of two or more processors (for example, a combination of plural FPGAs or a combination of a CPU and an FPGA). As an example in which the plurality of processing units are configured by one processor, first, as represented by a computer such as a client computer or a server, a configuration in which a combination of one or more CPUs and software forms one processor and this processor functions as a plurality of processing units may be employed. Second, as represented by a system on chip (SoC) or the like, a configuration in which a processor for realizing entire functions of a system including a plurality of processing units using one integrated circuit (IC) chip is used may be employed. As described above, the various processing units are configured using one or more of various processors as a hardware structure.

Further, the hardware structure of the variety of processors is, more specifically, electric circuitry in which circuit elements such as semiconductor elements are combined.

The image candidate determination apparatus may be configured by a personal computer, may be configured by a so-called smart device such as a smartphone or a tablet device, or may be configured by a mobile phone such as a feature phone.

EXPLANATION OF REFERENCES

1: image candidate determination apparatus
2: CPU
3: display device
4: communication device
5: hard disk
6: hard disk drive
7: memory
8: keyboard
9: mouse
10: compact disc drive
11: compact disc 12: memory card reader/writer
13: memory card
80: image display window
81: character string
82: event management area
83: event addition button
84: event deletion button
90: image display area
91: image management tab
92: left arrow button
93: right arrow button
94: image specifying number
95: character string
96: character string
97: up arrow button
98: slide bar
99: down arrow button
101: face classification tab
102: public setting tab
110: subject list area
111: face classification button
112: character string
113: character string
114: character string
120: public/private information display area
121 to 126: check box
129: check box
130: sheet number input button
140: number input window
141: minimum number input area
142: maximum sheet number input area
143: determination button
150: imaging instruction window
151: confirm button
160: display switch pull-down
161: pull-down button
162: check box
163: display time
164: check box
165: image
166: thick frame
170: prohibit mark
171: cursor
172: thick frame
173: hatching
174: name display area
175: face image
176: name display area
180: minimum publication number setting area
181: up arrow button
182: down arrow button
190: publication number display area
191: mark
192: bar graph
193: line
194: face image
195: check box
196: thick frame
197: mark
198: subject
200: image
201 to 203: subject
210: subject detection number
211: confirm message
350: page selection window
351: cover page icon
352: member introduction page icon
353 to 357: common page icon
358: back cover page icon
359: individual page button
360: event name input window
361: event name input box
362: OK button
370: image selection window
371 to 380: image folder icon
381: event name display box
382: caution mark
390: double-page spread
391 to 397: image
400: page display window
410: image number display area
411: caution section
412: face image
413: name
414: number of sheets
415: image expand button
416: check box
418: expand button
419: person information display section
421: left arrow button
422: right arrow button
423: list button
425: image window
426: image
430: member introduction window
431: member introduction page
432: face image
433: name
440: cover window
441: cover page
441A: cover area
441B: binding area
441C: back cover area
442: title input area
442B: binding area
443: cover image display area
444: title input area
445: cover image display area
446: cover image
450: individual page setting window
451: event name selecting area
451A: pull-down button
452: image display area
453: simple button
454: elegant button
455: image area
456: first honorific button
457: second honorific button
458: image area
459: message setting button
460: message non-setting button
461: image area
462: determination button
463: cancel button
464: OK button
465: warning notice window
470: person selection window
471: individual page
472: name display area
473: image
490: person selection window
491: pull-down button
500: person information display area
510: person list display area C: cursor
F: face frame
F1 to F6: face frame
G1 to G3: face image group

What is claimed is:

1. An image candidate determination apparatus comprising:
    an image grouping device that receives a plurality of images and groups one or more images in which all images in the group include the same person in common; and
    an image candidate determination device that determines an extraction image candidate or a non-extraction image candidate from the images grouped by the image grouping device so as to ensure that the number of extraction images including the same person is within a limit value.

2. The image candidate determination apparatus according to claim 1,
    wherein the image candidate determination device determines the extraction image candidate or the non-extraction image candidate for each double-page spread included in an electronic album.

3. The image candidate determination apparatus according to claim 2, further comprising:
    an electronic album generating device that pastes the extraction image candidate determined in the image candidate determination device onto the double-page spread to generate the electronic album.

4. The image candidate determination apparatus according to claim 3, further comprising:
    a second display control device that distinguishes the double-page spread that does not include at least one or more persons among the plurality of predetermined persons from the double-page spread that includes all the plurality of predetermined persons to display the double-page spreads on a display screen in a list.

5. The image candidate determination apparatus according to claim 3,
    wherein a plurality of the electronic albums are provided, the image candidate determination apparatus further comprising:
    a fourth display control device that displays a second confirmation mark corresponding to the specific person on a display screen as a cover page for the specific person is generated for each of the electronic albums.

6. The image candidate determination apparatus according to claim 2, further comprising:
    a first notification device that notifies of at least one of a person who is not included in the double-page spread or the number of the persons, among a plurality of predetermined persons.

7. The image candidate determination apparatus according to claim 6, further comprising:
    a person designation device that designates any person among the persons notified in the first notification device; and
    a first display control device that displays images including the person designated by the person designation device, among the images grouped by the grouping device, on a display screen.

8. The image candidate determination apparatus according to claim 7, further comprising:
    an image designation device that designates an image from the images including the person, which are displayed by the first display control device,
    wherein the electronic album generating device pastes the image designated by the image designation device onto the double-page spread to generate the electronic album.

9. The image candidate determination apparatus according to claim 8, further comprising:
    a second notification device that notifies of the person included in the double-page spread.

10. The image candidate determination apparatus according to claim 9, further comprising:
    a third notification device that notifies of the number of the extraction image candidates including the person notified by the second notification device.

11. The image candidate determination apparatus according to claim 6,
    wherein a plurality of the electronic albums are provided, and
    wherein the double-page spread included in each of the electronic albums defines a common double-page spread onto which images common to the plurality of electronic albums are pasted and an individual double-page spread onto which an image in which a specific person is a main subject is pasted for each of the electronic albums, and
    wherein the first notification device notifies of at least one of a person who is not included in the extraction image candidate pasted onto the common double-page spread or the number of the persons.

12. The image candidate determination apparatus according to claim 11,
    wherein the electronic album generating device writes a name of the specific person in the individual double-page spread to generate the electronic album.

13. The image candidate determination apparatus according to claim 11, further comprising:
    a third display control device that displays a first confirmation mark corresponding to the specific person on a display screen as the pasting of the image onto the individual double-page spread for the specific person is finished.

14. The image candidate determination apparatus according to claim 1,
    wherein the grouping device receives a plurality of images captured at each event and groups one or more images in which the same person is included for each event.

15. The image candidate determination apparatus according to claim 14,
    wherein the electronic album generating device pastes the extraction image candidate determined in the image candidate determination device onto the double-page spread corresponding to an event represented by the extraction image candidate to generate the electronic album.

16. An image candidate determination apparatus according to claim 1,
    wherein in response to a command, the name of a person other than the person in the extraction image candidate among a plurality of predetermined persons is displayed.

17. An image candidate determination apparatus according to claim 1,
    wherein in response to a command, the face persons are classified and displayed for each person among a plurality of predetermined persons.

18. An image candidate determination apparatus according to claim 1,
   wherein the image grouping device that groups in which as for adults, the image grouping device will assume they are the same person.

19. An image candidate determination apparatus according to claim 1,
   wherein whose images are insufficient and how many are insufficient are notified.

20. An image candidate determination method comprising:
   receiving a plurality of images and grouping one or more images in which all images in the group include the same person in common, by an image grouping device; and
   determining an extraction image candidate or a non-extraction image candidate from the images grouped by the image grouping device so as to ensure that the number of extraction images including the same person is within a limit value.

21. A non-transitory recording medium storing computer-readable program for controlling a computer of an image candidate determination apparatus to execute:
   receiving a plurality of images and grouping one or more images in which all images in the group include the same person in common; and
   determining an extraction image candidate or a non-extraction image candidate from the grouped images so as to ensure that the number of extraction images including the same person is within a limit value.

* * * * *